United States Patent
Hayashi et al.

(10) Patent No.: US 10,930,156 B2
(45) Date of Patent: Feb. 23, 2021

(54) DISPLAY CONTROL APPARATUS, DISPLAY APPARATUS, DISPLAY CONTROL METHOD, AND PROGRAM

(71) Applicant: JVC KENWOOD Corporation, Yokohama (JP)

(72) Inventors: Naoto Hayashi, Yokohama (JP); Takuji Teruuchi, Yokohama (JP)

(73) Assignee: JVC Kenwood Corporation, Kanagawa (JP)

( * ) Notice: Subject to any disclaimer, the term of this patent is extended or adjusted under 35 U.S.C. 154(b) by 207 days.

(21) Appl. No.: 16/200,208

(22) Filed: Nov. 26, 2018

(65) Prior Publication Data

US 2019/0096261 A1   Mar. 28, 2019

Related U.S. Application Data

(63) Continuation of application No. PCT/JP2017/017782, filed on May 11, 2017.

(30) Foreign Application Priority Data

Aug. 9, 2016   (JP) .................................. 2016-156576
Mar. 14, 2017   (JP) .................................. 2017-048488

(51) Int. Cl.
*G08G 1/16* (2006.01)
*B60W 30/06* (2006.01)
(Continued)

(52) U.S. Cl.
CPC ............... *G08G 1/168* (2013.01); *B60R 1/00* (2013.01); *B60W 30/06* (2013.01); *B60W 50/14* (2013.01);
(Continued)

(58) Field of Classification Search
CPC .............. B62D 15/0275; B62D 15/028; B62D 15/027; B62D 15/0285; B62D 15/029;
(Continued)

(56) References Cited

U.S. PATENT DOCUMENTS 6,611,744 B1 *   8/2003   Shimazaki ................ B60R 1/00
                                                                              180/168
7,812,741 B2 *  10/2010   Sakakibara ........ B62D 15/0275
                                                                              340/932.2

(Continued)

FOREIGN PATENT DOCUMENTS

EP          1231110 A2        8/2002
JP          2003-063339 A     3/2003
(Continued)

*Primary Examiner* — Daniel Chang
(74) *Attorney, Agent, or Firm* — Procopio, Cory Hargreaves & Savitch LLP

(57) ABSTRACT

An image data acquisition unit acquires image data from a rear camera. A display image generation unit generates display image data obtained by superimposing a pair of predicted course lines and a plurality of assisting lines on the acquired image data. An extraction unit extracts a marked-off space boundary in a width direction of a marked-off parking space from the image data. A positional relation determination unit determines a positional relation between the extracted marked-off space boundary and the assisting line on the display image data. The display image generation unit changes a displaying format of an assisting line located on an outer side of the marked-off space boundary extracted by the extraction unit from a displaying format of an assisting line located on an inner side of the marked-off space boundary. A display control unit displays an image based on the display image data on a display unit.

8 Claims, 32 Drawing Sheets

(51) Int. Cl.
  *B60R 1/00* (2006.01)
  *B60W 50/14* (2020.01)
  *H04N 7/18* (2006.01)
  *B62D 15/02* (2006.01)

(52) U.S. Cl.
  CPC ....... *B62D 15/029* (2013.01); *B62D 15/0295* (2013.01); *H04N 7/18* (2013.01); *H04N 7/183* (2013.01); *B60R 2300/305* (2013.01)

(58) Field of Classification Search
  CPC .............. B62D 15/021; B62D 15/0265; B62D 15/0295; B60R 1/00; B60R 2300/806; B60R 2300/305; B60R 2300/302; B60R 2011/004; B60R 2300/8026; B60T 2201/10; B60W 30/06; B60W 2540/18; B60W 2420/42; B60W 2420/403; G08G 1/168; G08G 1/143; G08G 1/146; G08G 1/167; H04N 5/232
  USPC ..... 340/932.2, 436, 435, 937; 701/1, 41, 28; 348/148, 113; 382/103, 106; 700/20
  See application file for complete search history.

(56) References Cited

U.S. PATENT DOCUMENTS

| | | | |
|---|---|---|---|
| 8,258,933 B2* | 9/2012 | Son | B62D 15/0275 340/435 |
| 2001/0027363 A1* | 10/2001 | Shimazaki | B62D 15/0275 701/41 |
| 2002/0084916 A1* | 7/2002 | Shimizu | B62D 15/0275 340/932.2 |
| 2002/0123829 A1* | 9/2002 | Kuriya | B62D 15/0275 701/1 |
| 2002/0128750 A1* | 9/2002 | Kakinami | B60R 1/00 701/1 |
| 2004/0153243 A1* | 8/2004 | Shimazaki | B62D 15/0275 701/300 |
| 2004/0204807 A1* | 10/2004 | Kimura | B62D 15/028 701/36 |
| 2005/0055139 A1* | 3/2005 | Tanaka | B62D 15/028 701/1 |
| 2008/0122654 A1* | 5/2008 | Sakakibara | G08G 1/168 340/932.2 |
| 2008/0158011 A1* | 7/2008 | Yamanaka | B62D 15/0275 340/932.2 |
| 2010/0219010 A1* | 9/2010 | Kadowaki | B62D 15/0285 180/204 |
| 2010/0253543 A1* | 10/2010 | Szczerba | G06K 9/00805 340/932.2 |
| 2013/0010119 A1* | 1/2013 | Mitsugi | H04N 7/183 348/148 |
| 2013/0307985 A1 | 11/2013 | Numata et al. | |
| 2013/0321616 A1 | 12/2013 | Lee | |
| 2014/0139677 A1* | 5/2014 | Lambert | H04N 7/183 348/148 |
| 2017/0232897 A1* | 8/2017 | Itoh | B60R 21/00 348/148 |
| 2019/0084618 A1* | 3/2019 | Numata | B62D 15/0275 |

FOREIGN PATENT DOCUMENTS

| | | | | |
|---|---|---|---|---|
| JP | 2008132881 A | * | 6/2008 | ........ B62D 15/0275 |
| JP | 2008132882 A | * | 6/2008 | |
| JP | 2010-136289 A | | 6/2010 | |
| JP | 2014-162398 A | | 9/2014 | |
| JP | 2014162398 A | * | 9/2014 | |
| WO | 2012/102392 A1 | | 8/2012 | |

* cited by examiner

DISPLAY CONTROL APPARATUS, DISPLAY APPARATUS, DISPLAY CONTROL METHOD, AND PROGRAM

CROSS REFERENCE TO RELATED APPLICATION

This application is a Bypass Continuation of International Application No. PCT/JP2017/017782 filed on May 11, 2017, which is based upon and claims the benefit of priorities from Japanese patent applications No. 2016-156576, filed on Aug. 9, 2016 and No. 2017-048488, filed on Mar. 14, 2017, the disclosures of which are incorporated herein in their entireties by reference.

BACKGROUND

The present invention relates to a display control apparatus, a display apparatus, a display control method, and a program.

In recent years, a technique for easily and accurately guiding a vehicle to a marked-off parking space by, when the vehicle moves backward, superimposing guidelines indicating a predicted trajectory of the backward movement on a rear-view image taken by a rear camera mounted on a rear part of the vehicle and displaying the resultant image in a display unit such as a monitor has become widespread. As a technique related to the above-described technique, Patent Literature 1 (International Patent Publication No. WO2012/102392) discloses a traveling assisting apparatus for a vehicle which displays images obtained by shooting surroundings of the vehicle in a vehicle-mounted monitor. The traveling assisting apparatus disclosed in Patent Literature 1 displays guidelines while superimposing them on images obtained by shooting surroundings of the vehicle.

Further, Patent Literature 2 (Japanese Unexamined Patent Application Publication No. 2014-162398) discloses a parking assisting apparatus for a vehicle which makes it possible to predict in advance whether or not the vehicle can enter a desired parking space without performing a steering operation in a vehicle stop position. The parking assisting apparatus according to Patent Literature 2 includes image pickup means for shooting a rear view of a vehicle, display means for displaying an image of the rear view of the vehicle, and control means for superimposing a predicted backward trajectory on an image displayed in the display means and displaying the resultant image in the display means, the predicted backward trajectory being a backward trajectory when the vehicle is moved backward at a maximum steering angle, and extending in a vehicle moving direction and corresponding to the rear-right and rear-left corners of the vehicle.

SUMMARY

Depending on a situation of a marked-off parking space for parking a vehicle, a driver may want to park the vehicle so that its center is positioned as close as possible to the center of the marked-off parking space in the width direction, or may intend to park the vehicle as close as possible to the left or right side of the marked-off parking space. In such a situation, when only guidelines corresponding to the width or the like of the vehicle are displayed as in the technique disclosed in the above-mentioned patent literature, it is difficult for the driver to appropriately recognize the position of the vehicle in the width direction of the marked-off parking space merely.

Further, in a situation in which a driver moves a vehicle to a marked-off parking space or the like, when the driver wants to recognize a distance between an object (a parking frame line, a curb stone, etc.) that defines a target position of the vehicle and the vehicle while viewing an image thereof, the driver can recognize its approximate distance based on lengths of guidelines or the like. However, it is impossible to recognize an accurate distance merely by using the guidelines disclosed in the aforementioned patent literature. Therefore, in order to enable a driver to recognize an accurate distance, it is conceivable to use, for example, a method in which a numerical value(s) indicating a distance to an object is superimposed on the image, or a method in which a large number of lines arranged at small intervals are displayed as divisions of a scale in addition to the guidelines. However, in the above-described methods, there is a possibility that the displayed items become complicated, thus making it difficult for the driver to appropriately and quickly recognize the distance to the object.

In view of the above-described problems, an object of this embodiment is to provide a display control apparatus, a display apparatus, a display control method, and a program that enable a driver to appropriately recognize a position of a vehicle in a width direction of a marked-off parking space, or enable a driver to appropriately and quickly recognize a distance to an object that defines a target position of a vehicle.

Accordingly, this embodiment provides a display control apparatus including: an image data acquisition unit configured to acquire image data from a rear camera configured to shoot a rear view of a vehicle; a display image generation unit configured to generate display image data in which a pair of predicted course lines and a plurality of assisting lines are superimposed on the image data acquired by the image data acquisition unit, the pair of predicted course lines corresponding to a width of the vehicle and being drawn according to a backward movement of the vehicle, the plurality of assisting lines being disposed so that they are arranged side by side in a width direction on both sides of the pair of predicted course lines; an extraction unit configured to extract a marked-off space boundary from the image data, the marked-off space boundary being a boundary in a width direction of a marked-off parking space where the vehicle can be parked; a positional relation determination unit configured to determine a positional relation between the marked-off space boundary extracted by the extraction unit and the assisting line in the display image data; and a display control unit configured to display an image based on the display image data generated by the display image generation unit in a display unit, in which the display image generation unit makes clarity of a display of an assisting line located on an outer side of the marked-off space boundary extracted by the extraction unit lower than clarity of a display of an assisting line located on an inner side of the marked-off space boundary.

Further, this embodiment provides a display control apparatus including: an image data acquisition unit configured to acquire image data from a camera configured to shoot a surrounding view of a vehicle; an object detection unit configured to detect an object defining a target position of the vehicle from the image data; a display image generation unit configured to generate display image data in which at least one distance indicating line is superimposed on the image data, the at least one distance indicating line indicating a position at a predetermined distance from the vehicle or a position at a predetermined distance from a position on a predicted trajectory of the vehicle; and a display control unit configured to display an image based on the display image data generated by the display image generation unit in a display unit, in which the display image generation unit generates the display image data in which an assisting line indicating a position that is closer to the vehicle than a position of the distance indicating line is is further superimposed on the image data when it is determined that a distance between a position of the object detected by the object detection unit and a position corresponding to the distance indicating line becomes equal to or shorter than a first threshold.

Further, this embodiment provides a display control method including: acquiring image data from a rear camera configured to shoot a rear view of a vehicle; generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines; extracting a marked-off space boundary from the image data, the marked-off space boundary being a boundary in a width direction of a marked-off parking space where the vehicle can be parked; determining a positional relation between the extracted marked-off space boundary and the assisting line in the display image data; making clarity of a display of an assisting line located on an outer side of the extracted marked-off space boundary lower than clarity of a display of a assisting line located on an inner side of the marked-off space boundary; and displaying an image based on the display image data in a display unit.

Further, this embodiment provides a display control method including: acquiring image data from a camera configured to shoot a surrounding view of a vehicle; detecting an object defining a target position of the vehicle from the image data; generating display image data in which at least one distance indicating line is superimposed on the image data, the at least one distance indicating line indicating a position at a predetermined distance from the vehicle or a position at a predetermined distance from a position on a predicted trajectory of the vehicle; generating the display image data in which an assisting line indicating a position that is closer to the vehicle than a position of the distance indicating line is further superimposed on the image data when it is determined that a distance between a position of the detected object and a position corresponding to the distance indicating line becomes equal to or shorter than a first threshold; and displaying an image based on the generated display image data in a display unit.

Further, this embodiment provides a program for causing a computer to execute: a step of acquiring image data from a rear camera configured to shoot a rear view of a vehicle; a step of generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines; a step of extracting a marked-off space boundary from the image data, the marked-off space boundary being a boundary in a width direction of a marked-off parking space where the vehicle can be parked; a step of determining a positional relation between the extracted marked-off space boundary and the assisting line in the display image data; a step of making clarity of a display of an assisting line located on an outer side of the extracted marked-off space boundary lower than clarity of a display of a assisting line located on an inner side of the marked-off space boundary; and a step of displaying an image based on the display image data in a display unit.

Further, this embodiment provides a program for causing a computer to execute: a step of acquiring image data from a camera configured to shoot a surrounding view of a vehicle; a step of detecting an object defining a target position of the vehicle from the image data; a step of generating display image data in which at least one distance indicating line is superimposed on the image data, the at least one distance indicating line indicating a position at a predetermined distance from the vehicle or a position at a predetermined distance from a position on a predicted trajectory of the vehicle; a step of generating the display image data in which an assisting line indicating a position that is closer to the vehicle than a position of the distance indicating line is is further superimposed on the image data when it is determined that a distance between a position of the detected object and a position corresponding to the distance indicating line becomes equal to or shorter than a first threshold; and a step of displaying an image based on the generated display image data in a display unit.

DETAILED DESCRIPTION

First Embodiment

Figure 1:
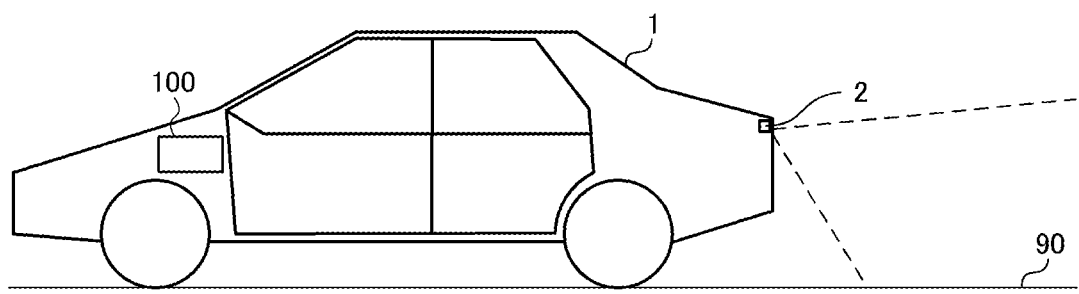
FIG. 1 shows a vehicle according to a first embodiment.

Embodiments according to the present invention will be described hereinafter with reference to the drawings. Note that the same reference numerals are assigned to substantially the same components.

FIG. 1 shows a vehicle 1 according to a first embodiment. The vehicle 1 includes a rear camera 2 and a display control apparatus 100. The rear camera 2 is installed in a rear part of the vehicle 1 and shoots a rear view of the vehicle 1 including a road surface 90. The display control apparatus 100 can be disposed in an arbitrary place in the vehicle 1. The display control apparatus 100 can be connected to a CAN (Control Area Network). The display control apparatus 100 performs control so that a pair of predicted course lines that corresponds to a width of the vehicle 1 and is drawn according to a backward movement of the vehicle 1 is superimposed on an image taken by the rear camera 2. Details will be described later.

Figure 2:
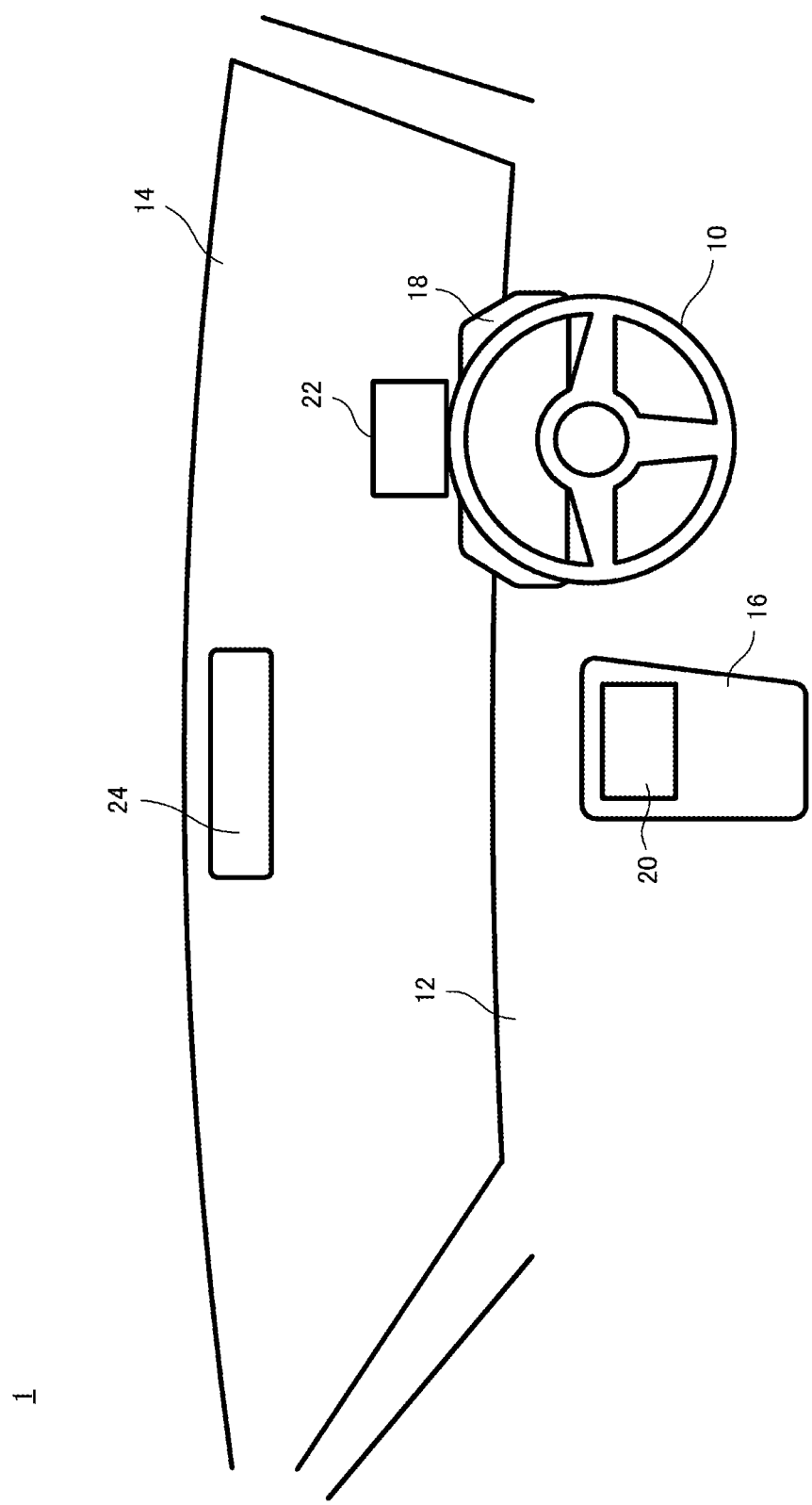
FIG. 2 shows an interior of the vehicle according to the first embodiment.

FIG. 2 shows an interior of the vehicle 1 according to the first embodiment. FIG. 2 shows a view when a driver views a driver's cabin inside the vehicle 1 from a driver's seat in a forward direction of the vehicle 1. The vehicle 1 includes, for example, a steering wheel 10, a dashboard 12, a windshield 14, a center console 16, and a cluster panel 18 that displays a traveling speed of the vehicle, the number of revolutions of an engine and the like. Further, the center console 16 may be provided with a center display unit 20 that displays a navigation screen or the like. In the vehicle 1, a head-up display unit 22 in which an image is displayed by a head-up display technique may be provided above the cluster panel 18. When the head-up display is a combiner type, the head-up display unit 22 is a combiner. Further, when the head-up display displays a virtual image on the windshield 14, the head-up display unit 22 is an area in the windshield 14 where the virtual image is displayed. Further, the vehicle 1 may include a rear view monitor 24. The rear view monitor 24 is disposed in the same place as the place where a rear-view mirror for checking a rear view is disposed in an ordinary vehicle, i.e., is disposed at or near the center of an upper part of the windshield 14.

Figure 3:
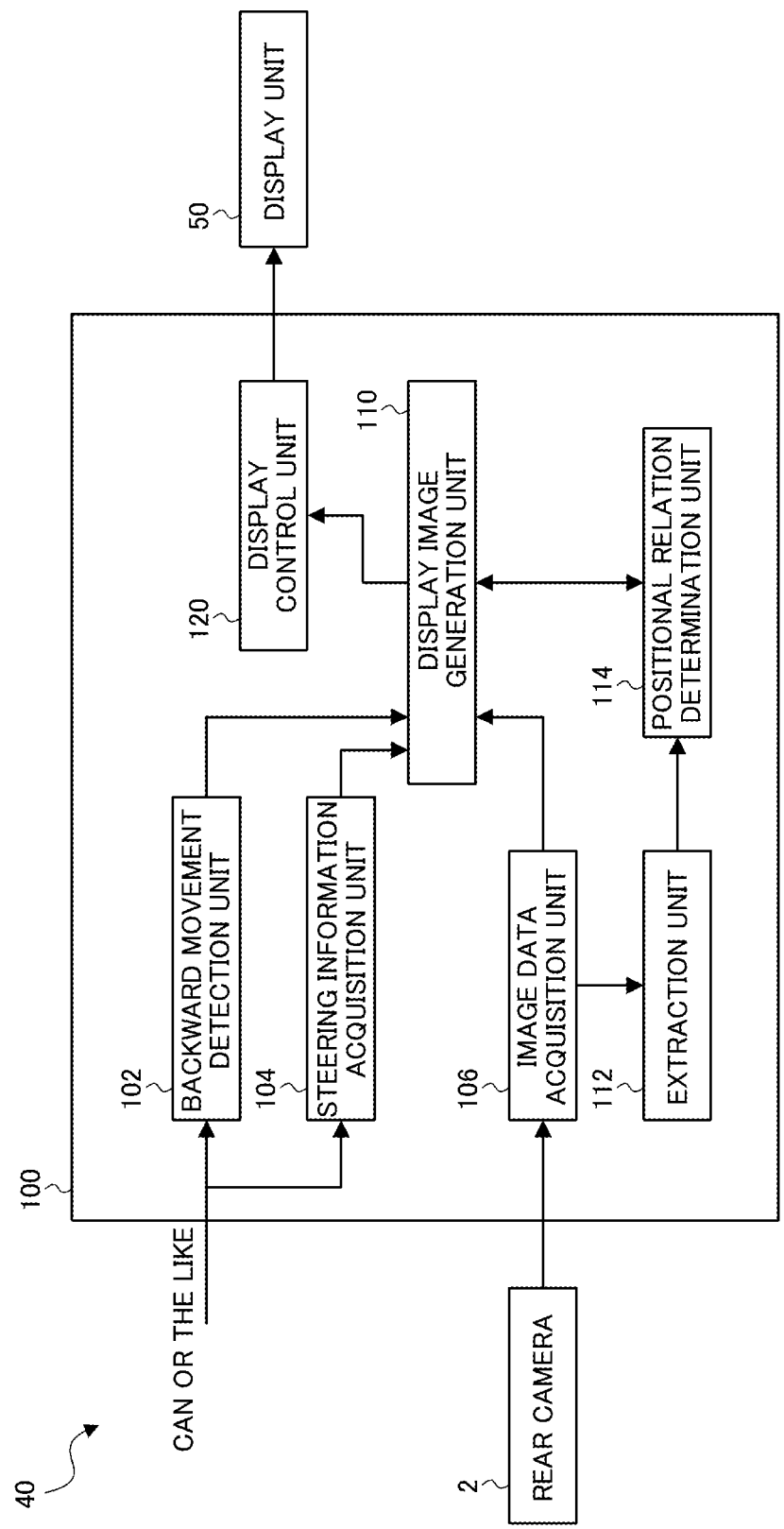
FIG. 3 shows a configuration of a display control apparatus and a display control system including the display control apparatus according to the first embodiment.

FIG. 3 shows a configuration of the display control apparatus 100 and a display apparatus 40 including the display control apparatus 100 according to the first embodiment. The display apparatus 40 includes the rear camera 2, a display unit 50, and the display control apparatus 100. The display control apparatus 100 is connected to the rear camera 2 and the display unit 50 so that the display control apparatus 100 can communicate with them. The display control apparatus 100 includes a backward movement detection unit 102, a steering information acquisition unit 104, an image data acquisition unit 106, a display image generation unit 110, an extraction unit 112, a positional relation determination unit 114, and a display control unit 120. Note that at least one of or all the components of the display apparatus 40 may be incorporated into the vehicle 1, or may be removed from the vehicle 1 and be portable.

The display unit 50 displays an image taken by the rear camera 2. The display unit 50 can be implemented by, for example, the rear view monitor 24, the cluster panel 18, the center display unit 20, or the head-up display unit 22. Further, the display unit 50 may be implemented by a portable terminal device, such as a smartphone or a tablet terminal, capable of communicating with the display control apparatus 100. Further, the display control apparatus 100 may be, for example, a computer device incorporated into the center console 16 or the like, or may be the above-described portable terminal device.

The display control apparatus 100 includes a processor such as a CPU (Central Processing Unit), a storage device such as a memory, a user interface, and various peripheral circuits. That is, the display control apparatus 100 has functions as a computer. Further, the display control apparatus 100 implements various components such as the backward movement detection unit 102, the steering information acquisition unit 104, the image data acquisition unit 106, the display image generation unit 110, the extraction unit 112, the positional relation determination unit 114, and the display control unit 120 by having the processor execute a program(s) stored in the storage device. Further, the implementation of each component of the display control apparatus 100 is not limited to software implementation using a program. That is, each component may be implemented by any combination of hardware, firmware, and software. Further, each component of the display control apparatus 100 may be implemented by using a user-programmable integrated circuit such as a field-programmable gate array (FPGA) or a microcomputer. In this case, a program composed of the above-described various components may be implemented by using this integrated circuit. The above-described matter also applies to other embodiments described later.

The backward movement detection unit 102 detects a backward movement of the vehicle 1. For example, the backward movement detecting unit 102 acquires information indicating that a reverse gear is selected from the CAN or the like and determines whether or not the vehicle 1 is in a backward movement state. When the backward movement detection unit 102 determines that the vehicle 1 is in the backward movement state, it outputs backward movement information indicating that determination to the display image generation unit 110.

The steering information acquisition unit 104 acquires a signal from the CAN or the like and acquires steering angle information indicating a steering angle of wheels of the vehicle 1. Note that the steering angle information includes information indicating a steering direction such as right or left in addition to the information indicating the steering angle. Note that the steering angle information may indicate a steering angle of the steering wheel 10. The steering information acquisition unit 104 outputs the acquired steering angle information to the display image generation unit 110. In particular, the steering information acquisition unit 104 acquires steering angle information when the vehicle 1 is at a standstill or moving backward.

The image data acquisition unit 106 acquires image data from the rear camera 2. The image data acquisition unit 106 outputs the acquired image data to the display image generation unit 110. Note that the image data is data indicating an image that is obtained by shooting a rear view of the vehicle 1 by the rear camera 2. Note that an image that is taken when the vehicle 1 is parked in a marked-off parking space through a backward movement may include an image showing the marked-off parking space and an image showing a marked-off space boundary(ies) that is a boundary(ies) of the marked-off parking space.

The marked-off parking space is a parking space where the vehicle 1 can be parked. For example, the marked-off parking space may be partitioned by parking marking-off lines such as white lines drawn on the road surface 90. In this case, the marked-off space boundary corresponds to the parking marking-off line drawn on the road surface 90. Further, the marked-off parking space may not be partitioned by the parking marking-off lines and may instead be partitioned by an obstacle(s) such as a wall(s). In this case, the marked-off space boundary corresponds to the obstacle. Further, the marked-off parking space does no need to be physically partitioned and may instead be just a sufficient space to park the vehicle 1. In this case, the marked-off space boundary corresponds to, for example, another vehicle or the like parked next to the parking space. Note that even in the case where the marked-off parking space is partitioned by the parking marking-off line, there is a case where another vehicle parked in the next parking space juts out over the parking marking-off line. In this case, the marked-off space boundary corresponds to the other parked vehicle jutting out over the parking marking-off line. Note that in the following description, the "obstacle" may include not only fixed objects near the marked-off parking space such as walls, but also other vehicles and the like.

When the display image generation unit 110 receives backward movement information from the backward movement detection unit 102, it generates display image data in which a pair of predicted course lines and a plurality of assisting lines (i.e., subsidiary lines) are superimposed on the image data acquired by the image data acquisition unit 106. Then, the display image generation unit 110 outputs the generated display image data to the display control unit 120.

Note that the predicted course lines can also be expressed as guidelines, predicted backward trajectories, predicted trajectory lines, or the like. The predicted course lines correspond to a width of the vehicle 1 and are drawn according to a backward movement of the vehicle 1. That is, in the display image data, the width of the pair of predicted course lines corresponds to the width of the vehicle 1. Further, the predicted course lines indicate a predicted trajectory of a backward movement of the vehicle 1. In other words, the predicted course lines indicate predicted trajectories of the left and right ends of the vehicle 1 on the road surface 90 when the vehicle 1 performs a backward movement at a steering angle indicated by the steering angle information acquired by the steering information acquisition section 104.

Further, the plurality of assisting lines are disposed in such a manner that they are arranged side by side in the width direction on both sides of the pair of predicted course lines. That is, a plurality of assisting lines are arranged side by side in the width direction on the left side of the left predicted course line of the pair of predicted course lines. Similarly, a plurality of assisting lines are arranged side by side in the width direction on the right side of the right predicted course line of the pair of predicted course lines. The assisting lines indicate distances from the pair of predicted course lines in the width direction on the road surface behind the vehicle 1 on the display image data. Details of the assisting lines will be described later.

The display image generation unit 110 determines a shape of the pair of predicted course lines on the display image data according to the steering angle indicated by the steering angle information acquired by the steering information acquisition unit 104. Further, the display image generation unit 110 determines a shape of the plurality of assisting lines arranged on both sides of the pair of predicted course lines having the determined shape on the display image data. Note that the shape of the assisting lines may conform to the shape of the predicted course lines. Then, the display image generation unit 110 superimposes the pair of predicted course lines having the determined shape and the plurality of assisting lines having the determined shape on the image data acquired by the image data acquisition unit 106. In this way, the display image generation unit 110 generates display image data. Further, the display image generation unit 110 changes clarity of the display of the assisting lines according to the positional relation between the marked-off space boundary and the assisting lines on the display image data. Details will be described later.

The extraction unit 112 extracts a marked-off space boundary from the image data acquired by the image data acquisition unit 106. Then, the extraction unit 112 outputs extraction data indicating a result of the extraction to the positional relation determination unit 114. The extraction of the marked-off space boundary can be carried out by using various existing methods. For example, the extraction unit 112 may extract a marked-off space boundary by recognizing a parking marking-off line, an obstacle, or another vehicle by edge detection. Further, when the marked-off space boundary is a white line, the extraction unit 112 may extract the marked-off space boundary by recognizing the white line. Further, in the case where the display control apparatus 100 stores dictionary data indicating parking marking-off lines, vehicles, etc. in advance, the extraction unit 112 may extract a marked-off space boundary by comparing an object in the image data with that in the dictionary data and thereby recognizing a parking marking-off line, a vehicle, etc.

Further, the extraction unit 112 recognizes a marked-off parking space. The recognition of the marked-off parking space can be carried out by using various existing methods. For example, the extraction unit 112 may recognize a rectangular area formed by marked-off space boundaries as a marked-off parking space.

The positional relation determination unit 114 acquires the display image data generated by the display image generation unit 110. The positional relation determination unit 114 determines the positional relation between the marked-off space boundary extracted by the extraction unit 112 and each assisting line on the display image data. Then, the positional relation determination unit 114 outputs positional relation data indicating a result of the determination of the positional relation to the display image generation unit 110.

Specifically, the positional relation determination unit 114 determines whether or not an assisting line is located on the outer side of the marked-off space boundary in the display image data. More specifically, the positional relation determination unit 114 determines whether or not there is an assisting line on the outer side of the marked-off space boundary in the width direction. Note that when an assisting line is located on the marked-off parking space side of the marked-off space boundary, the positional relation determination unit 114 determines that there is no assisting line on the outer side of the marked-off space boundary, that is, there is an assisting line on the inner side of the marked-off space boundary. On the other hand, when an assisting line is not located on the marked-off parking space side of the marked-off space boundary, the positional relation determination unit 114 determines that there is an assisting line on the outer side of the marked-off space boundary. For example, when there is an assisting line on the left side of the left marked-off space boundary of the marked-off parking space, the positional relation determination unit 114 determines that this assisting line is located on the outer side of the marked-off space boundary. Similarly, when there is an assisting line on the right side of the right marked-off space boundary of the marked-off parking space, the positional relation determination unit 114 determines that this assisting line is located on the outer side of the marked-off space boundary.

The display control unit 120 receives the display image data from the display image generation unit 110. Then, the display control unit 120 performs control so that an image based on the display image data generated by the display image generation unit 110 is displayed in the display unit 50. Note that as will be described later, the display image generation unit 110 performs a process so as to make clarity of the display of assisting lines located on the outer side of the marked-off space boundary lower than clarity of the display of assisting lines located on the inner side of the marked-off space boundary. Therefore, in the display image data displayed under the control of the display control unit 120, the clarity of the plurality of assisting lines may be changed according to the positional relation between them and the marked-off space boundary.

Figure 4:
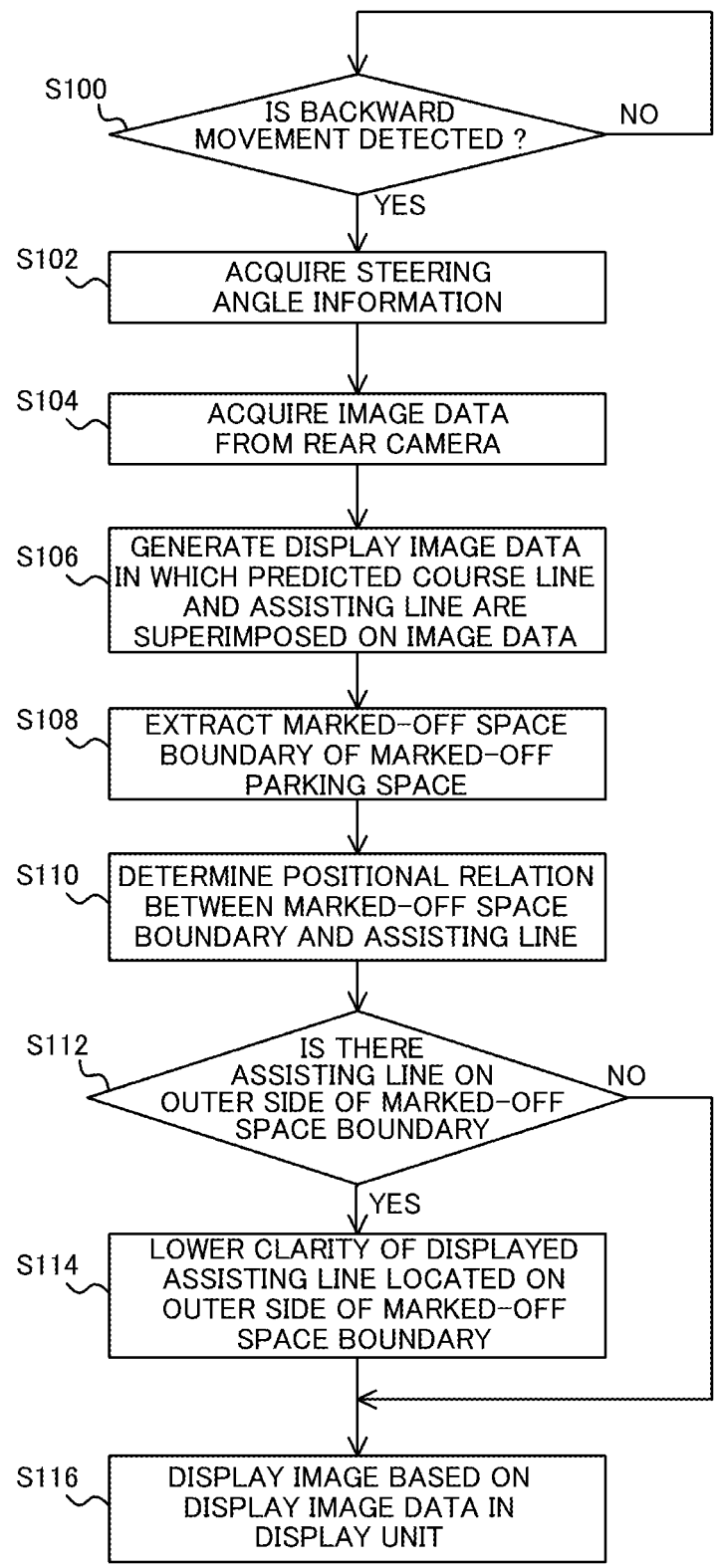
FIG. 4 is a flowchart showing a display control method performed by the display control apparatus according to the first embodiment.
Figure 5:
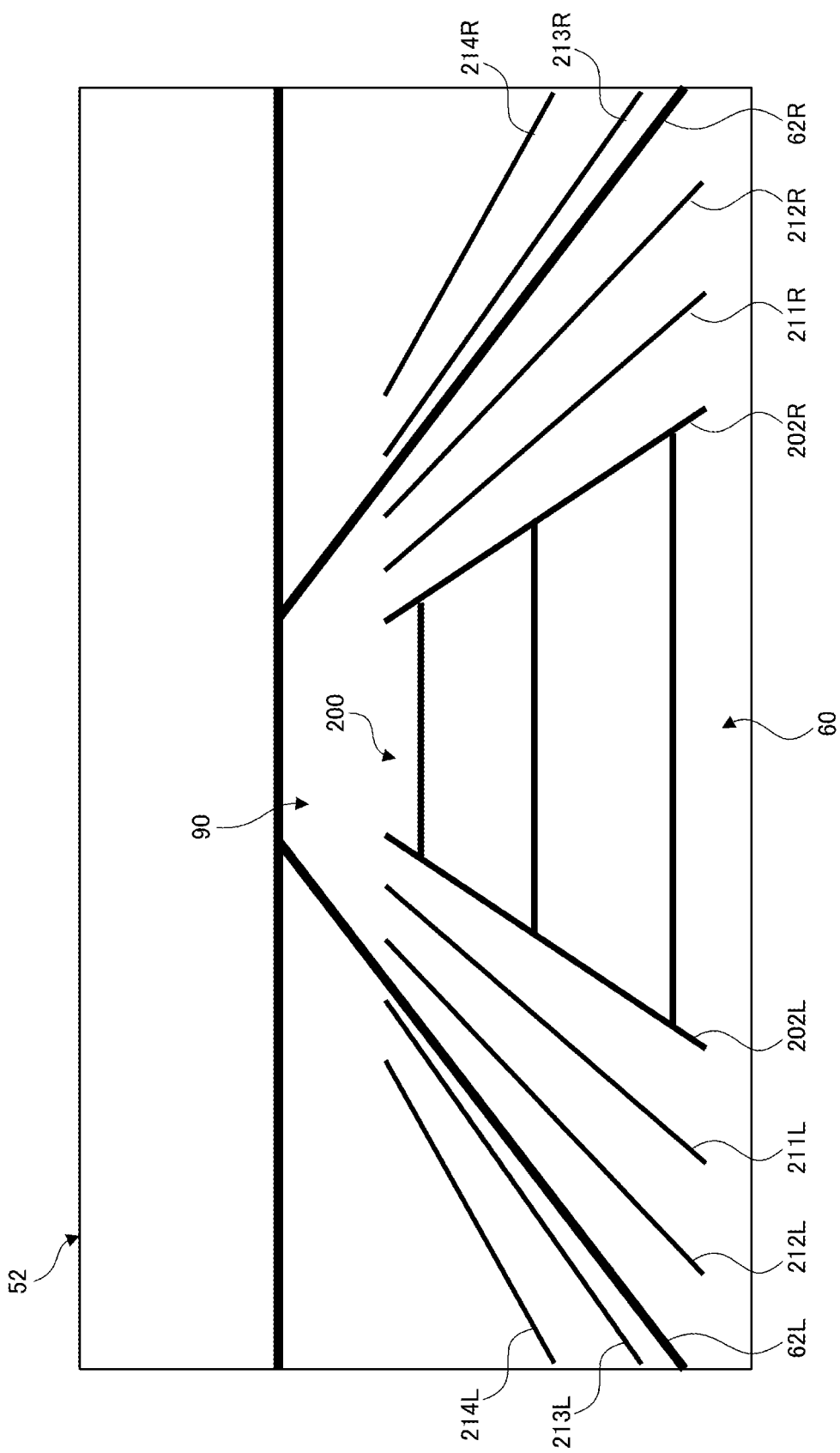
FIG. 5 shows an example of an image based on display image data generated by a display image generation unit according to the first embodiment.
Figure 6:
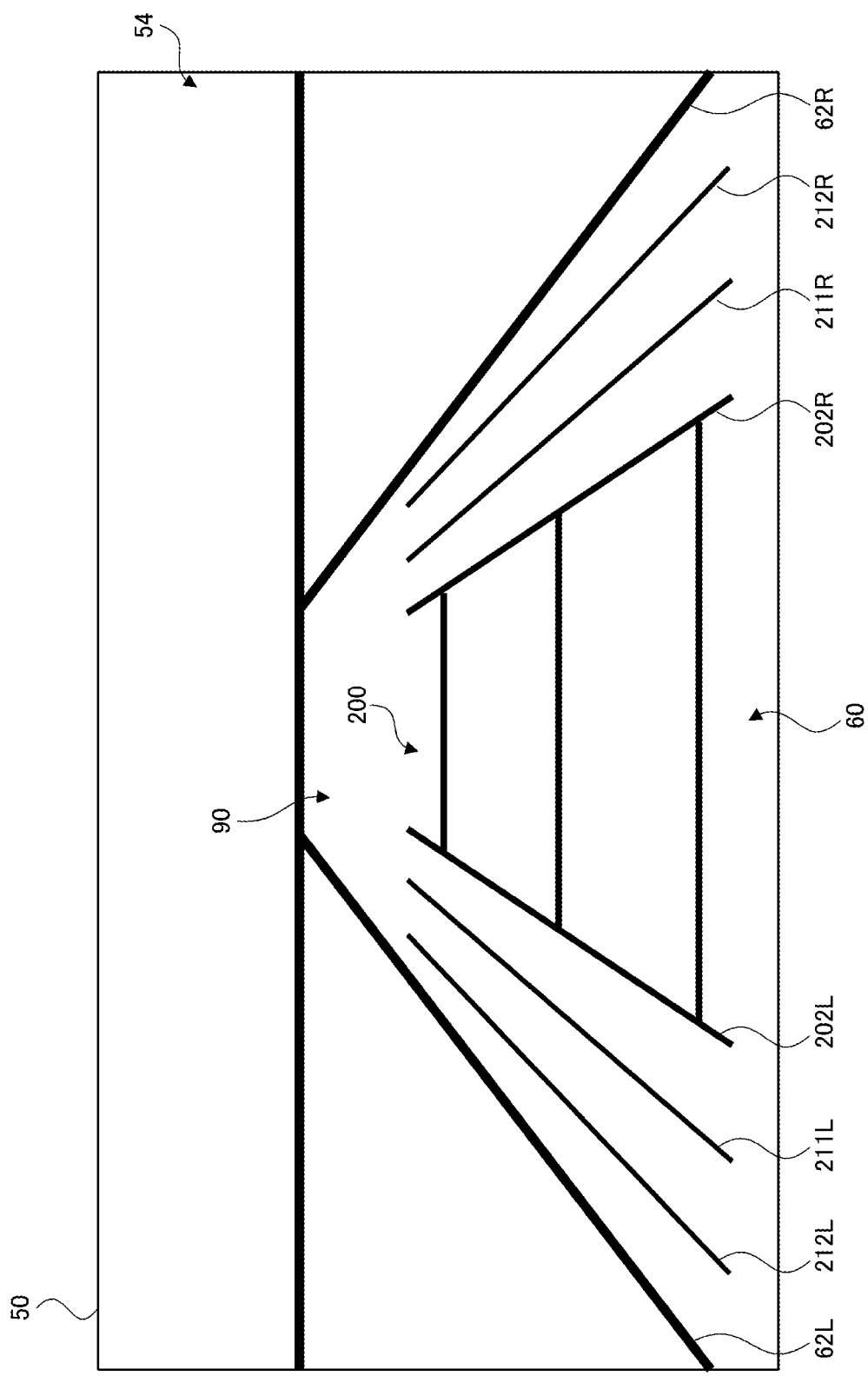
FIG. 6 shows a display image displayed in a display unit for the image shown in FIG. 5.
Figure 7:
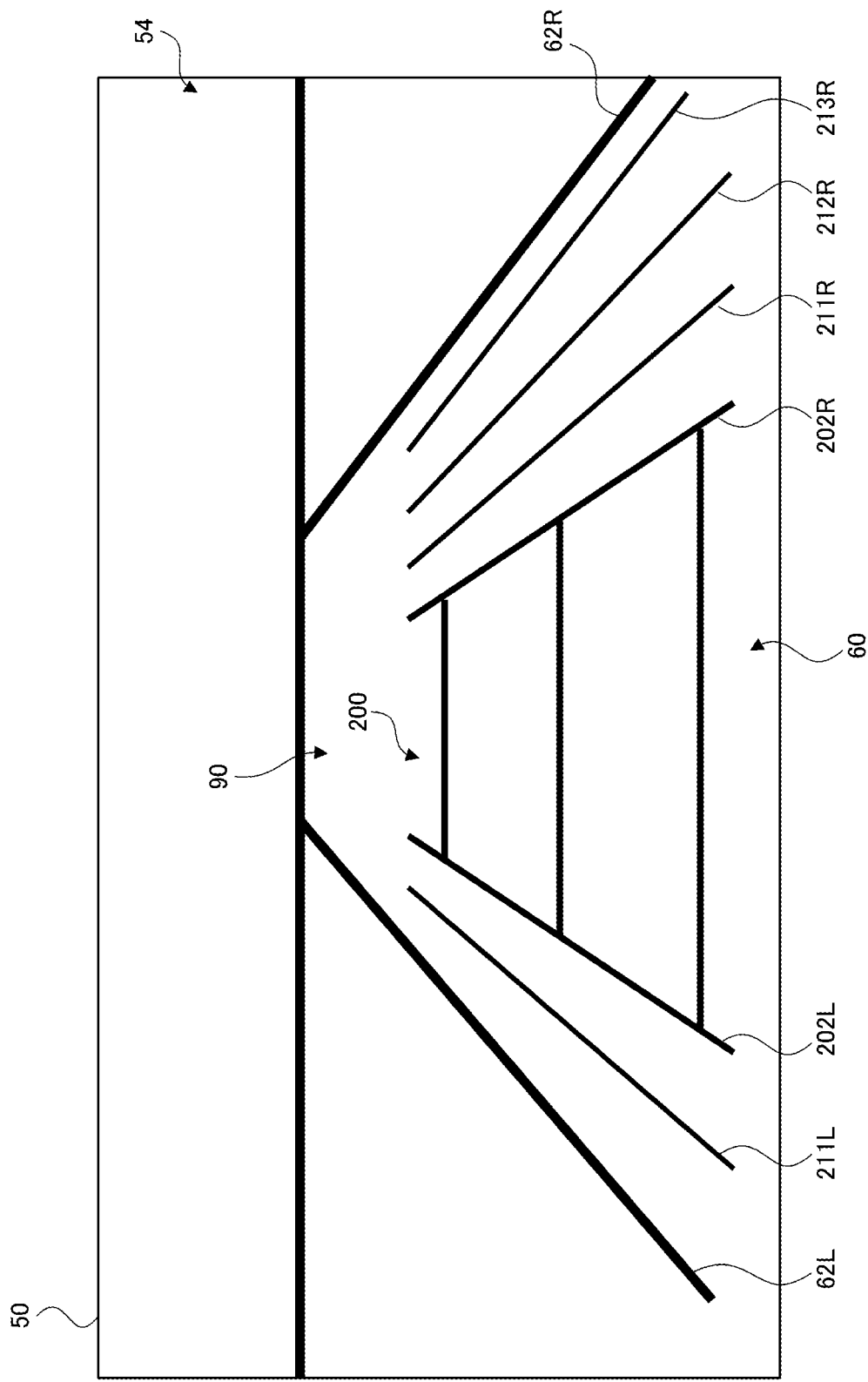
FIG. 7 shows an example of a display image displayed in a display unit in a state in which a vehicle is closer to one side of a marked-off parking space.
Figure 8:
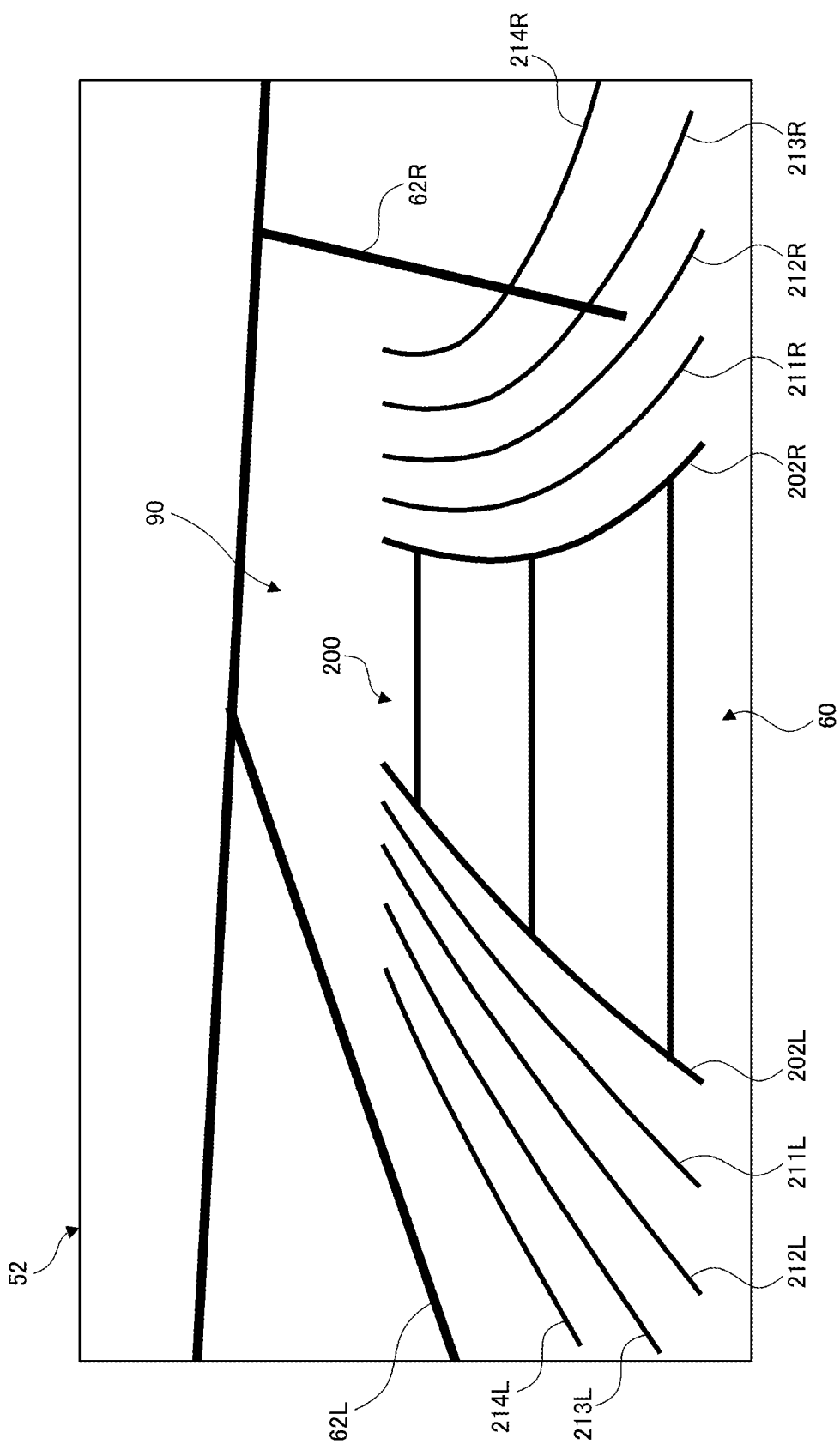
FIG. 8 shows an example of an image based on display image data generated by a display image generation unit according to the first embodiment.
Figure 9:
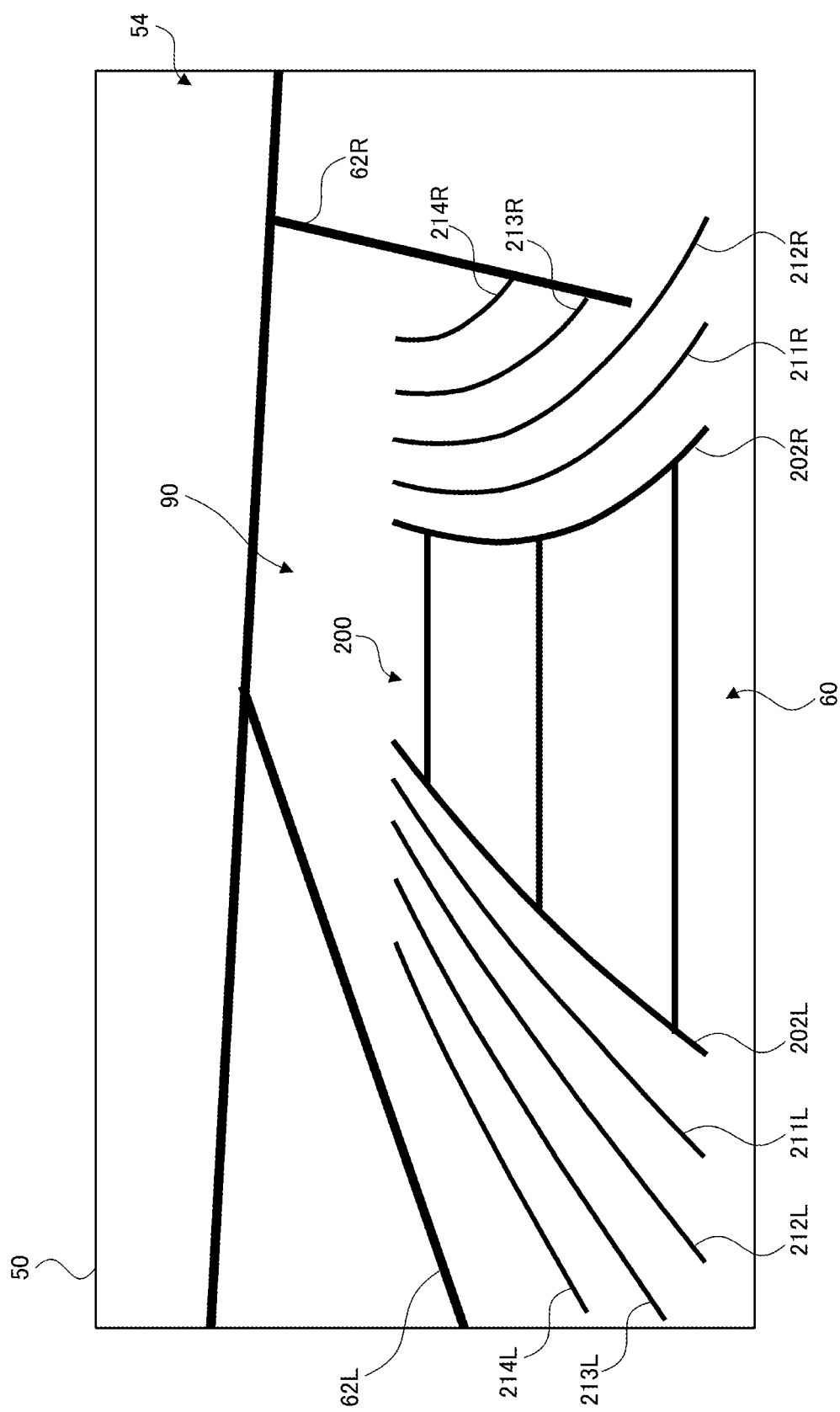
FIG. 9 shows a display image displayed in a display unit for the image shown in FIG. 8.
Figure 10:
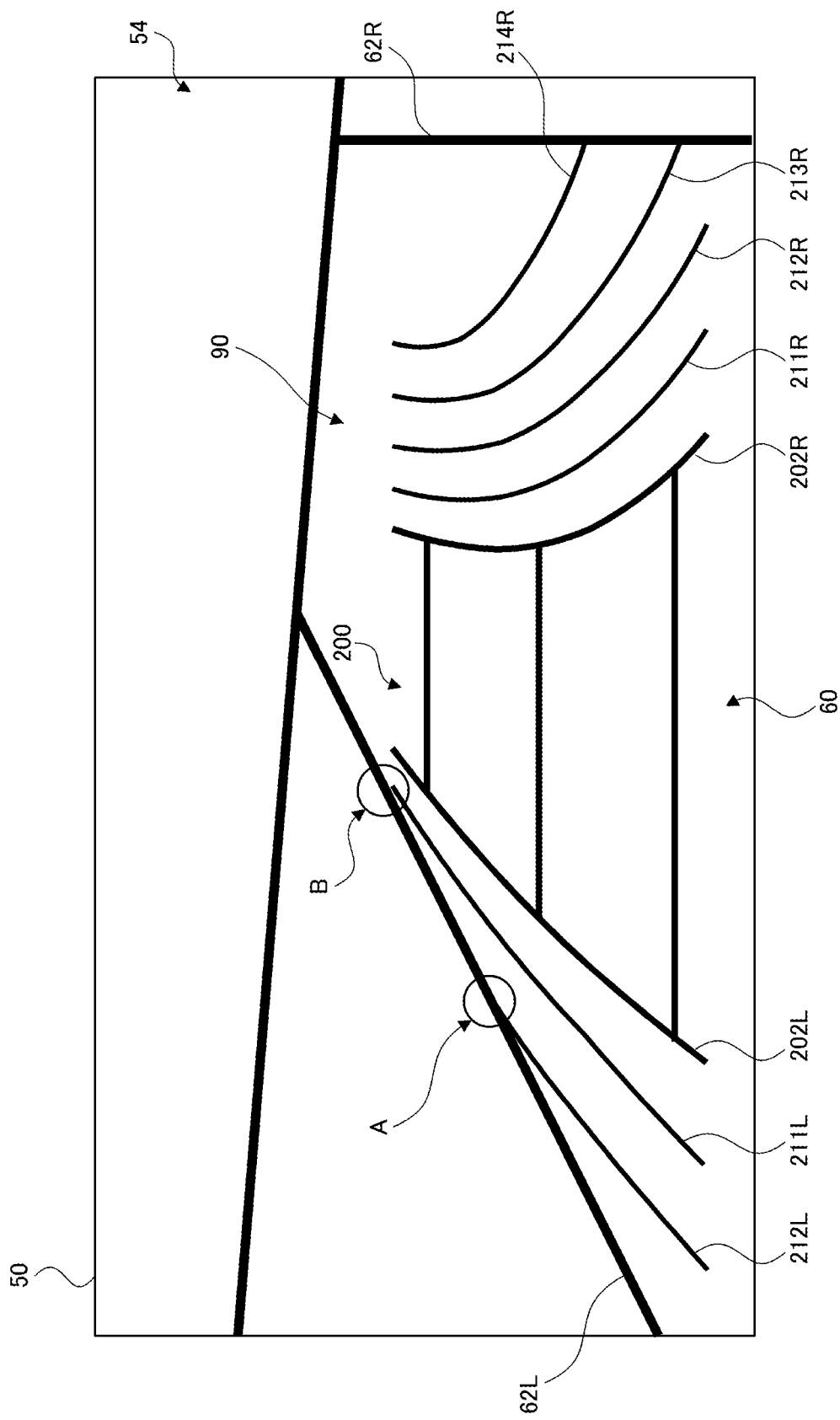
FIG. 10 shows an example of a display image displayed in a display unit in a state in which a vehicle is closer to one side of a marked-off parking space.

FIG. 4 is a flowchart showing a display control method performed by the display control apparatus 100 according to the first embodiment. Further, FIGS. 5 to 7 are examples of images related to display image data generated by the display image generation unit 110 when the vehicle 1 moves backward in a straight line. Further, FIGS. 8 to 10 are examples of images related to display image data generated by the display image generation unit 110 when the vehicle 1 moves backward at a certain steering angle. The flowchart shown in FIG. 4 is explained hereinafter by using the examples shown in FIGS. 5 to 7.

When the backward movement detecting unit 102 detects a backward movement of the vehicle 1 (YES at step S100), the steering information acquisition unit 104 acquires steering angle information indicating a steering angle of the vehicle 1 (step S102). Further, the image data acquisition unit 106 acquires image data from the rear camera 2 (step S104).

The display image generation unit 110 generates display image data in which a pair of predicted course lines and a plurality of assisting lines are superimposed on the image data acquired by the image data acquisition unit 106 (step S106). FIG. 5 shows an example of an image 52 displayed based on the display image data generated by the display image generation unit 110 according to the first embodiment. Note that the image 52 shown in FIG. 5 is an image before being displayed in the display unit 50. Further, FIG. 5 shows an example in which the vehicle 1 moves backward in a straight line to substantially the center in the width direction of the marked-off parking space.

The image 52 includes a marked-off parking space 60, a marked-off space boundary 62L located on the left side of the marked-off parking space 60, and a marked-off space boundary 62R located on the right side of the marked-off parking space 60. Data indicating the marked-off parking space 60 and the marked-off space boundaries 62L and 62R is included in the image data acquired by the image data acquiring section 106. Note that in the following description, when an explanation is given without differentiating between the marked-off parking space boundaries 62L and 62R, they are simply referred to as the marked-off space boundary(ies) 62. The above-described matter also applies to predicted course lines and assisting lines described below.

Further, the image 52 also includes guidelines 200 including a predicted course line 202L on the left side and a predicted course line 202R on the right side. That is, the guidelines 200 include a pair of predicted course lines 202. The guidelines 200 are drawn according to the steering angle information by the display image generation unit 110. Note that since the image 52 is a rear-view image of the vehicle 1, the predicted course line 202L corresponds to a predicted trajectory of the right end of the vehicle 1 and the predicted course line 202R corresponds to a predicted trajectory of the left end of the vehicle 1.

Further, the image 52 includes assisting lines 211L, 212L, 213L and 214L located on the left side of the predicted course line 202L. Similarly, the image 52 includes assisting lines 211R, 212R, 213R and 214R located on the right side of the predicted course line 202R. The assisting lines 211L, 212L, 213L and 214L are drawn according to the shape of the predicted course line 202L by the display image generation unit 110. Further, the assisting lines 211R, 212R, 213R and 214R are drawn according to the shape of the predicted course line 202R by the display image generation unit 110. Note that four assisting lines are arranged on each side of the guidelines 200. However, the number of assisting lines is not limited to four and may be any number no less than two.

Note that among the assisting lines 211L, 212L, 213L and 214L, the assisting line 211L is closest to the predicted course line 202L. Further, the assisting line 212L is the second closest to the predicted course line 202L and the assisting line 213L is the third closest to the predicted course line 202L. Further, the assisting line 214L is the fourth closest to the predicted course line 202L. Similarly, among the assisting lines 211R, 212R, 213R and 214R, the assisting line 211R is closest to the predicted course line 202R. Further, the assisting line 212R is the second closest to the predicted course line 202R and the assisting line 213R is the third closest to the predicted course line 202R. Further, the assisting line 214R is the fourth closest to the predicted course line 202R.

Note that the assisting lines 211L, 212L, 213L and 214L are drawn so that they appear parallel to the predicted course line 202L on the road surface 90 behind the vehicle 1 on the image data corresponding to the image 52. Similarly, the assisting lines 211R, 212R, 213R and 214R are drawn so that they appear parallel to the predicted course line 202R on the road surface 90 behind the vehicle 1 on the image data corresponding to the image 52. Note that above-described matter also applies to other examples like one shown in FIG. 8.

That is, the display image generation unit 110 superimposes assisting lines that appear along the predicted course lines 202 on the road surface 90 behind the vehicle 1 on the display image data. Note that the assisting lines may be drawn so that they appear roughly parallel to the predicted course lines 202 on the road surface 90 behind the vehicle 1 on the image data. That is, they do no need to be drawn exactly parallel to the predicted course lines 202. Note that the term "parallel" in this specification means that the distance between the assisting lines and the predicted course lines 202 is roughly constant on the road surface 90 behind the vehicle 1 on the image data. In the image in the display unit 50, the predicted course lines 202 and the assisting lines are drawn in perspective, i.e., are drawn so that the distance between them becomes shorter as the distance from the vehicle 1 increases.

As described above, since the assisting lines are drawn so that they appear parallel to the predicted course lines 202 on the road surface 90 behind the vehicle 1 on the image data, the driver can intuitively recognize a predicted position in the width direction in the marked-off parking space 60. That is, when the vehicle 1 moves backward at the current steering angle, the driver can easily recognize where in the width direction in the marked-off parking space 60 the vehicle 1 will move to.

Further, the assisting lines 211L, 212L, 213L and 214L are drawn so that they are arranged at regular intervals on the road surface 90 behind the vehicle 1 on the image data corresponding to the image 52. Similarly, the assisting lines 211R, 212R, 213R and 214R are drawn so that they are arranged at regular intervals on the road surface 90 behind the vehicle 1 on the image data corresponding to the image 52. That is, the display image generation unit 110 superimposes a plurality of assisting lines so that they are arranged at regular intervals on the road surface 90 behind the vehicle 1 on the display image data. Note that above-described matter also applies to other examples like the one shown in FIG. 8.

For example, the assisting lines may be drawn at intervals of 30 cm on the road surface 90 behind the vehicle 1 on the image data corresponding to the image 52. In this case, the assisting line 211L may be drawn so that the distance between the predicted course line 202L and the assisting line 211L becomes 30 cm on the road surface 90 behind the vehicle 1 on the display image data. Similarly, the assisting line 211R may be drawn so that the distance between the predicted course line 202R and the assisting line 211R becomes 30 cm on the road surface 90 behind the vehicle 1 on the display image data. Note that the interval between the assisting lines can be changed as appropriate by a user such as a driver.

As described above, since the interval between adjacent assisting lines is constant, the plurality of assisting lines function as divisions of a scale or the like. Therefore, to some extent, the driver can quantitatively recognize distances between the left and right side surfaces of the vehicle 1 and the marked-off parking space boundaries 62 or surrounding objects at the time when the vehicle 1 has moved backward at the current steering angle. For example, in an example where the interval between adjacent assisting lines is 30 cm, the driver can easily recognize that when the marked-off space boundary 62L is located near the assisting line 212L and the vehicle 1 moves backward at the current steering angle, the distance between the vehicle 1 and the marked-off space boundary 62L will become about 60 cm.

The extraction unit 112 extracts marked-off space boundaries in the width direction of the marked-off parking space from the image data acquired by the image data acquisition section 106 (step S108). In the example shown in FIG. 5, the extraction unit 112 extracts the marked-off space boundaries 62L and 62R from the image data for the image 52.

Next, the positional relation determination unit 114 determines a positional relation between the marked-off parking space boundaries extracted by the extraction unit 112 and the assisting lines on the display image data (step S110). In the example shown in FIG. 5, the positional relation determination unit 114 determines a positional relation between the marked-off space boundary 62L and the assisting lines 211L, 212L, 213L and 214L. Specifically, the positional relation determination unit 114 determines whether or not each of the assisting lines 211L, 212L, 213L and 214L is located on an outer side of the marked-off space boundary 62L. Similarly, the positional relation determination unit 114 determines a positional relation between the marked-off space boundary 62R and the assisting lines 211R, 212R, 213R and 214R. Specifically, the positional relation determination unit 114 determines whether or not each of the assisting lines 211R, 212R, 213R and 214R is located on an outer side of the boundary 62R.

When there is no assisting line on the outer side of the marked-off parking space boundaries (NO in step S112), a process in a step S114, which is described below, is not performed and the process proceeds to a step S116. On the other hand, when there is an assisting line on the outer side of the marked-off parking space boundaries (YES in S112), the display image generation unit 110 draws the assisting lines so that clarity of the display of assisting lines located on the outer side of the marked-off parking space boundaries becomes lower than clarity of the display of assisting lines located on the inner side of the marked-off parking space boundaries (step S114).

In the example shown in FIG. 5, the assisting lines 211L and 212L are located on the inner side of the marked-off space boundary 62L and the assisting lines 213L and 214L are located on the outer side of the marked-off space boundary 62L. Therefore, the display image generation unit 110 draws the assisting lines so that clarity of the display of the assisting lines 213L and 214L becomes lower than clarity of the display of the assisting lines 211L and 212L. Similarly, the assisting lines 211R and 212R are located on the inner side of the marked-off space boundary 62R and the assisting lines 213R and 214R are located on the outer side of the marked-off space boundary 62R. Therefore, the display image generation unit 110 draws the assisting lines so that clarity of the display of the assisting lines 213R and 214R becomes lower than clarity of the display of the assisting lines 211R and 212R.

The display control unit 120 displays an image based on the display image data generated by the display image generation unit 110 in the display unit 50 (step S116). FIG. 6 shows a display image 54 displayed for the image 52 shown in FIG. 5 in the display unit 50. In the display image 54 shown in FIG. 6, the assisting lines 213L and 214L and the assisting lines 213R and 214R are not displayed. In this way, by lowering the clarity of the display of assisting lines located on the outer side of the marked-off parking space boundaries, the driver can appropriately recognize the position of the vehicle 1 in the width direction in the marked-off parking space. Specifically, the closer the vehicle 1 moves to the marked-off space boundary 62, the more the number of assisting lines located on the side of that marked-off space boundary 62 decreases. Therefore, by viewing the display unit 50, the driver can easily and appropriately recognize that the vehicle 1 is getting closer to the side of the marked-off space boundary 62 on which the number of corresponding assisting lines is decreasing. Further, the driver can easily and appropriately recognize that the smaller the number of the assisting lines is, the closer the vehicle 1 is to the side of the marked-off space boundary 62.

Further, if a plurality of assisting lines are displayed on the left and right sides of one marked-off space boundary 62 in the display unit 50, it is difficult for the driver to visually recognize the marked-off space boundary 62. Therefore, by lowering clarity of assisting lines located on the outer side of the marked-off space boundary 62, the driver can easily visually recognize the marked-off space boundary 62 in the display unit 50.

Note that in the example shown in FIG. 6, the number of assisting lines on the left side of the predicted course line 202L and the number of assisting lines on the right side of the predicted course line 202R are both two. Therefore, by viewing the display unit 50, the driver can easily recognize that the vehicle 1 is moving backward to substantially the center in the width direction in the marked-off parking space.

FIG. 7 shows an example of the display image 54 displayed in the display unit 50 in a state in which the vehicle 1 is closer to one side of the marked-off parking space 60. FIG. 7 shows the display image 54 in a case where the vehicle 1 is moving backward while being positioned closer to the left side of the marked-off parking space 60. In this case, since the distance between the predicted course line 202L and the marked-off space boundary 62L becomes shorter than that in the example shown in FIG. 5, the assisting line 212L as well as the assisting lines 213L and 214L are located on the outer side of the marked-off space boundary 62L. Therefore, the display image generation unit 110 draws the assisting lines so that clarity of the display of the assisting lines 212L, 213L and 214L becomes lower than clarity of the display of the assisting line 211L. In the example shown in FIG. 7, the display image generation unit 110 erases the display of the assisting lines 212L, 213L and 214L, and maintains the clarity of the display of the assisting line 211L unchanged.

Meanwhile, since the distance between the predicted course line 202R and the marked-off space boundary 62R becomes longer than the distance in the example shown in FIG. 5, the assisting line 213R as well as the assisting lines 211R and 212R is located on the inner side of the marked-off space boundary 62R. That is, only the assisting line 214R is located on the outer side of the marked-off space boundary 62R. Therefore, the display image generation unit 110 draws the assisting lines so that clarity of the display of the assisting line 214R becomes lower than clarity of the display of the assisting lines 211R, 212R and 213R. In the example shown in FIG. 7, the display image generation unit 110 erases the display of the assisting line 214R and maintains the clarity of the display of the assisting lines 211R, 212R and 213R unchanged.

As a result, as shown in FIG. 7, in the display image 54 displayed in the display unit 50, the number of assisting lines on the left side of the predicted course line 202L becomes one and the number of assisting lines on the right side of the predicted course line 202R becomes three. Therefore, by viewing the display unit 50, the driver can recognize that the number of assisting lines on the side of the marked-off space boundary 62L is smaller than that on the side of the marked-off space boundary 62R. Accordingly, by viewing the display unit 50, the driver can easily and appropriately recognize that the vehicle 1 is closer to the side of the marked-off space boundary 62L.

Further, when the interval between adjacent assisting lines is 30 cm, the driver can easily recognize that the distance between the marked-off space boundary 62L and the vehicle 1 is no shorter than 30 cm and shorter than 60 cm. Therefore, the driver can appropriately recognize the position of the vehicle in the width direction in the marked-off parking space at the time when the vehicle has moved backward.

Next, a case in which the vehicle 1 moves backward at a certain steering angle is described. FIG. 8 shows an example of an image 52 displayed based on display image data generated by the display image generation unit 110 according to the first embodiment. Note that the image 52 shown in FIG. 8 relates to the display image data generated in the above-described process in the step S106. Therefore, the image 52 shown in FIG. 8 is an image before being displayed in the display unit 50. Further, FIG. 8 shows a case in which the vehicle 1 is moving backward at a certain steering angle in roughly the center in the width direction in the marked-off parking space.

Similarly to the example shown in FIG. 5, the image 52 shown in FIG. 8 includes a marked-off parking space 60, a marked-off space boundary 62L, and a marked-off space boundary 62R. Further, the image 52 shown in FIG. 8 includes guidelines 200 including a predicted course line 202L and a predicted course line 202R. In the example shown in FIG. 8, the display image generation unit 110 draws the predicted course lines 202L and 202R so that they become curved lines conforming to a steering angle indicated by steering angle information. The curvature of the curved lines increases as the steering angle increases.

Further, similarly to the example shown in FIG. 5, the image 52 shown in FIG. 8 includes assisting lines 211L, 212L, 213L and 214L located on the left side of the predicted course line 202L. Similarly, the image 52 shown in FIG. 8 includes assisting lines 211R, 212R, 213R and 214R located on the right side of the predicted course line 202R. In the example shown in FIG. 8, the display image generation unit 110 draws the assisting lines 211L, 212L, 213L and 214L as curved lines according to the curved shape of the predicted course line 202L. Similarly, the display image generation unit 110 draws the assisting lines 211R, 212R, 213R and 214R as curved lines according to the curved shape of the predicted course line 202R. As a result, the assisting lines are drawn so that they appear parallel to the predicted course lines 202.

Further, in the example shown in FIG. 8, the positional relation determination unit 114 determines a positional relation between the marked-off space boundary 62L and the assisting lines 211L, 212L, 213L and 214L in the above-described process in the step S110. Similarly, the positional relation determination unit 114 determines a positional relation between the marked-off space boundary 62R and the assisting lines 211R, 212R, 213R and 214R. Further, the positional relation determination unit 114 determines that the assisting lines 213R and 214R intersect the marked-off space boundary 62R. Therefore, in the above-described process in the step S114, the display image generation unit 110 draws the assisting lines so that clarity of the display of parts of the assisting lines 213R and 214R located on the outer side of the marked-off space boundary 62R is lowered.

FIG. 9 shows a display image 54 displayed for the image 52 shown in FIG. 8 in the display unit 50. In the display image 54 shown in FIG. 9, the parts of the assisting lines 213R and 214R located on the outer side of the marked-off space boundary 62R are not displayed. Meanwhile, the other assisting lines are displayed. Therefore, the driver can recognize that the vehicle 1 is relatively close to the marked-off space boundary 62R on the front side of the marked-off parking space 60.

FIG. 10 shows an example of a display image 54 displayed in the display unit 50 in a state in which the vehicle 1 is closer to one side of the marked-off parking space 60. FIG. 10 shows the display image 54 in a case the vehicle 1 is moving backward at a certain steering angle while being positioned closer to the left side of the marked-off parking space 60. In this case, since the distance between the predicted course line 202L and the marked-off space boundary 62L becomes shorter than that in the example shown in FIG. 8, the assisting lines 213L and 214L are located on the outer side of the marked-off space boundary 62L. Therefore, the display image generation unit 110 draws the assisting lines so as to erase the display of the assisting lines 213L and 214L. Meanwhile, the assisting lines 211R, 212R, 213R and 214R are displayed on the right side of the predicted course line 202R.

Further, in the example shown in FIG. 10, the assisting line 212L intersects the marked-off space boundary 62L. Therefore, the display image generation unit 110 draws the assisting lines so that clarity of a part of the display of the assisting line 212L located on the outer side of the marked-off space boundary 62L is lowered. Therefore, as shown in FIG. 10, while the part of the assisting line 212L located on the front side of an intersection A between the assisting line 212L and the marked-off space boundary 62L is displayed, the part of the assisting line 212L located on the rear side of the intersection A is not displayed. Therefore, when the interval between adjacent assisting lines is 30 cm, the driver can recognize that when the vehicle 1 moves backward to a place corresponding to the intersection A at the current steering angle, the vehicle 1 will move closer to the marked-off space boundary 62L to a place 60 cm away therefrom. Further, at a point B, the assisting line 211L is close to the marked-off space boundary 62L. Therefore, the driver can recognize that when the vehicle 1 moves backward to a place corresponding to the intersection B at the current steering angle, the vehicle 1 will move closer to the marked-off space boundary 62L to a place 30 cm away therefrom. Therefore, the driver can appropriately recognize the position of the vehicle in the width direction in the marked-off parking space at the time when the vehicle has moved backward. As a result, the driver can easily recognize at which point in the backward movement of the vehicle 1 the driver should change the steering angle.

Figure 11:
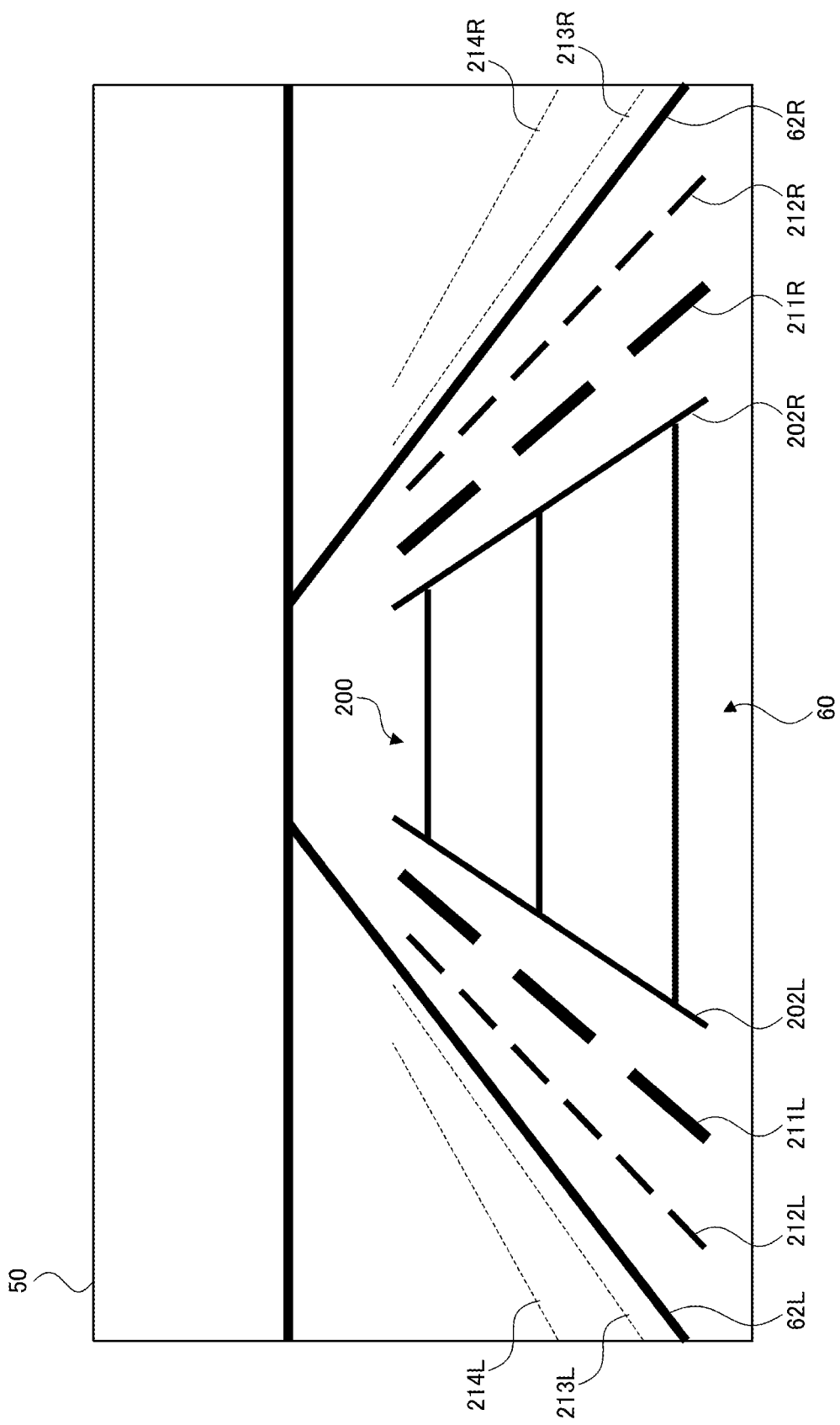
FIG. 11 shows another example of a displaying format for assisting lines.

FIG. 11 shows another example of a displaying format for assisting lines. In the example shown in FIG. 6 and the like, assisting lines located on the outer side of the marked-off space boundary 62 are erased as an example of the displaying format for assisting lines. However, the displaying format for assisting lines is not limited to this example. As shown in FIG. 11, the display image generation unit 110 may display assisting lines 213L, 214L, 213R and 214R located on the outer side of the marked-off space boundary 62 as dotted lines. Further, the display image generation unit 110 may make darkness of assisting lines located on the outer side of the marked-off space boundary 62 lighter than darkness of assisting lines located on the inner side of the marked-off space boundary 62. Further, the display image generation unit 110 may make thickness of assisting lines located on the outer side of the marked-off space boundary 62 smaller than thickness of assisting lines located on the inner side of the marked-off space boundary 62.

As described above, by leaving the assisting lines located on the outer side of the marked-off space boundary 62 un-erased, the driver can easily recognize the distance from the vehicle 1 to an object located on the outer side of the marked-off space boundary 62. For example, when there is another vehicle next to the marked-off parking space 60 in which the drive intends to part the vehicle 1, the driver can easily recognize the distance from the vehicle 1 to the other vehicle.

Further, the display image generation unit 110 may change the displaying format for the assisting lines from the displaying format for the predicted course lines 202. For example, as shown in FIG. 11, the display image generation unit 110 may display the predicted course lines 202 by solid lines and displays assisting lines by broken lines. Further, the display image generation unit 110 may change the color of the assisting lines from the color for the predicted course lines 202. Further, the display image generation unit 110 may change the thickness of assisting lines from the thickness of the predicted course lines 202. Further, the display image generation unit 110 may change the darkness of assisting lines from the darkness of the predicted course lines 202. By adopting such displaying formats, the driver can easily distinguish between the assisting lines and the predicted course lines 202.

Further, the display image generation unit 110 may change a displaying format for each of the assisting lines from those for other assisting lines. In such a case, the display image generation unit 110 may make assisting lines closer to the predicted course lines 202 more noticeable. For example, as shown in FIG. 11, the display image generation unit 110 may display assisting lines in such a manner that the closer the assisting line is to the predicted course line 202, the thicker the assisting line is made. Further, the display image generation unit 110 may display assisting lines in such a manner that the closer the assisting line is to the predicted course line 202, the more noticeable color the assisting line is displayed in. For example, the assisting line 211 may be displayed in red and the assisting line 212 may be displayed in orange. Further, the assisting line 213 may be displayed in yellow and the assisting line 214 may be displayed in blue.

By adopting such displaying formats, the driver can easily distinguish each assisting line from other assisting lines. Further, since an assisting line closer to the predicted course line 202 is displayed more noticeably, the driver can easily recognize the assisting line closer to the predicted course line 202. As a result, the driver can easily determine that, when there is an assisting line displayed in a noticeable displaying format near the marked-off space boundary 62, the vehicle 1 is located in a position closer to that marked-off space boundary 62 in the width direction in the marked-off parking space 60.

Second Embodiment

Next, a second embodiment is described. Note that configurations of a vehicle 1 and a display apparatus 40 according to the second embodiment are substantially similar to those according to the first embodiment shown in FIGS. 1 to 3 and therefore their descriptions are omitted.

Figure 12:
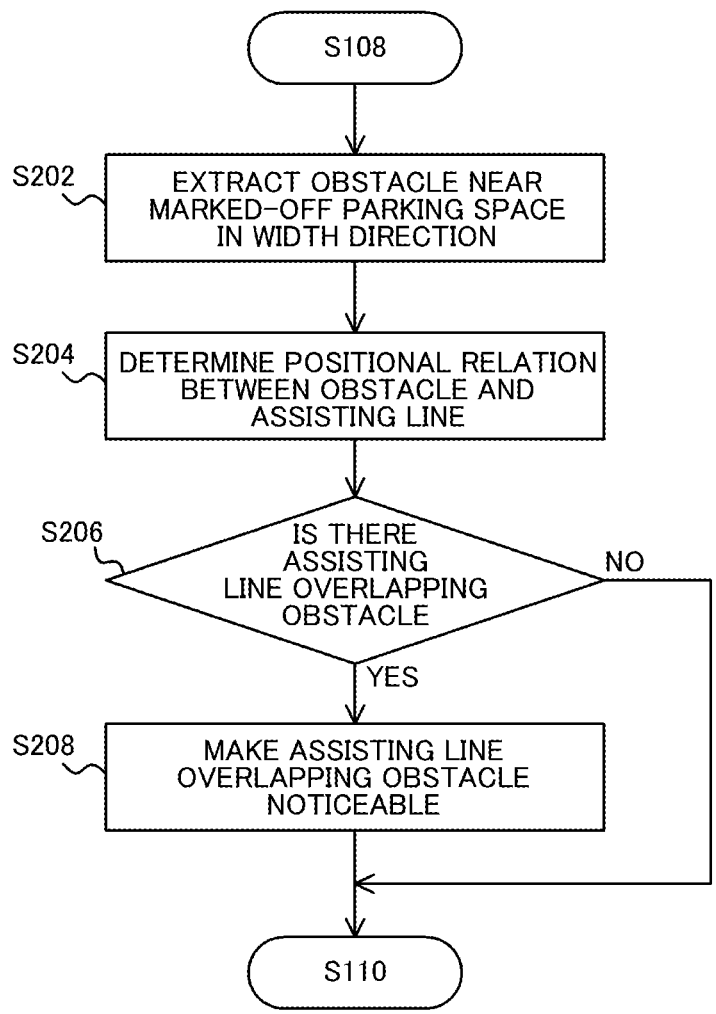
FIG. 12 is a flowchart showing processes according to a second embodiment.

FIG. 12 is a flowchart showing processes according to the second embodiment. The processes shown in FIG. 12 can be performed between the process in the step S108 and the process in the step S110 in the flowchart shown in FIG. 4. The extraction unit 112 extracts an obstacle located near the marked-off parking space in the width direction from the image data acquired by the image data acquisition unit 106 (step S202). The extraction of the obstacle can be performed by a method similar to the method for extracting a marked-off space boundary such as edge detection. Note that "the obstacle located near the marked-off parking space in the width direction" includes an obstacle displayed on the outer side of the marked-off space boundary in the image related to the image data. Further, when the marked-off space boundary is composed of an obstacle(s), it includes the obstacle(s) constituting the marked-off space boundary.

Next, the positional relation determination unit 114 determines a positional relation between the obstacle extracted by the extraction unit 112 and each assisting line on the display image data (step S204). Specifically, the positional relation determination unit 114 determines whether or not each assisting line overlaps the obstacle. When there is no assisting line that overlaps the obstacle (NO in step S206), a process in a step S208, which is described below, is not performed and the process shown in FIG. 12 is finished. On the other hand, when there is an assisting line that overlaps the obstacle (YES in step S206), the display image generation unit 110 displays the assisting lines in such a manner that assisting lines that overlap the obstacle are displayed more noticeably than those that do not overlap the obstacle (step S208). A specific example is described hereinafter.

Figure 13:
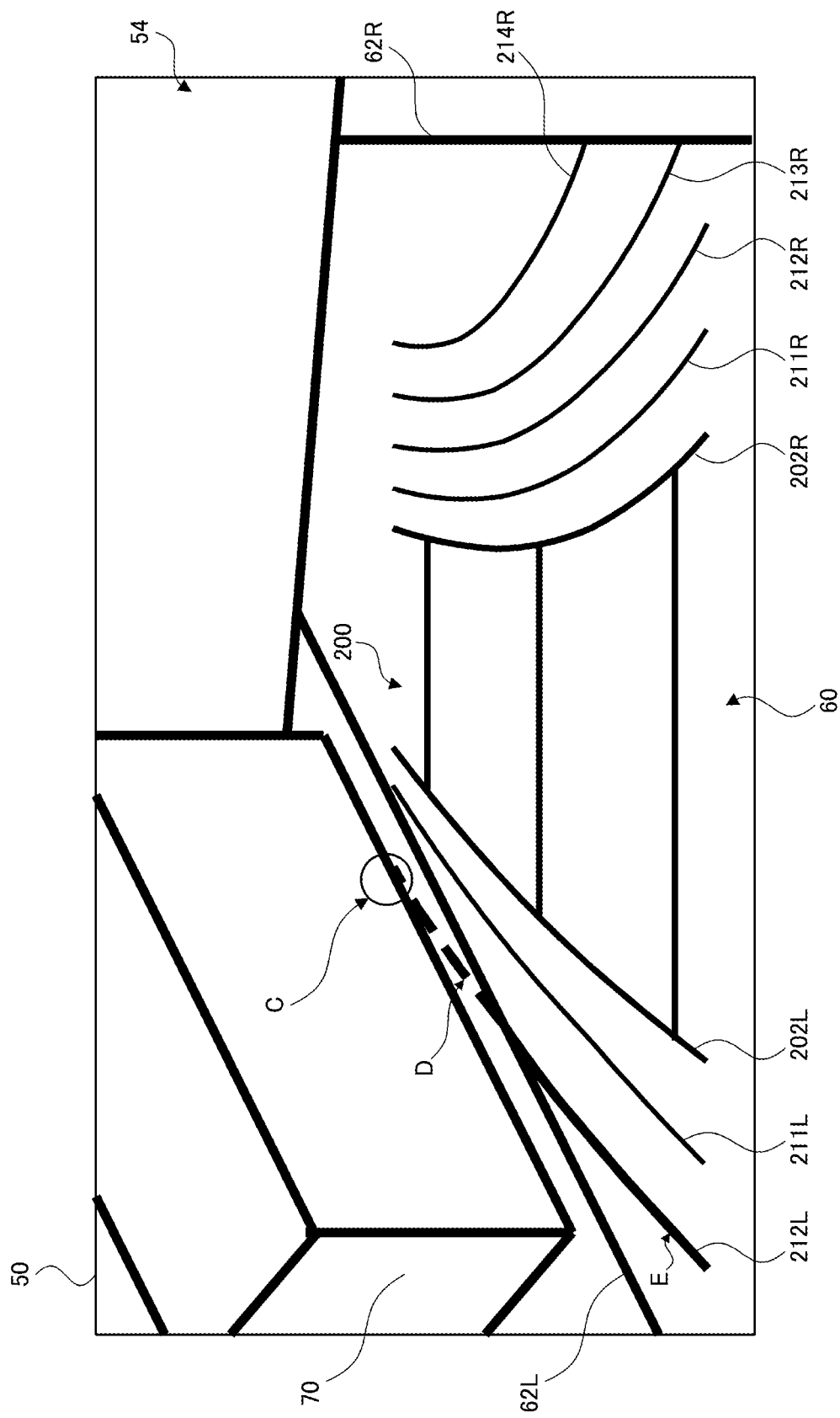
FIG. 13 shows an example of a state in which a display image according to the second embodiment is displayed in a display unit.

FIG. 13 shows an example of a state in which a display image 54 according to the second embodiment is displayed in the display unit 50. In the display image 54 shown in FIG. 13, for example, an obstacle 70 such as another vehicle is displayed on the outer side of the marked-off space boundary 62L, i.e., near the left side of the marked-off space boundary 62L. Further, as indicated by an arrow C, the assisting line 212L overlaps the obstacle 70. Therefore, the display image generation unit 110 displays the assisting line 212L more noticeably than the other assisting lines. For example, as shown in FIG. 13, the display image generation unit 110 may make the assisting line 212L thicker than the assisting line 211L. Further, the display image generation unit 110 may make a color of the assisting line 212L more noticeable than a color of the assisting line 211L. Further, the display image generation unit 110 may make the assisting line 212L blink. Note that similarly to the first embodiment, the display image generation unit 110 makes clarity of a part (indicated by an arrow D) of the displayed assisting line 212L located on the outer side of the marked-off space boundary 62L lower than clarity of a part (indicated by an arrow E) of the displayed assisting line 212L located on the inner side of the marked-off space boundary 62L.

When the marked-off space boundary is composed of parking marking-off lines, even if the vehicle 1 straddles the parking marking-off line, the vehicle 1 or another object is not be damaged. In contrast to this, if the vehicle 1 comes into contact with the obstacle 70, the vehicle 1 or the obstacle 70 could be damaged. Further, if the vehicle 1 is parked in the marked-off parking space 60 and is too close to the obstacle 70, a door of the vehicle 1 may collide with the obstacle 70 when the door is opened. Alternatively, if a passenger tries to prevent the door from coming into contact with the obstacle 70, the door could not be opened and closed enough to enable the passenger to get on or off the vehicle.

In contrast, as shown in the second embodiment, the driver can recognize the distance from the vehicle 1 to the obstacle 70 more easily by displaying assisting lines that overlap the obstacle 70 in a noticeable manner. As a result, the driver can operate the vehicle 1 more easily to avoid the above-described problem. In the example shown in FIG. 13, the driver can more easily recognize that when the vehicle 1 moves backward to the place corresponding to the place indicated by the arrow C, the vehicle 1 will move closer to the obstacle 70 to a place 60 cm away therefrom.

Note that in the first embodiment, although the displaying format of assisting lines close to the predicted course line 202 can be made noticeable, the displaying format of assisting lines that overlap the obstacle 70 may be changed from the displaying format for the assisting lines close to the predicted course line 202. For example, when the color of the assisting lines close to the predicted course line 202 is made more noticeable, the assisting lines that overlap the obstacle 70 may be made to blink. Further, when the thickness of the assisting lines close to the predicted course line 202 is increased, the color of the assisting lines that overlap the obstacle 70 may be more noticeable than the colors of other assisting lines. As a result, the driver can easily recognize the distance from the vehicle 1 to the marked-off space boundary and the distance from the vehicle 1 to the obstacle 70 while easily differentiating between these distances.

Third Embodiment

Next, a third embodiment is described. Note that the same reference numerals as those used in the above-described embodiments are assigned to substantially the same components as those described in the above-described embodiments.

Figure 14:
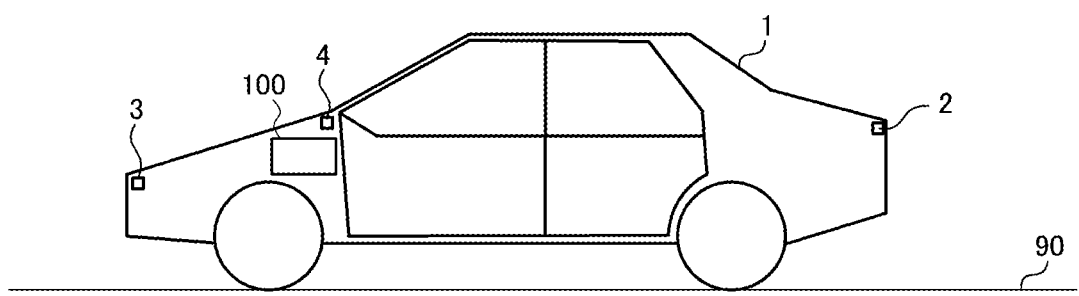
FIG. 14 shows a vehicle according to a third embodiment.

FIG. 14 shows a vehicle 1 according to the third embodiment. The vehicle 1 includes a rear camera 2, a front camera 3, side cameras 4, and a display control apparatus 100. The front camera 3 is installed in a front part of the vehicle 1 and shoots a front view of the vehicle 1 including a road surface 90. The side cameras 4 are installed on the left and right sides, respectively, of the vehicle 1 and shoot left and right views of the vehicle 1 including the road surface 90. Therefore, the rear camera 2, the front camera 3, and the side cameras 4 are cameras that shoot surroundings of the vehicle 1. Note that in the third embodiment, the front camera 3 and the side cameras 4 are not necessarily indispensable. Further, the vehicle 1 according to the third embodiment has an internal configuration similar to that shown in FIG. 2.

The display control apparatus 100 according to the third embodiment can be disposed in an arbitrary place of the vehicle 1. The display control apparatus 100 can be connected to a CAN. The display control apparatus 100 performs control so as to superimpose distance indicating lines indicating distances from the current position of the vehicle 1 or from a position of the vehicle 1 in the future on an image taken by the rear camera 2 or the like. Details will be described later. Note that the above-described matter also applies to other embodiments described later.

Figure 15:
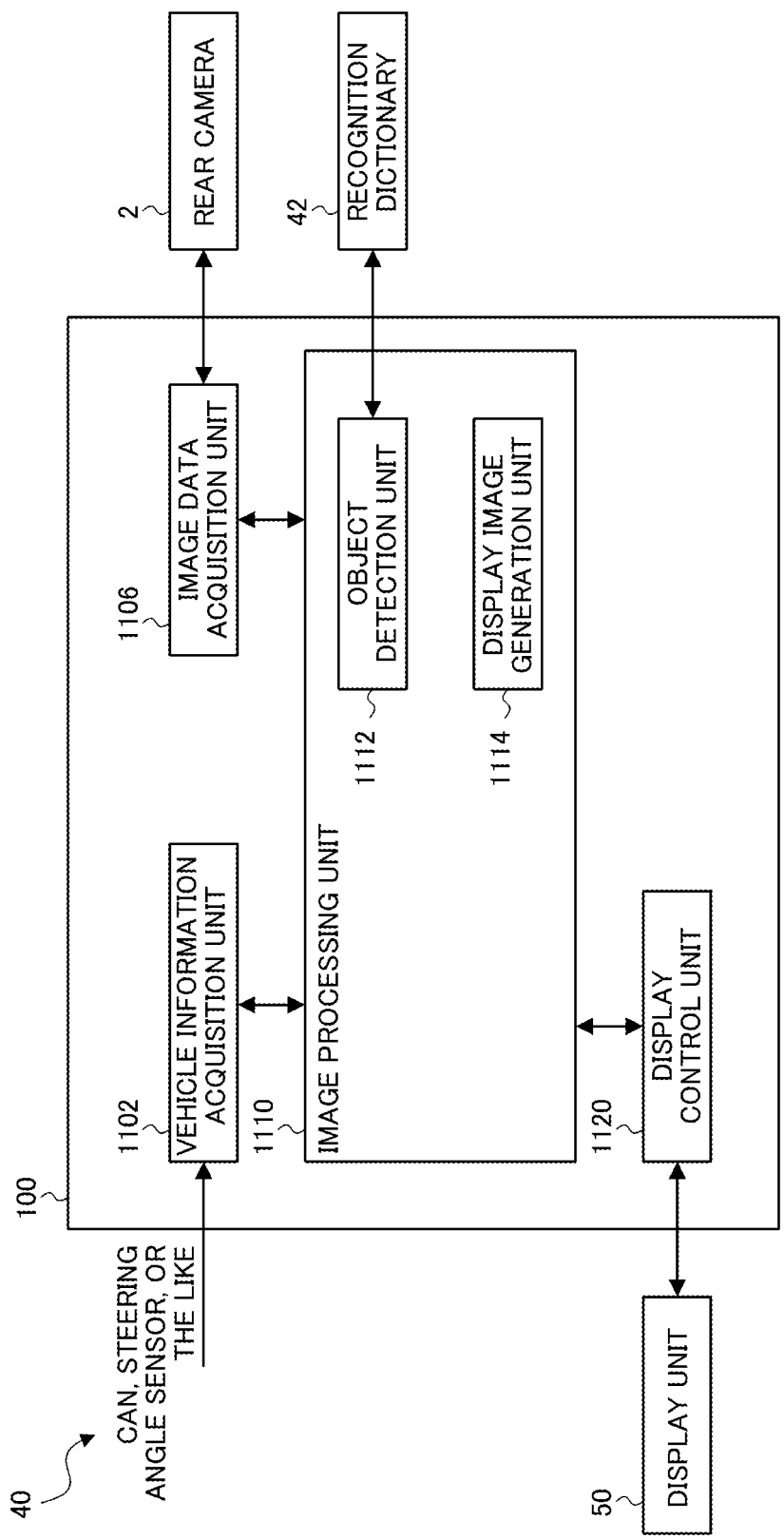
FIG. 15 shows a configuration of a display control apparatus and a display apparatus including the display control apparatus according to the third embodiment.

FIG. 15 shows a configuration of the display control apparatus 100 and a display apparatus 40 including the display control apparatus 100 according to the third embodiment. The display apparatus 40 includes the rear camera 2, a recognition dictionary 42, a display unit 50, and the display control apparatus 100. The display control apparatus 100 is connected to the rear camera 2, the recognition dictionary 42, and the display unit 50 so that the display control apparatus 100 can communicate with them.

The display control apparatus 100 includes a vehicle information acquisition unit 1102, an image data acquisition unit 1106, an image processing unit 1110, and a display control unit 1120. The image processing unit 1110 includes an object detection unit 1112 and a display image generation unit 1114. Note that at least one of or all the components of the display apparatus 40 according to the third embodiment may be incorporated into the vehicle 1, or may be removed from the vehicle 1 and be portable. The above-described matter also applies to other embodiments described later.

The recognition dictionary 42 is, for example, a storage device such as a memory. The recognition dictionary 42 stores dictionary data necessary for the object detection unit 1112 to detect an object from image data. The dictionary data is data that is used to recognize an object that defines a target position of the vehicle 1 from image data through an image recognition process. For example, the recognition dictionary 42 stores dictionary data related to objects such as parking frame lines, parking marking-off lines, curb stones, and obstacles such as other vehicles and walls as "objects that define the target position of the vehicle 1". Note that in the following description, when "the target position of the vehicle 1" is a marked-off parking space, i.e., when the vehicle 1 is to be parked within a marked-off parking space, "an object that defines the target position of the vehicle 1" is referred to as a marked-off space boundary which is a boundary of the marked-off parking space. In other words, similarly to the above-described embodiments, the "marked-off space boundary" may include the above-described parking frame lines, the parking marking-off lines, curb stones, and obstacles such as other vehicles and walls or the like.

The display control apparatus 100 according to the third embodiment includes a processor such as a CPU, a storage device such as a memory, a user interface, and various peripheral circuits. That is, the display control apparatus 100 has functions as a computer. Further, the display control apparatus 100 implements various components such as the vehicle information acquisition unit 1102, the image data acquisition unit 1106, the image processing unit 1110, and the display control unit 1120 by having the processor execute a program stored in the storage device.

The vehicle information acquisition unit 1102 acquires vehicle information related to an operation of the vehicle 1 from a CAN, a steering angle sensor, and the like. Specifically, the vehicle information acquisition unit 1102 acquires backward movement information, which is information indicating that a reverse gear is selected from the CAN or the like. Note that the vehicle information acquisition unit 1102 outputs this backward movement information to the image processing unit 1110.

Further, the vehicle information acquisition unit 1102 acquires steering angle information indicating a steering angle of wheels of the vehicle 1 by acquiring a signal from the CAN, the steering angle sensor, or the like. Note that the steering angle information includes information indicating a steering direction such as right or left in addition to the information indicating the steering angle. Note that the steering angle information may indicate a steering angle of the steering wheel 10. The vehicle information acquisition unit 1102 outputs the acquired steering angle information to the image processing unit 1110. In particular, the vehicle information acquisition unit 1102 acquires steering angle information when the vehicle 1 is at a standstill or moving backward.

The image data acquisition unit 1106 acquires image data from the rear camera 2. The image data acquisition unit 1106 outputs the acquired image data to the image processing unit 1110. Note that the image data is data indicating an image that is obtained by shooting a rear view of the vehicle 1 by the rear camera 2. Note that an image that is taken when the vehicle 1 is parked in a marked-off parking space through a backward movement may include an image showing the marked-off parking space and an image showing a marked-off space boundary that is a boundary of the marked-off parking space.

Further, similarly to the above-described embodiments, the marked-off parking space is a parking space in which the vehicle 1 can be parked. For example, the marked-off parking space may be partitioned by parking marking-off lines such as white lines drawn on the road surface 90. In this case, the marked-off space boundary, i.e., "the object that defines the target position of the vehicle 1" corresponds to the parking marking-off line drawn on the road surface 90. Further, the marked-off parking space may not be partitioned by the parking marking-off lines and may be partitioned by an obstacle(s) such as a wall(s). In this case, the marked-off space boundary, i.e., "the object that defines the target position of the vehicle 1" corresponds to the obstacle. Further, the marked-off parking space does not need to be physically partitioned and may be just a sufficient space to park the vehicle 1. In this case, the marked-off space boundary, i.e., "the object that defines the target position of the vehicle 1" corresponds to another vehicle or the like parked next to the parking space. Note that even in the case where the marked-off parking space is partitioned by the parking marking-off line, there is a case where another vehicle parked in the next parking space jut out the parking marking-off line. In this case, the marked-off space boundary, i.e., "the object that defines the target position of the vehicle 1" corresponds to the other parked vehicle jutting out the parking marking-off line. Note that in the following description, the "obstacle" may include not only fixed objects near the marked-off parking space such as walls, but also other vehicles and the like.

When the image processing unit 1110 acquires backward movement information from the vehicle information acquisition unit 1102, the image processing unit 1110 performs a process for generating display image data indicating an image to be displayed in the display unit 50. Then, the image processing unit 1110 outputs the generated display image data to the display control unit 1120.

The object detection unit 1112 detects an object that defines a target position of the vehicle 1 from the image data acquired by the image data acquisition unit 1106 by using the dictionary data stored in the recognition dictionary 42. Note that when "the target position" is a marked-off parking space, the object detection unit 1112 detects a marked-off space boundary(ies) from the image data by using the dictionary data. Then, the object detection unit 1112 outputs detection data indicating the detected object to the display image generation unit 1114.

Specifically, the object detection unit 1112 recognizes the object, i.e., the marked-off space boundary from the image data through an image recognition process. The recognition of the marked-off space boundary can be carried out by using various existing methods. For example, the object detection unit 1112 may recognize an object included in the image data by performing edge detection on the image data. The object detection unit 1112 may extract the marked-off space boundary by comparing the object in the image data with that in the dictionary data stored in the recognition dictionary 42 and thereby recognizing a parking marking-off line, a vehicle, etc. Further, when the marked-off parking space is defined by white lines, the object detection unit 1112 may detect the marked-off space boundary by recognizing white lines from the image data.

Note that the object detection unit 1112 may recognize the marked-off parking space from the image data. The recognition of the marked-off space boundary can be carried out by using various existing methods. For example, the object detection unit 1112 may recognize a rectangular area formed by marked-off parking space boundaries as a marked-off parking space. Further, the object detection unit 1112 may detect the object that defines the target position of the vehicle 1 from display image data generated by the display image generation unit 1114, which will be described later, instead of detecting from the image data acquired by the image data acquisition unit 1106, by using the dictionary data stored in the recognition dictionary 42.

The display image generation unit 1114 generates display image data in which guidelines are superimposed on the image data acquired by the image data acquisition unit 1106. Then, the display image generation unit 1114 outputs the generated display image data to the display control unit 1120.

Note that the guidelines in the third embodiment can also be expressed as predicted course lines, predicted backward trajectories, predicted trajectory lines, or the like. The guidelines correspond to the width of the vehicle 1 and are drawn according to a backward movement of the vehicle 1. That is, in the display image data, the width of guidelines corresponds to the width of the vehicle 1. Further, the guidelines indicate a predicted trajectory of the backward movement of the vehicle 1. In other words, the guidelines indicate predicted trajectories of the left and right ends of the vehicle 1 on the road surface 90 at the time when the vehicle 1 performs a backward movement at a steering angle indicated by steering angle information acquired by the vehicle information acquisition unit 1102. Therefore, the display image generation unit 1114 determines a shape of the guidelines according to the steering angle information.

Further, the guidelines according to the third embodiment may include distance indicating lines indicating predetermined distances from the vehicle 1. Further, the guidelines may also include distance indicating lines indicating predetermined distances from a position on the predicted trajectory. That is, the guidelines indicate current and future distances from the vehicle 1 to each object in the image data such as a marked-off space boundary as well as the predicted trajectory of the vehicle 1. Details will be described later.

Further, when the object detected by the object detection unit 1112, i.e., the position of the marked-off space boundary has gotten closer to the position of the distance indicating line, the display image generation unit 1114 generates display image data in which an assisting line indicating a position that is closer to the vehicle than the position of the distance indicating line is superimposed on the image data. Note that "the assisting line" according to the third embodiment is a line for assisting the driver to appropriately recognize the distance to the marked-off space boundary because there is a possibility that the driver cannot appropriately recognize the distance by the above-described guidelines alone. Details will be described later. Note that the display image generation unit 1114 can also determine a shape of the assisting line according to steering angle information. Further, the shape of the assisting lines may conform to the shape of the guidelines.

The display control unit 1120 receives display image data from the display image generation unit 1114 of the image processing unit 1110. Then, the display control unit 1120 performs control so as to display an image based on the display image data generated by the display image generation unit 1114 in the display unit 50. Note that as will be described later, the display image generation unit 1114 performs a process so as to superimpose an assisting line on the display image data according to the distance between the distance indicating line and the marked-off space boundary, i.e., the object in the image data. Therefore, in the display image data displayed under the control of the display control unit 1120, the presence/absence of the assisting line may be changed according to a positional relation between the distance indicating line and the marked-off space boundary.

Figure 16:
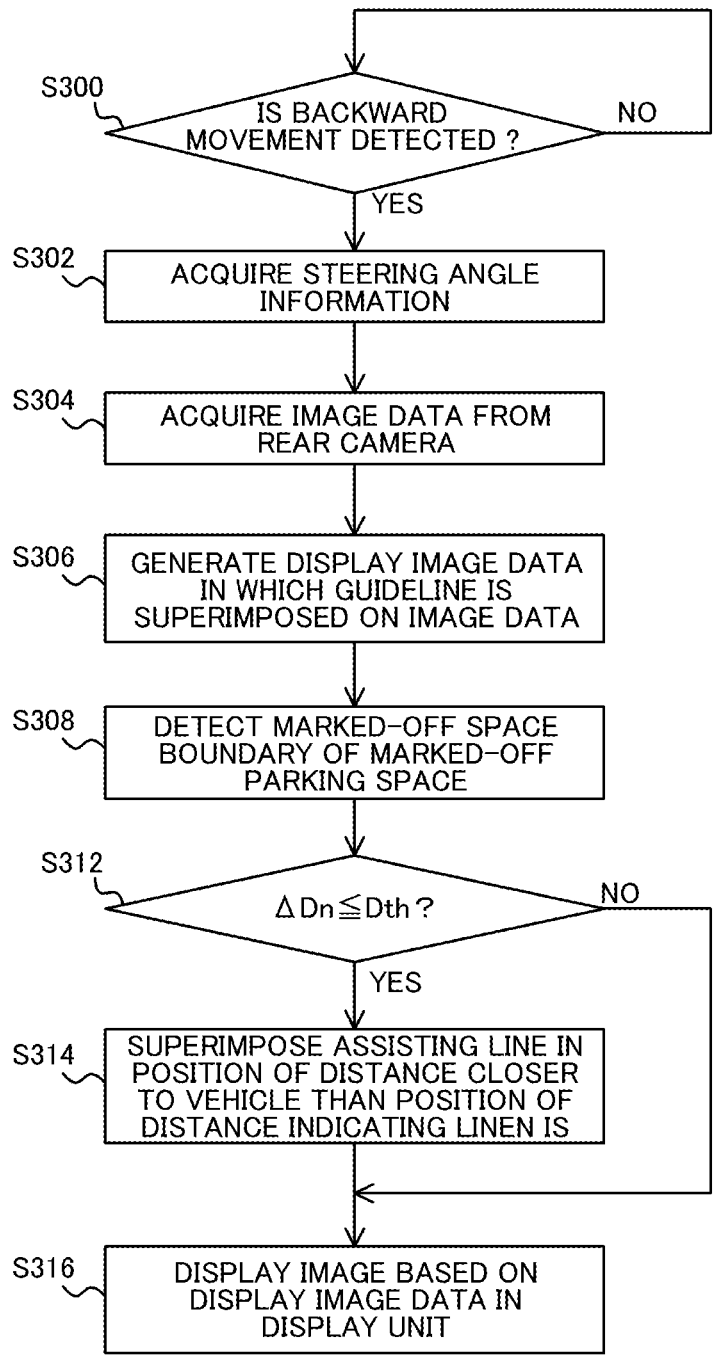
FIG. 16 is a flowchart showing a display control method performed by the display control apparatus according to the third embodiment.
Figure 21:
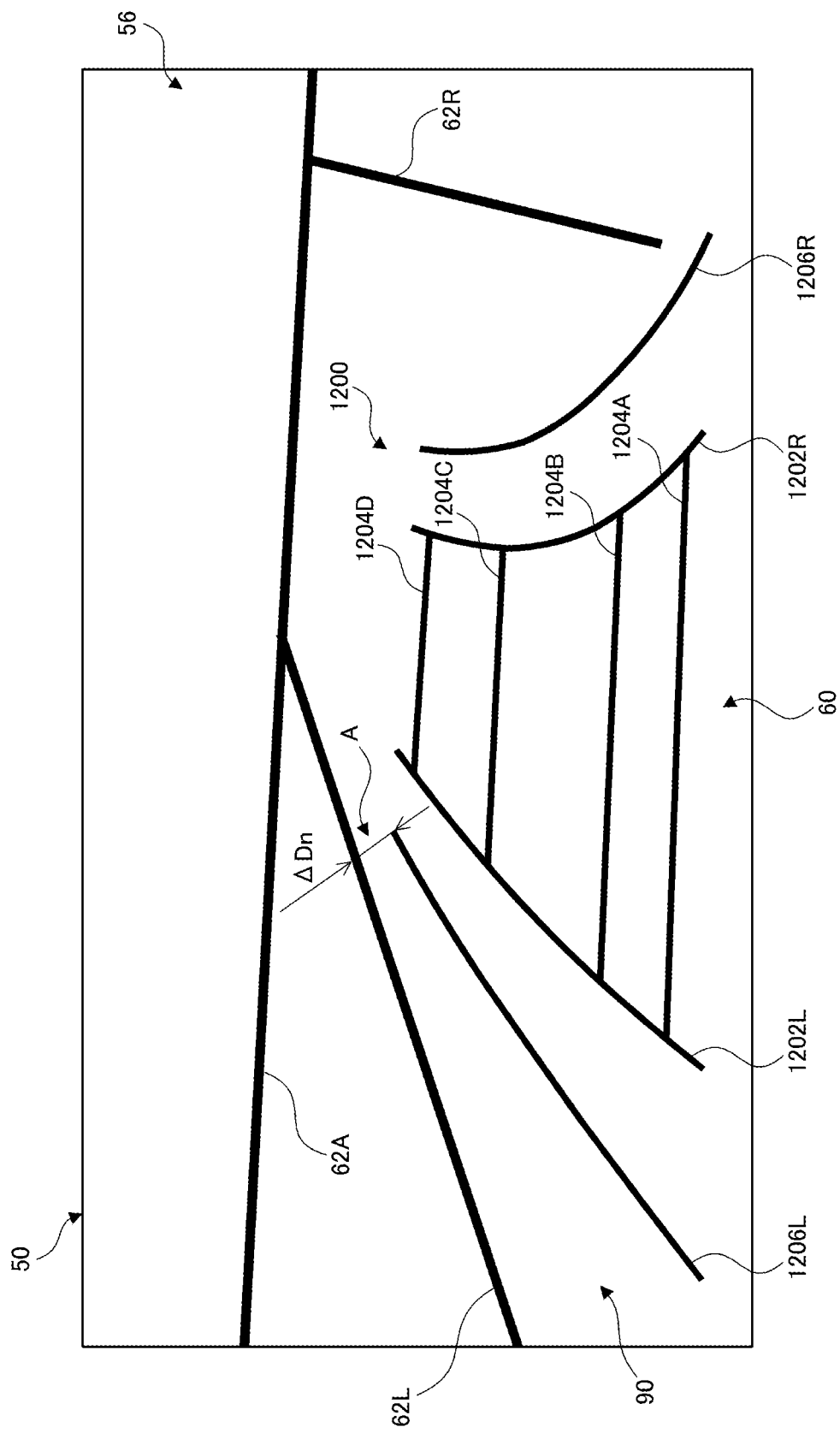
FIG. 21 shown an example of a rear-view image based on display image data generated by a display image generation unit according to the third embodiment.
Figure 22:
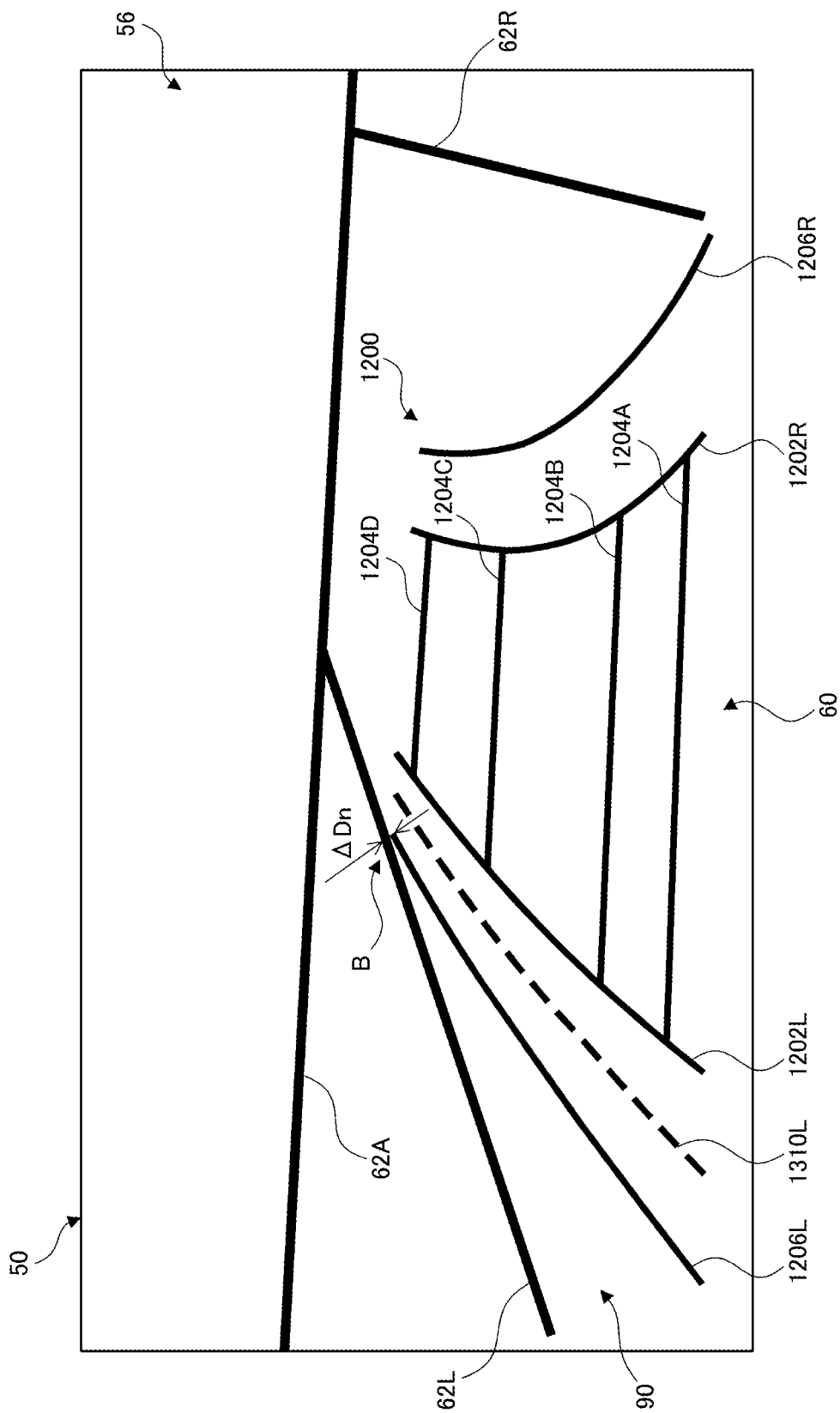
FIG. 22 shows an example of a rear-view image showing a state in which the vehicle has further moved backward from the state shown in FIG. 21.

FIG. 16 is a flowchart showing a display control method performed by the display control apparatus 100 according to the third embodiment. Further, FIGS. 17 to 20 are examples of images related to display image data generated by the display image generation unit 1114 when the vehicle 1 moves backward in a straight line. Further, FIGS. 21 and 22 are examples of images related to display image data generated by the display image generation unit 1114 when the vehicle 1 moves backward at a certain steering angle. The flowchart shown in FIG. 16 is explained hereinafter by using the examples shown in FIGS. 17 to 20.

When the vehicle information acquisition unit 1102 detects a backward movement of the vehicle 1 (YES at step S300), the vehicle information acquisition unit 1102 acquires steering angle information indicating a steering angle of the vehicle 1 (step S302). Further, the image data acquisition unit 1106 acquires image data from the rear camera 2 (step S304).

Figure 17:
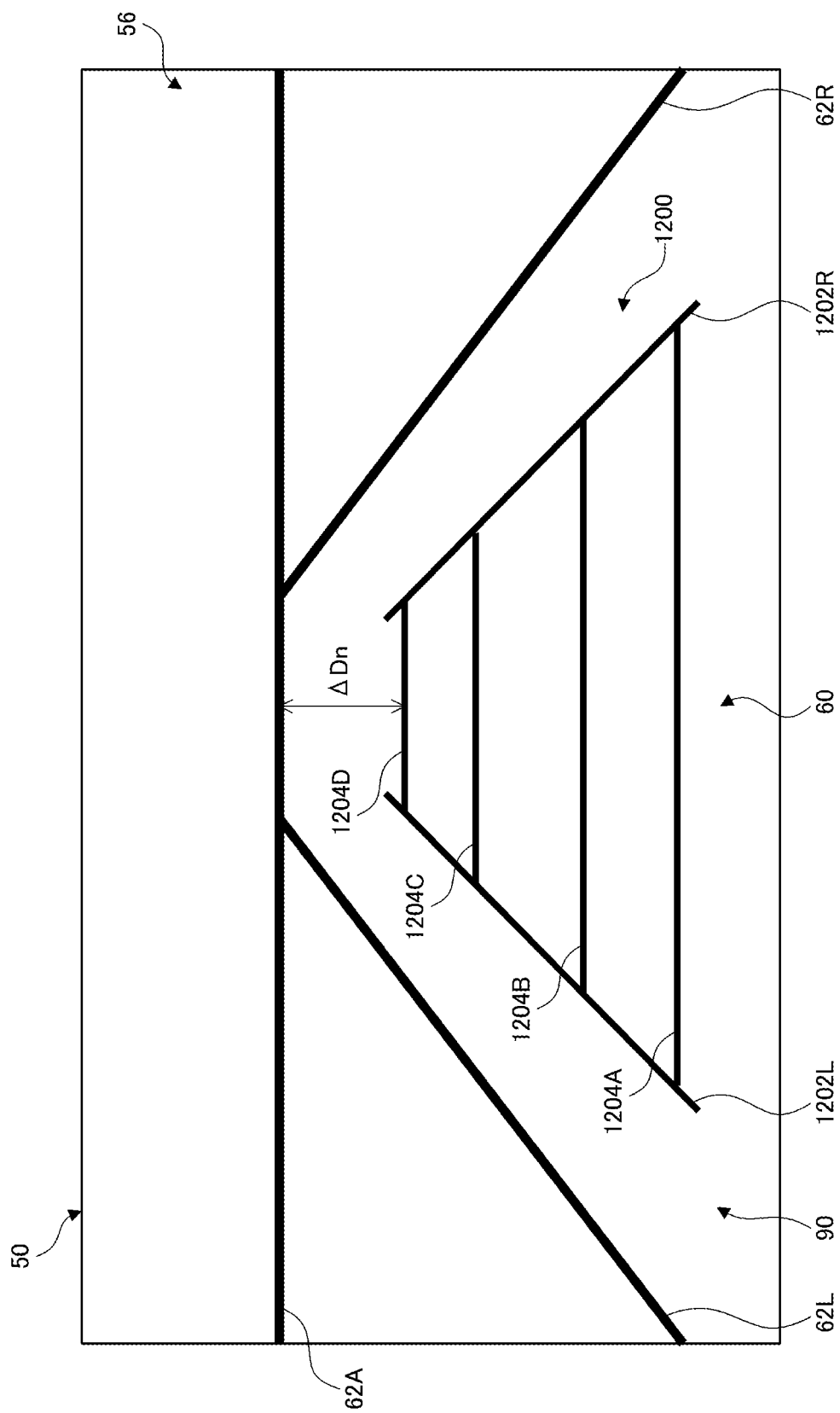
FIG. 17 shown an example of a rear-view image based on display image data generated by a display image generation unit according to the third embodiment.

The display image generation unit 1114 generates display image data in which guidelines including distance indicating lines are superimposed on the image data acquired by the image data acquisition unit 1106 (step S306). FIG. 17 shows an example of a rear-view image 56 displayed based on the display image data generated by the display image generation unit 1114 according to the third embodiment. FIG. 17 shows a state in which the display unit 50 displays a rear-view image 56 showing a state in which the vehicle 1 is moving backward in a straight line toward a marked-off parking space.

The rear-view image 56 includes a road surface 90, a marked-off parking space 60, a marked-off space boundary 62L located on the left side of the marked-off parking space 60, a marked-off space boundary 62R located on the right side of the marked-off parking space 60, and a marked-off space boundary 62A located at the rear of the marked-off parking space 60. Data indicating the marked-off parking space 60 and the marked-off space boundaries 62L, 62R and 62A is included in the image data acquired by the image data acquisition section 1106. Note that in the following description, when an explanation is given without differentiating between the marked-off parking space boundaries 62L, 62R and 62A, they are simply referred to as the marked-off space boundary(ies) 62. The above-described matter also applies to guidelines described below.

The rear-view image 56 includes guidelines 1200 including a predicted trajectory line 1202L on the left side and a predicted trajectory line 1202R on the right side. That is, the guidelines 1200 include a pair of predicted trajectory lines 1202 formed by vertical lines. The guidelines 1200 are drawn according to steering angle information by the display image generation unit 1114. Note that since the rear-view image 56 is a rear-view image of the vehicle 1, the predicted course line 1202L corresponds to a predicted trajectory of the right end of the vehicle 1 and the predicted course line 1202R corresponds to a predicted trajectory of the left end of the vehicle 1.

Further, the guidelines 1200 include distance indicating lines 1204A, 1204B, 1204C and 1204D indicating distances from the rear end of the vehicle 1 at the present moment. That is, the guidelines 1200 include distance indicating lines 1204 that are formed by horizontal lines and indicate predetermined distances from the vehicle 1. The distance indicating line 1204A indicates a position at a distance Da from the rear end of the vehicle 1. Similarly, the distance indicating lines 1204B, 1204C and 1204D indicate positions at distances Db, Dc and Dd, respectively, from the rear end of the vehicle 1. For example, the distances Da, Db, Dc and Dd are 0.4 m, 1.0 m, 2.0 m and 3.0 m, respectively. Note that the number of distance indicating lines 1204 is arbitrarily determined.

Note that the predicted trajectory line 1202L indicates a distance of 0.0 m from the right side surface of the vehicle 1 on the predicted trajectory of the vehicle 1. Similarly, the predicted trajectory line 1202R indicates a distance of 0.0 m from the left side surface of the vehicle 1 on the predicted trajectory of the vehicle 1. Therefore, the predicted trajectory lines 1202L and 1202R can also be considered to be distance indicating lines. The above-described matter also applies to predicted trajectory lines according to a fourth embodiment which will be described later.

As described above, since the guidelines 1200 are included in the rear-view image 56, the driver can recognize the predicted trajectory of the vehicle 1 when the vehicle 1 moves backward at the current steering angle. Further, since the distance indicating lines 1204 are displayed, the driver can recognize an approximate distance from the rear end of the vehicle 1 to the marked-off space boundary 62A.

The object detection unit 1112 extracts the marked-off space boundary of the marked-off parking space, i.e., "the object that defines the target position of the vehicle 1" from the image data acquired by the image data acquisition section 1106 (step S308). In the example shown in FIG. 17, the object detection unit 1112 extracts the marked-off space boundaries 62L, 62R and 62A from the image data related to the rear-view image 56.

Next, the display image generation unit 1114 determines whether or not the position of the marked-off space boundary 62 has gotten closer to the position corresponding to a distance indicating line N (step S312). Note that the distance indicating line N is one of the distance indicating lines 1204A, 1204B, 1204C and 1204D. Preferably, the distance indicating line N is a distance indicating line 1204 located on the vehicle 1 side, i.e., on the front side with respect to the marked-off space boundary 62. More preferably, the distance indicating line N is, among a plurality of distance indicating lines 1204 on the vehicle 1 side, i.e., on the front side with respect to the marked-off space boundary 62, the distance indicating line 1204 corresponding to a position closest to the position of the marked-off space boundary 62 (i.e., a first distance indicating line). Note that in the example shown in FIG. 17, the display image generation unit 1114 determines whether or not the position of the marked-off space boundary 62A has gotten closer to a position corresponding to the distance indicating line 1204D along the moving direction of the vehicle 1. Further, "the position corresponding to the distance indicating line N" means a position at a distance indicated by the distance indicating line N from the rear end of the vehicle 1 on the actual road surface 90. For example, the position corresponding to the distance indicating line 1204D means a position at a distance Dd (=2.0 m) from the rear end of the vehicle 1.

Note that when it is determined that a distance $\Delta Dn$ between the position of the marked-off space boundary 62A and the position corresponding to the distance indicating line N becomes equal to or shorter than a predetermined threshold Dth, i.e., when a relation "$\Delta Dn \leq Dth$" holds, the display image generation unit 1114 determines that the position of the marked-off space boundary 62 has gotten closer to the position of the distance indicating line N. In other words, the display image generation unit 1114 determines whether or not the relation "$\Delta Dn \leq Dth$" holds (S312). That is, the display image generation unit 1114 determines whether or not the distance between the object detected by the object detection unit 1112, i.e., the position of the marked-off space boundary 62 and the position corresponding to the distance indicating line N becomes equal to or shorter than a predetermined first threshold.

Note that when the distance indicated by the distance indicating line N, i.e., the distance from the rear end of the vehicle 1 to the position corresponding to the distance indicating line N is represented by Dn and the distance from the rear end of the vehicle 1 to the marked-off space boundary 62A is represented by Dx, the distance $\Delta Dn$ is expressed as "$\Delta Dn = Dx - Dn$". For example, when the distance indicating line N is the distance indicating line 1204D, the distance $\Delta Dn$ is expressed as "$\Delta Dn = Dx - Dd$". Further, the distance $\Delta Dn$ may be a minimum value of the distance between the position of the marked-off space boundary 62 and the position of the distance indicating line 1204, i.e., the distance between the position of the marked-off space boundary 62 and the position of the distance indicating line 1204 at their closest points.

Further, the threshold Dth does not necessarily have to be the same for all the distance indicating lines 1204. That is, the threshold Dth may be different for each distance indicating line 1204. In other words, the threshold Dth for the distance indicating line 1204A may be different from the threshold Dth for the distance indicating line 1204D. Note that the threshold Dth for the distance indicating line 1204D may be, for example, 0.2 m. That is, in an example where the distance Dd is 3.0 m (Dd=3.0 m), the display image generation unit 1114 may determine that the marked-off space boundary 62 has gotten closer to the position corresponding to the distance indicating line N when the distance Dx from the rear end of the vehicle 1 to the marked-off space boundary 62A becomes 3.2 m.

Note that the display image generation unit 1114 may determine whether or not the relation "$\Delta Dn \leq Dth$" holds by performing image processing. For example, the display image generation unit 1114 may calculate the distance $\Delta Dn$ from the number of pixels between the image of the marked-off space boundary 62 and the image of the distance indicating line N in the display image data. Note that because of the perspective, the relation between the number of pixels and the distance changes according to the position in the depth direction. Therefore, the display image generation unit 1114 may store the relation between the number of pixels and the distance according to the depth in the display image data. Further, the display image generation unit 1114 may store the relation between the number of pixels near each distance indicating line 1204 and an actual distance of the position corresponding to that distance indicating line 1204. Then, the display image generation unit 1114 may count the number of pixels between the image of the marked-off space boundary 62 and the image of the distance indicating line N in the display image data and calculate the distance ΔDn based on the obtained number of pixels.

When it is determined that the marked-off space boundary 62 is not getting closer to the position corresponding to the distance indicating line N, i.e., when it is determined that the relation "ΔDn≤Dth" does not hold (NO at S312), a process in a step S314, which is described below, is not performed and the process proceeds to a step S316. On the other hand, when it is determined that the marked-off space boundary 62 has gotten closer to the position corresponding to the distance indicating line N, i.e., when it is determined that the relation "ΔDn≤Dth" holds (YES at S312), the display image generation unit 1114 superimposes an assisting line in a position that is closer to the vehicle 1 than the position of the distance indicating line N is (step S314). That is, at this point, the display image generation unit 1114 generates display image data in which an assisting line indicating the position closer to the vehicle 1 than the position of the distance indicating line N is further superimposed on the image data. Then, the display control unit 1120 displays an image based on the display image data generated by the display image generation unit 1114 in the display unit 50 (step S316).

In the example shown in FIG. 17, the distance indicating line 1204 closest to the marked-off space boundary 62A is the distance indicating line 1204D. Therefore, the display image generation unit 1114 calculates the distance ΔDn between the position corresponding to the distance indicating line 1204D and the position of the marked-off space boundary 62A. Then, the display image generation unit 1114 determines that a relation "ΔDn>Dth" holds, i.e., the marked-off space boundary 62A is not getting closer to the position corresponding to the distance indicating line 1204D (NO at S312). Therefore, in the example shown in FIG. 17, the display image generation unit 1114 does not superimpose an assisting line on the image data.

Figure 18:
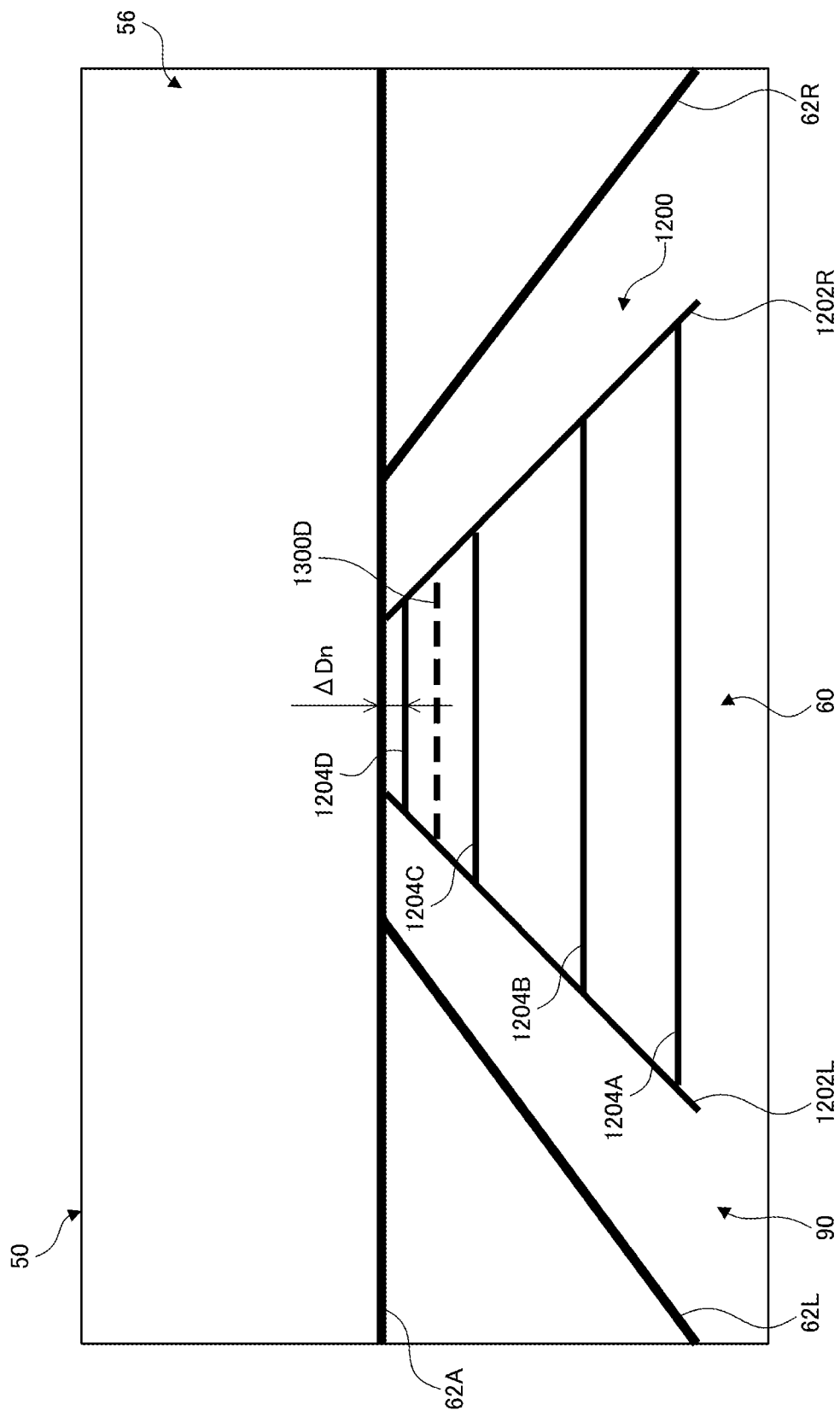
FIG. 18 shows an example of a rear-view image showing a state in which the vehicle has further moved backward from the state shown in FIG. 17.

FIG. 18 shows an example of a rear-view image 56 showing a state in which the vehicle 1 has further moved backward from the state shown in FIG. 17. In the state shown in FIG. 18, the position of the marked-off space boundary 62A has gotten closer to the position of the distance indicating line 1204D than the position in the state shown in FIG. 17 is. Here, the display image generation unit 1114 calculates the distance ΔDn between the position corresponding to the distance indicating line 1204D and the position of the marked-off space boundary 62A, and it is assumed that as a result of the calculation, a relation "ΔDn≤Dth" holds.

In this case, the display image generation unit 1114 determines that the relation "ΔDn≤Dth" holds in the process in the step S312. That is, the display image generation unit 1114 determines that the marked-off space boundary 62 has gotten closer to the position corresponding to the distance indicating line 1204D (YES at S312). Therefore, the display image generation unit 1114 superimposes an assisting line 1300D indicating a position closer to the vehicle 1 than the position of the distance indicating line 1204D is (S314). Note that the displaying format of the assisting line 1300D may be changed from the displaying format of the distance indicating lines 1204. In the example shown in FIG. 18, while the distance indicating lines 1204 are drawn by solid lines, the assisting line 1300D is drawn by a broken line. Further, the thickness of the assisting line 1300D may be made smaller than that of the distance indicating lines 1204. The above-described matter also applies to other assisting lines 1300 and assisting lines according to other embodiments.

As described above, since the assisting line 1300D is superimposed on the image data, a large number of lines indicating distances from the rear end of the vehicle 1 are displayed near the marked-off space boundary 62A. Therefore, to some extent, the driver can quantitatively recognize the distance from the rear end of the vehicle 1 to the marked-off space boundary 62A. That is, to some extent, the driver can quantitatively recognize how close the rear end of the vehicle 1 has moved to the marked-off space boundary 62A. In other words, to some extent, the driver can quantitatively recognize how much distance the vehicle 1 can be further moved backward and how close the vehicle 1 will get to the marked-off space boundary 62A by doing so. Therefore, the driver can appropriately recognize the distance to the marked-off space boundary 62A. Further, since the assisting line 1300D appears in the rear-view image 56, the driver can immediately recognize that the distance from the rear end of the vehicle 1 to the marked-off space boundary 62A becomes about 3.0 m.

Note that the display image generation unit 1114 preferably superimposes and displays the assisting line 1300D between the distance indicating lines 1204D and 1204C. That is, when the distance from the rear end of the vehicle 1 to the position of the assisting line 1300D is represented by Dsd, a relation "Dd>Dsd>Dc" holds. Further, similarly to the above-described example, when the distances Dd and Dc are 3.0 m and 2.0 m, respectively (i.e., Dd=3.0 m, Dc=2.0 m), the distance Dsd may be set to 2.5 m (Dsd=2.5 m). In this case, the assisting line 1300D indicates the position at which the distance between the distance indicating lines 1204D and 1204C is divided into two equal parts.

Figure 19:
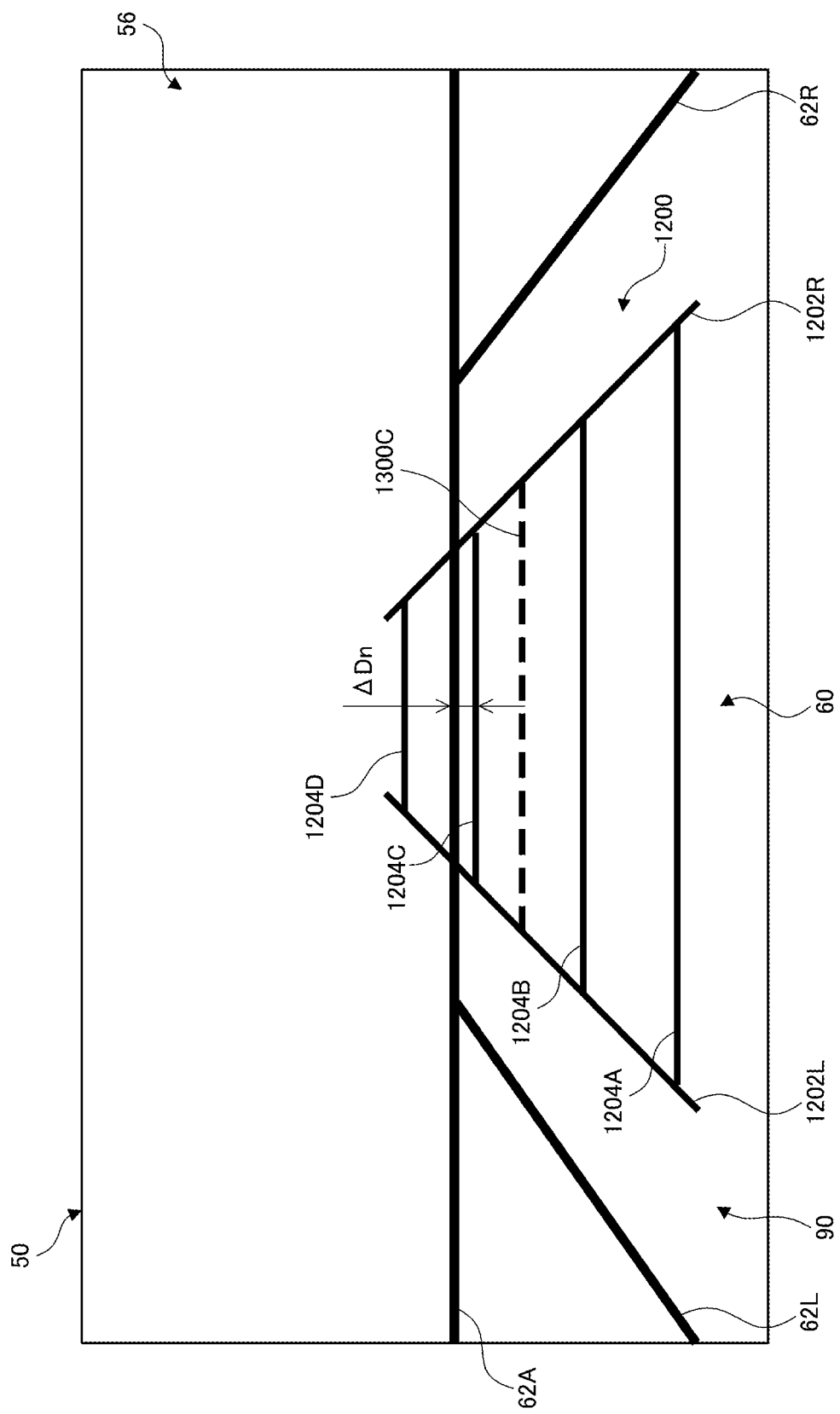
FIG. 19 shows an example of a rear-view image showing a state in which the vehicle has further moved backward from the state shown in FIG. 18.

FIG. 19 shows an example of a rear-view image 56 showing a state in which the vehicle 1 has further moved backward from the state shown in FIG. 18. In the state shown in FIG. 19, the position of the marked-off space boundary 62A has gotten closer to the position of the distance indicating line 1204C. Note that the distance indicating line 1204D is located in a position that is farther from the vehicle 1 than the marked-off space boundary 62A is. Here, the display image generation unit 1114 calculates the distance ΔDn between the position corresponding to the distance indicating line 1204C and the position of the marked-off space boundary 62A, and it is assumed that as a result of the calculation, a relation "ΔDn≤Dth" holds.

In this case, the display image generation unit 1114 determines that the relation "ΔDn≤Dth" holds in the process in the step S312. That is, the display image generation unit 1114 determines that the marked-off space boundary 62 has gotten closer to the position corresponding to the distance indicating line 1204C (YES at S312). Therefore, the display image generation unit 1114 superimposes an assisting line 1300C indicating a position closer to the vehicle 1 than the position of the distance indicating line 1204C is (S314). As described above, since the assisting line 1300C is superimposed on the image data, the driver can appropriately recognize the distance to the marked-off space boundary 62A. Further, since the assisting line 1300C appears in the rear-view image 56, the driver can immediately recognize that the distance from the rear end of the vehicle 1 to the marked-off space boundary 62A becomes about 2.0 m.

Note that similarly to the example shown in FIG. 18, the display image generation unit 1114 preferably superimposes and displays the assisting line 1300D between the distance indicating lines 1204C and 1204B. That is, when the distance from the rear end of the vehicle 1 to the position of the assisting line 1300C is represented by Dsc, a relation "Dc>Dsc>Db" holds. Further, similarly to the above-described example, when the distances Dc and Db are 2.0 m and 1.0 m, respectively (i.e., Dc=2.0 m, Db=1.0 m), the distance Dsc may be set to 1.5 m (Dsd=1.5 m). In this case, the assisting line 1300C indicates the position at which the distance between the distance indicating lines 1204C and 1204B is divided into two equal parts.

Figure 20:
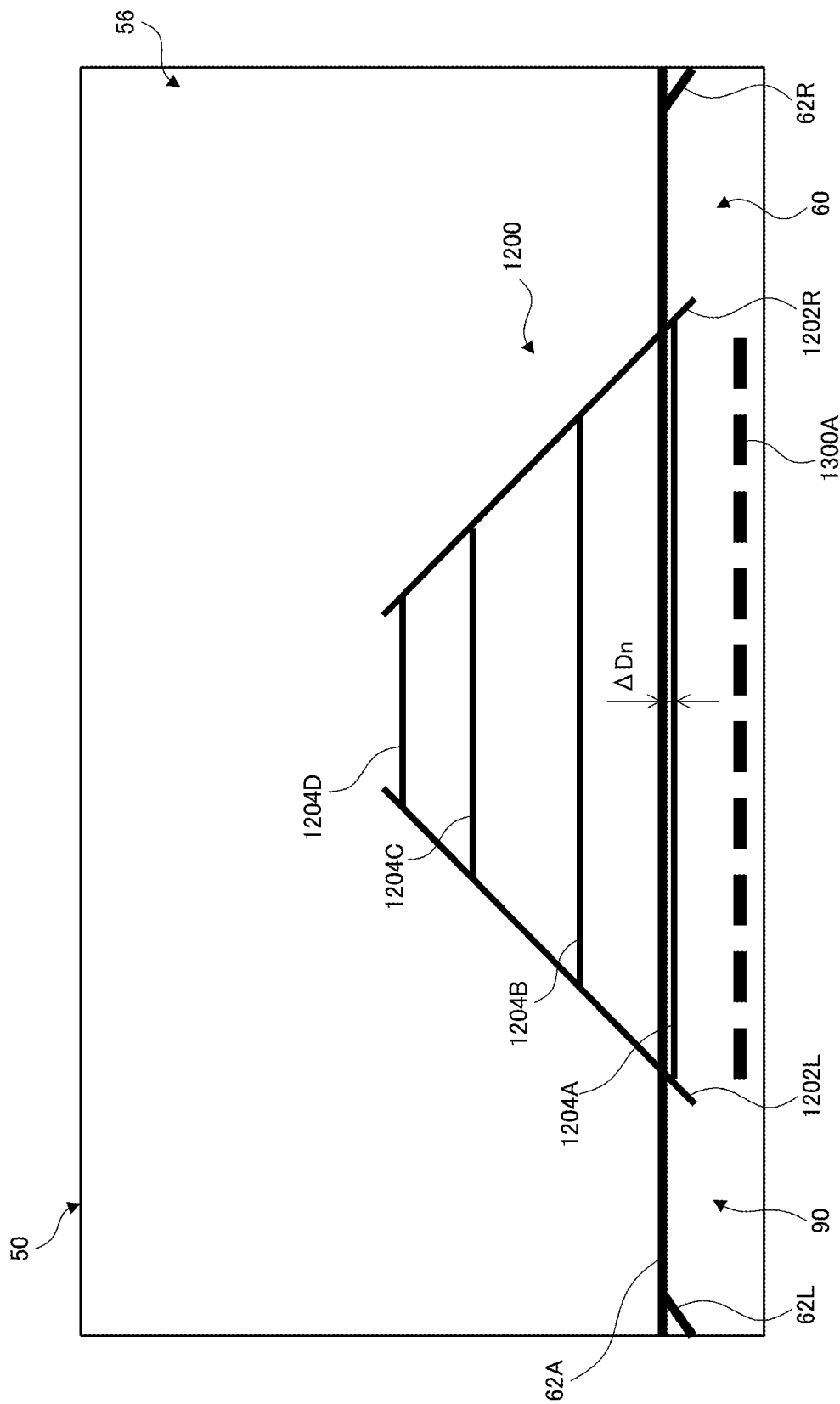
FIG. 20 shows an example of a rear-view image showing a state in which the vehicle has further moved backward from the state shown in FIG. 19.

FIG. 20 shows an example of a rear-view image 56 showing a state in which the vehicle 1 has further moved backward from the state shown in FIG. 19. In the state shown in FIG. 20, the position of the marked-off space boundary 62A has gotten closer to the position of the distance indicating line 1204A. Note that the distance indicating lines 1204D, 1204C and 1204B are located in positions that are farther from the vehicle 1 than the marked-off space boundary 62A is. Here, the display image generation unit 1114 calculates the distance ΔDn between the position corresponding to the distance indicating line 1204A and the position of the marked-off space boundary 62A, and it is assumed that as a result of the calculation, a relation "ΔDn≤Dth" holds.

In this case, the display image generation unit 1114 determines that the relation "ΔDn≤Dth" holds in the process in the step S312. That is, the display image generation unit 1114 determines that the marked-off space boundary 62 has gotten closer to the position corresponding to the distance indicating line 1204A (YES at S312). Therefore, the display image generation unit 1114 superimposes an assisting line 1300A indicating a position closer to the vehicle 1 than the position of the distance indicating line 1204A is (S314). As described above, since the assisting line 1300A is superimposed on the image data, the driver can appropriately recognize the distance to the marked-off space boundary 62A. Further, since the assisting line 1300A appears in the rear-view image 56, the driver can immediately recognize that the distance from the rear end of the vehicle 1 to the marked-off space boundary 62A becomes about 0.4 m.

Note that the distance indicating line 1204A is the distance indicating line 1204 closest to the vehicle 1 among the plurality of distance indicating lines 1204. In this case, the display image generation unit 1114 superimposes and displays the assisting line 1300A between the distance indicating line 1204A and the rear end of the vehicle 1. That is, when the distance from the rear end of the vehicle 1 to the position of the assisting line 1300A is represented by Dsa, a relation "Da>Dsa>0" holds. Further, similarly to the above-described example, when the distances Da is 0.4 m (Da=0.4 m), the distance Dsa may be set to 0.2 m (Dsa=0.2 m). In this case, the assisting line 1300A indicates the position at which the distance between the distance indicating line 1204A and the rear end of the vehicle 1 is divided into two equal parts.

Note that the display image generation unit 1114 may superimpose and display the assisting line 1300A related to the distance indicating line 1204A, which is the distance indicating line 1204 closest to the vehicle 1, in a displaying format by which the assisting line 1300A is more noticeable than other assisting lines 1300. For example, the assisting line 1300A may be displayed in a noticeable color such as red. Further, the assisting line 1300A may be displayed with a thickness larger than that of other assisting lines 1300. Further, the assisting line 1300A may be displayed in a blinking manner.

The fact that the assisting line 1300A is displayed means that the vehicle 1 has gotten closer to the marked-off space boundary 62A to such an extent that the distance between the rear end of the vehicle 1 and the marked-off space boundary 62A becomes roughly the same as the distance indicated by the distance indicating line 1204A closest to the rear end of the vehicle 1. Therefore, by displaying the assisting line 1300A in a noticeable displaying format as described above, it is possible to warn the driver that the vehicle 1 is getting closer to the marked-off space boundary 62A.

As described above, the display control apparatus 100 according to this embodiment generates, when the marked-off space boundary 62 has gotten closer to the distance indicating line 1204, display image data in which an assisting line 1300 indicating a position closer to the marked-off space boundary 62 than the distance indicating line 1204 is further superimposed. Therefore, a large number of lines indicating distances from the rear end of the vehicle 1 are displayed near the marked-off space boundary 62A. As a result, as compared to the case where the assisting line 1300 is not displayed, the driver can accurately recognize the distance from the rear end of the vehicle 1 to the marked-off space boundary 62A just by taking a look at the image. Therefore, the display control apparatus 100 according to this embodiment enables the driver to appropriately and quickly recognize the distance to the marked-off space boundary 62A.

Further, as described above, in this embodiment, when the marked-off space boundary 62A has gotten closer to a given distance indicating line 1204, an assisting line 1300 related to that distance indicating line 1204 is superimposed on the image. In other words, only the assisting line 1300 related to the distance indicating line 1204 corresponding to the position closest to the position of the marked-off space boundary 62A is displayed. That is, assisting lines 1300 related to other distance indicating lines 1204 are not displayed. Note that if all the assisting lines 1300 are always displayed, the displayed items become complicated and hence become a nuisance to the driver. Therefore, there is a possibility that it becomes difficult for the driver to immediately recognize the distance to the marked-off space boundary 62A. In contrast to this, in this embodiment, all the assisting lines 1300 are not always displayed as described above. That is, only the assisting line 1300 near the marked-off space boundary 62A is displayed. Therefore, although the display image is not complicated, information that the driver wants to know, i.e., distance information near the marked-off space boundary 62A is displayed in a detailed manner. Therefore, the driver can recognize the distance to the boundary 62A more appropriately and more quickly.

Further, as described above, in this embodiment, for example, in the example shown in FIG. 18, the assisting line 1300D is superimposed between the distance indicating line 1204D (a first distance indicating line) corresponding to the position closest to the position of the marked-off space boundary 62A and the distance indicating line 1204C (a second distance indicating line) that is adjacent to the distance indicating line 1204D and indicates a distance closer to the vehicle 1 than the distance indicating line 1204D is. As a result, even when the driver does not know the distance indicated by the assisting line 1300, the driver can intuitively recognize an approximate distance indicated by the assisting line 1300.

Further, in the above-described example, the assisting line 1300 indicates a position at which the distance between distance indicating lines 1204 adjacent to each other is divided into equal parts the number of which is an integer (for example, into two equal parts). That is, the assisting line 1300 can be superimposed so that the below-shown Expression (1) holds.

$$Dsn = D(n-1) + k*\{Dn - D(n-1)\}/M \qquad \text{Expression (1):}$$

In the expression, M and k are integers and k is smaller than M (k<M). Further, the term "D(n−1)" is a distance indicated by a distance indicating line immediately in front of the distance indicating line N. In this way, since the distance indicating lines 1204 adjacent to each other and the assisting line 1300 therebetween function as divisions of a scale, the driver can recognize the distance from the vehicle 1 to the marked-off space boundary 62A more accurately.

Further, as described above, in this embodiment, the displaying formats of the assisting line 1300 and the distance indicating lines 1204 are differentiated from each other. In this way, like divisions of a scale, the driver can easily recognize which line indicates which distance. Therefore, the driver can recognize the distance to the marked-off space boundary 62A more appropriately and more quickly.

An example of a process that is performed after the assisting line 1300 is superimposed and displayed is described. For example, when the vehicle 1 moves backward and hence its state changes from the state shown in FIG. 18 to the state shown in FIG. 19, the assisting line 1300D may be continuously displayed until the marked-off space boundary 62A exceeds the position of the distance indicating line 1204D and reaches the position of the assisting line 1300D. Then, the display of the assisting line 1300D may be finished when the marked-off space boundary 62A reaches the position of the assisting line 1300D. The above-described matter applies to the assisting line 1300C shown in FIG. 19. Note that the display of the assisting line 1300A is preferably continued even when the marked-off space boundary 62A reaches the position of the assisting line 1300A. The above-described process for finishing the display of the assisting line 1300 also applies to other embodiments.

In the above-described embodiment, examples in which assisting lines are superimposed and displayed in the moving direction of the vehicle 1 are described. Next, a case in which assisting lines are superimposed and displayed in the width direction of the vehicle 1 is described. FIG. 21 shows an example of a rear-view image 56 displayed based on display image data generated by the display image generation unit 1114 according to the third embodiment. FIG. 21 shows an example of a state in which the display unit 50 displays a rear-view image 56 showing a state in which the vehicle 1 is moving backward toward a marked-off parking space at a certain steering angle.

Similarly to the example shown in FIG. 17, the rear-view image 56 shown in FIG. 21 includes a marked-off parking space 60, a marked-off space boundary 62L, a marked-off space boundary 62R, and a marked-off space boundary 62A. Further, the rear-view image 56 shown in FIG. 21 includes guidelines 1200 including a predicted trajectory line 1202L, a predicted trajectory line 1202R, and distance indicating lines 1204A, 1204B, 1204C and 1204D. In the example shown in FIG. 21, the display image generation unit 1114 draws the predicted trajectory lines 1202L and 1202R so that they become curved lines conforming to a steering angle indicated by steering angle information. The curvature of the curved lines increases as the steering angle increases. Further, the display image generation unit 1114 draws the distance indicating lines 1204A, 1204B, 1204C and 1204D so that they are inclined according to the curvature of the predicted trajectory lines 1202L and 1202R.

Further, in the example shown in FIG. 21, the guidelines 1200 further includes a distance indicating line 1206L and a distance indicating line 1206R on the left side and the right side, respectively, of the predicted trajectory lines 1202L and 1202R. The distance indicating line 1206L indicates a position at a distance Dl from the predicted trajectory line 1202L on the left side thereof. The distance indicating line 1206R indicates a position at a distance Dr from the predicted trajectory line 1202R on the left side thereof. For example, the distances Dl and Dr are 1.0 m (Dl=Dr=1.0 m). Further, similarly to the shape of the predicted trajectory lines 1202, a shape of the distance indicating lines 1206 is curved in conformity with the steering angle. As a result, the distance indicating lines 1206 are drawn so as to appear parallel to the predicted trajectory lines 1202. Note that the predicted trajectory lines 1202 indicate positions at a distance of 0.0 m from the position on the predicted trajectory of the vehicle 1. Therefore, the predicted trajectory lines 1202 can also be considered to be distance indicating lines. Note that although the number of distance indicating lines 1206 located on each side is one in the example shown in FIG. 21, the number of distance indicating lines 1206 is arbitrarily determined.

In the example shown in FIG. 21, the display image generation unit 1114 also determines whether or not the position of the marked-off space boundary 62 has gotten closer to the position corresponding to a distance indicating line N (S312). Note that in the example shown in FIG. 21, the distance indicating line N is the distance indicating line 1206L and the marked-off space boundary 62 is the marked-off space boundary 62L. The display image generation unit 1114 determines whether or not a distance ΔDn between the position of the marked-off space boundary 62L and the position corresponding to the distance indicating line 1206L at their closest points (i.e., a distance indicated by an arrow A) becomes equal to or shorter than a predetermined threshold Dth. Note that as described above, the method for calculating the distance ΔDn may be performed by performing image processing. That is, the display image generation unit 1114 may store the relation between given distances in the depth direction and the numbers of pixels in advance, and calculate the distance ΔDn in the place indicated by the arrow A based on the number of pixels between the position of the marked-off space boundary 62L and the position corresponding to the distance indicating line 1206L. Note that the threshold Dth does not necessarily need to be the same as that for the distance indicating line 1204. Further, the threshold Dth for the distance indicating line 1206L does not necessarily need to be the same as that for the distance indicating line 1206R.

In the example shown in FIG. 21, the display image generation unit 1114 determines that a relation "ΔDn>Dth" holds, i.e., the marked-off space boundary 62L is not getting closer to the position corresponding to the distance indicating line 1206L (NO at S312). Therefore, the display image generation unit 1114 does not superimpose an assisting line on the image data.

FIG. 22 shows an example of a rear-view image 56 showing a state in which the vehicle 1 has further moved backward from the state shown in FIG. 21. In the state shown in FIG. 22, the position of the marked-off space boundary 62L has gotten closer to the position of the distance indicating line 1206L than the position in the state shown in FIG. 21 is. Here, the display image generation unit 1114 calculates the distance ΔDn between the position corresponding to the distance indicating line 1206L and the position of the marked-off space boundary 62L, and it is assumed that as a result of the calculation, a relation "ΔDn≤Dth" holds.

In this case, the display image generation unit 1114 determines that the relation "ΔDn≤Dth" holds in the process in the step S312. That is, the display image generation unit 1114 determines that the marked-off space boundary 62L has gotten closer to the position corresponding to the distance indicating line 1206L (YES at S312). Therefore, the display image generation unit 1114 superimposes an assisting line 1310L indicating a position closer to the predicted trajectory line 1202 of the vehicle 1 than the position of the distance indicating line 1206L is (S314). Note that while the distance indicating lines 1206 are drawn by solid lines, the assisting line 1310L is drawn by a broken line.

As described above, since the assisting line 1310L is superimposed on the image data, the driver can quantitatively recognize, to some extent, the distance from the predicted trajectory line 1202L to the marked-off space boundary 62L. That is, the driver can recognize that when the vehicle 1 moves backward to the position corresponding to an arrow B at the current steering angle, how close the vehicle 1 will get to the marked-off space boundary 62L. Therefore, the driver can appropriately recognize the distance from the predicted trajectory of the vehicle 1 to the marked-off space boundary 62L. Further, since the assisting line 1310L appears in the rear-view image 56, the driver can immediately recognize that when the vehicle 1 moves backward at the current steering angle, the distance to the marked-off space boundary 62L will become about 1.0 m.

Note that the display image generating section 1114 draws the assisting line 1310L as a curved line according to the curved shape of the predicted trajectory line 1202L and the distance indicating line 1206L. Therefore, the assisting line 1310L is drawn so that it appears parallel to the predicted trajectory line 1202 and the distance indicating line 1206L.

Note that the display image generation unit 1114 preferably superimposes and displays the assisting line 1310L between the distance indicating line 1206L and the predicted trajectory line 1202L. That is, when the distance from the predicted trajectory line 1202L to the position of the assisting line 1310L is represented by Dsl, a relation "Dl>Dsl>0" holds. Further, similarly to the above-described example, the distances Dl and Dsl may be 1.0 m and 0.5 m, respectively (i.e., Dl=1.0 m, Dsl=0.5 m). In this case, the assisting line 1310L indicates a position at which the distance between the distance indicating line 1206L and the predicted trajectory line 1202L is divided into two equal parts. That is, the assisting line 1310L indicates a position at which the distance between the distance indicating line 1206L and the predicted trajectory line 1202L is divided into equal parts the number of which is an integer. In this way, the driver can recognize the distance from the predicted trajectory of the vehicle 1 to the marked-off space boundary 62L more accurately.

As described above, the display control apparatus 100 according to the third embodiment can also provide advantageous effects similar to those of the examples shown in FIGS. 17 to 20 in the examples shown in FIGS. 21 and 22. For example, the display control apparatus 100 according to this embodiment enables the driver to appropriately and quickly recognize the distance to the marked-off space boundary 62L. Further, in the example shown in FIGS. 21 and 22, the assisting line 1310L is superimposed between the distance indicating line 1206L (a first distance indicating line) and the predicted trajectory line 1202L (a second distance indicating line) that is adjacent to the distance indicating line 1206L and indicates a distance closer to the vehicle 1 than the distance indicating line 1206L is. As a result, even when the driver does not know the distance indicated by the assisting line 1310, the driver can intuitively recognize an approximate distance indicated by the assisting line 1310. Further, since the displaying formats of the assisting line 1310 and the distance indicating lines 1206 are differentiated from each other, the driver can recognize the distance to the marked-off space boundary 62L more appropriately and more quickly.

Modified Example of Third Embodiment

Next, a modified example of the third embodiment is described. In this modified example, the display image generation unit 1114 changes the displaying format of a part of the guideline 1200 corresponding to a position that is farther from the rear end of the vehicle 1 than the position of the marked-off space boundary 62 recognized by the object detecting unit 1112 is.

Figure 23:
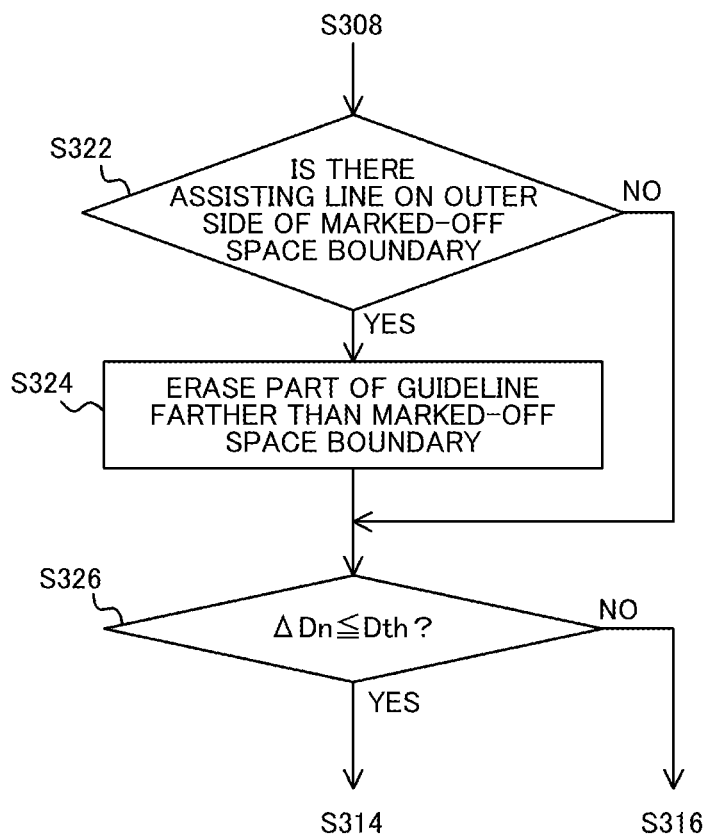
FIG. 23 is a flowchart showing processes according to a modified example of the third embodiment.
Figure 24:
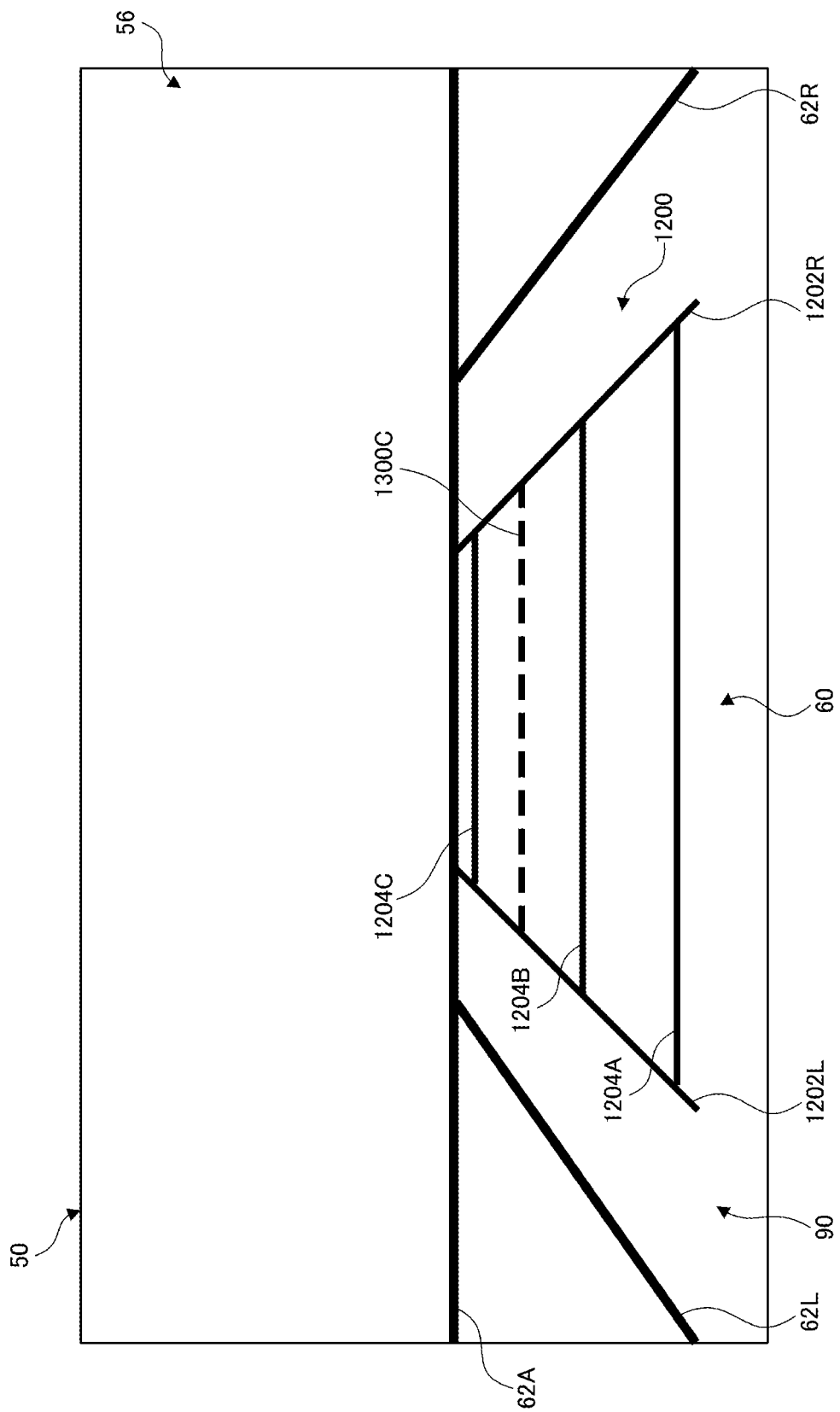
FIG. 24 shows an example of a rear-view image according to a modified example of the third embodiment.
Figure 25:
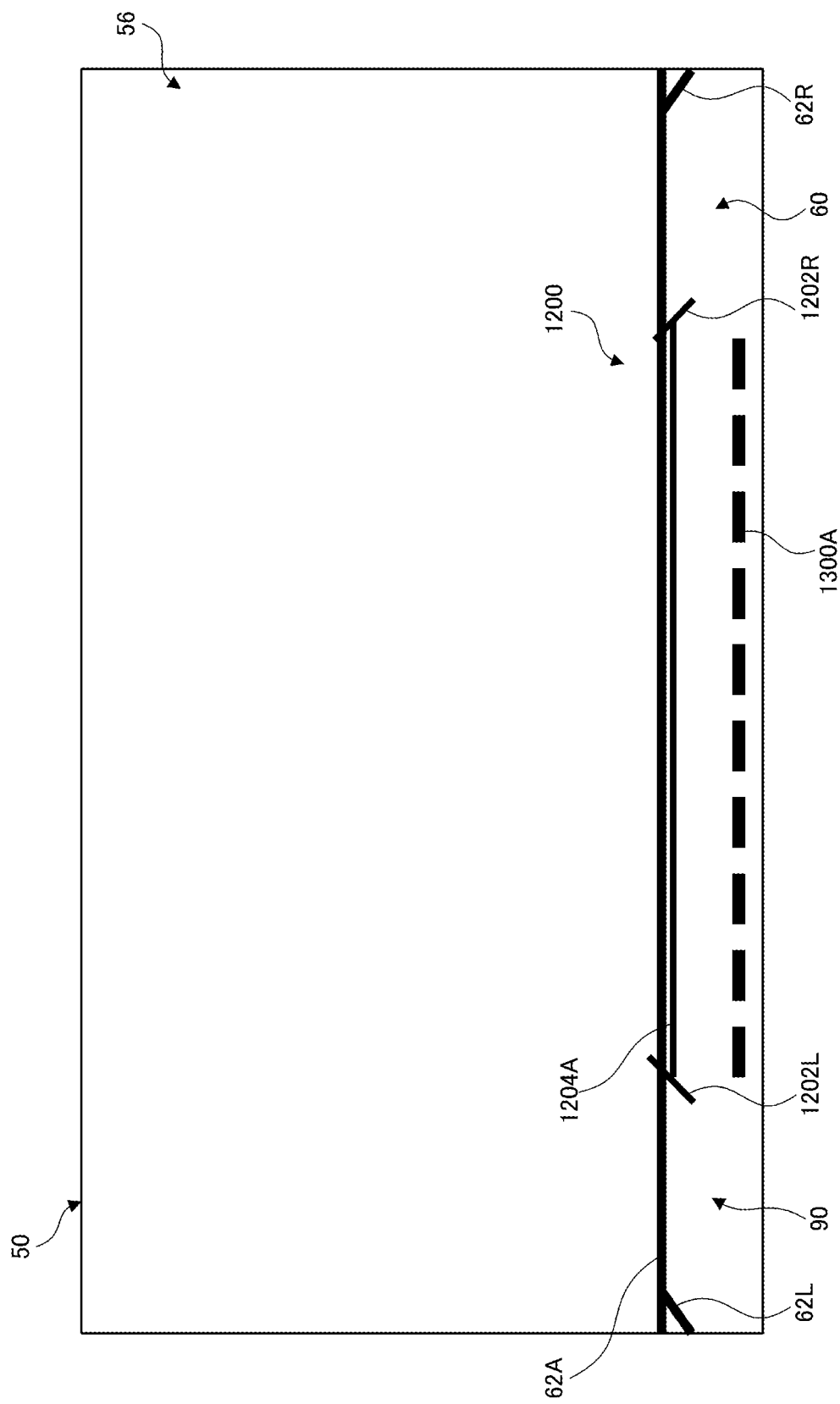
FIG. 25 shows an example of a rear-view image according to a modified example of the third embodiment.

FIG. 23 is a flowchart showing processes according to the modified example of the third embodiment. Further, FIGS. 24 and 25 show examples of a rear-view image 56 according to the modified example of the third embodiment. The processes shown in FIG. 23 correspond to a modified example of those from the process subsequent to the step S308 to the process preceding the step S314 in the flowchart shown in FIG. 16. Further, FIG. 24 corresponds to a modified example of the rear-view image 56 shown in FIG. 19. FIG. 25 corresponds to a modified example of the rear-view image 56 shown in FIG. 20. Note that the below-described example can also be applied to the cases where the vehicle 1 moves backward at a certain steering angle shown in FIGS. 21 and 22.

After the process in the step S308 in FIG. 16, the display image generation unit 1114 determines whether or not there is a part of the guideline 1200 corresponding to a position located on the outer side of the position of the marked-off space boundary 62 in the rear-view image 56, i.e., in the display image data (step S322). When it is determined that there is no part of the guideline 1200 corresponding to the position located on the outer side of the position of the marked-off space boundary 62 (NO at S322), a process in a step S324, which is described below, is not performed and the process proceeds to a step S326. On the other hand, when it is determined that there is a part of the guideline 1200 corresponding to the position located on the outer side of the position of the marked-off space boundary 62 (YES at S322), the display image generation unit 1114 erases the part of the guideline 1200 corresponding to the position that is farther from the rear end of the vehicle 1 than the position of the marked-off space boundary 62 is (step S324).

Then, the display image generation unit 1114 determines whether or not the position of the marked-off space boundary 62 has gotten closer to the position of the distance indicating line 1204 that is located farthest from the rear end of the vehicle 1 among the distance indicating lines 1204 whose displaying format has not been changed (step S326). This process corresponds to the process in the step S312 according to the third embodiment. Note that "the distance indicating line 1204 farthest from the rear end of the vehicle 1" in this modified example corresponds to "the distance indicating line N" in the third embodiment. Therefore, when the distance between the position of "the distance indicating line 1204 farthest from the rear end of the vehicle 1" and the position of the marked-off space boundary 62 is represented by ΔDn, the display image generation unit 1114 determines whether or not a relation "ΔDn≤Dth" holds.

When it is determined that the position of the marked-off space boundary 62 has gotten closer to the position of the distance indicating line 1204 farthest from the rear end of the vehicle 1 (YES at S326), the process proceeds to the above-described process in the step S314. On the other hand, when it is determined that the position of the marked-off space boundary 62 is not getting closer to the position of the distance indicating line 1204 farthest from the rear end of the vehicle 1 (NO at S326), the process proceeds to the above-described process in the step S316. The subsequent processes are substantially similar to those according to the third embodiment described above with reference to FIG. 16 and therefore the description thereof is omitted.

In the example shown in FIG. 24, the display image generation unit 1114 erases parts of the predicted trajectory lines 1202 corresponding to the position that is farther than the marked-off space boundary 62A. Further, the display image generation unit 1114 erases, among the distance indicating lines 1204, the distance indicating line 1204D corresponding to the position farther than the marked-off space boundary 62A. Further, since the position of the marked-off space boundary 62A has gotten closer to the position of the distance indicating line 1204C, which is the farthest distance indicating line 1204, in the rear-view image 56, from which the distance indicating line 1204D has already been erased (YES at S326), the display image generation unit 1114 superimposes and displays an assisting line 1300C.

In the example shown in FIG. 25, the display image generation unit 1114 erases parts of the predicted trajectory lines 1202 corresponding to the position that is farther than the marked-off space boundary 62A. Further, the display image generation unit 1114 erases, among the distance indicating lines 1204, the distance indicating lines 1204D, 1204C and 1204B corresponding to the positions farther than the marked-off space boundary 62A. Further, since the position of the marked-off space boundary 62A has gotten closer to the position of the distance indicating line 1204A, which is the distance indicating line 1204 farthest from the rear end of the vehicle 1, in the rear-view image 56, from which the distance indicating lines 1204D, 1204C and 1204B have already been erased (YES at S326), the display image generation unit 1114 superimposes and displays an assisting line 1300A.

In the modified example of the third embodiment, the parts of the guidelines 1200 farther than the marked-off space boundary 62A are erased. Note that the vehicle 1 does not substantially move into the place farther than the marked-off space boundary 62A. Therefore, for the driver, it is unnecessary to display the guidelines 1200 in that place. Therefore, in the modified example of the third embodiment, by changing the parts of the guidelines 1200 farther than the marked-off space boundary 62A, which do not need to be displayed, the driver can recognize the distance to the marked-off space boundary 62A more appropriately and more quickly. Further, in the modified example of the third embodiment, the closer the vehicle 1 moves to the marked-off space boundary 62A, the shorter the guidelines 1200 become and the more the number of displayed distance indicating lines 1204 is reduced. Therefore, the driver can more intuitively recognize how close the rear end of the vehicle 1 has gotten closer to the marked-off space boundary 62A.

Note that in the above description, an example in which the display image generation unit 1114 erases parts of the display of guidelines 1200 is shown. However, the present disclosure is not limited to such configurations. The display image generation unit 1114 may change the parts of the display of the guidelines 1200 so that they become less noticeable. For example, the display image generation unit 1114 may make the color of the parts of the display of the guidelines 1200 paler. Further, for example, the display image generation unit 1114 may show the parts of the guidelines 1200 by broken lines.

Fourth Embodiment

Next, a fourth embodiment will be described. The fourth embodiment is different from the third embodiment because an overhead-view image is displayed in the display unit 50 in the fourth embodiment. Note that a hardware configuration of a vehicle 1 according to the fourth embodiment is substantially similar to that according to the third embodiment and therefore its description is omitted. Note that the overhead-view image is a simulated image in which the vehicle and its periphery are shown as if they are looked down from above.

Figure 26:
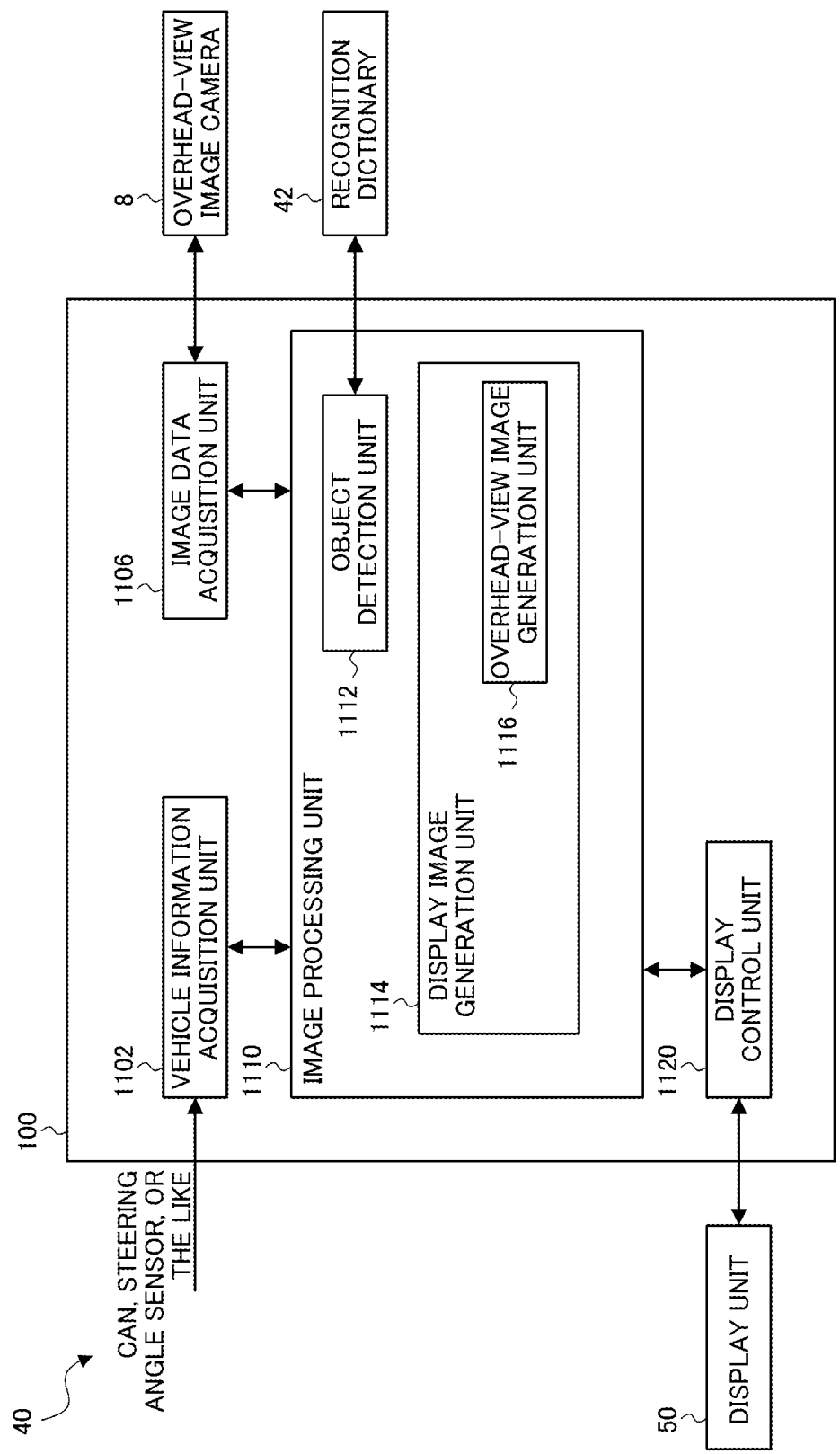
FIG. 26 shows a configuration of a display control apparatus and a display apparatus including the display control apparatus according to a fourth embodiment.

FIG. 26 shows a configuration of a display control apparatus 100 and a display apparatus 40 including the display control apparatus 100 according to the fourth embodiment. The display apparatus 40 includes an overhead-view image camera 8, a recognition dictionary 42, a display unit 50, and the display control apparatus 100. The overhead-view image camera 8 is composed of a rear camera 2, a front camera 3, and side cameras 4. The display control apparatus 100 includes a vehicle information acquisition unit 1102, an image data acquisition unit 1106, an image processing unit 1110, and a display control unit 1120. Further, the image processing unit 1110 includes an object detection unit 1112 and a display image generation unit 1114. Further, the display image generation unit 1114 includes an overhead-view image generation unit 1116. Among the above-described components, descriptions of functions substantially similar to those according to the third embodiment are omitted.

The image data acquisition unit 1106 acquires image data from the rear camera 2, the front camera 3, and the side camera 4, which constitute the overhead-view image camera 8. The image data acquisition unit 1106 outputs the acquired image data to the image processing unit 1110.

The overhead-view image generation unit 1116 generates an overhead-view image that is obtained by converting images of surroundings of the vehicle 1 so that their viewpoint is changed to a viewpoint from above the vehicle 1. Specifically, the overhead-view image generation unit 1116 performs a conversion on each of the images based on the image data from the rear camera 2, the front camera 3, and the side camera 4 so that its viewpoint is changed to a viewpoint from above the vehicle 1. Then, the overhead-view image generation unit 1116 generates overhead-view image data indicating an overhead-view image by combining these viewpoint-converted images with a vehicle icon which is a virtual image of the vehicle 1. Note that the term "image data" may also include the above-described overhead-view image data.

The object detection unit 1112 detects an object that defines a target position of the vehicle 1, such as a marked-off space boundary, from the overhead-view image data generated by the overhead-view image generation unit 1116 by using dictionary data stored in the recognition dictionary 42. Further, in the fourth embodiment, the recognition dictionary 42 stores dictionary data for images of objects viewed from above. Note that the method by which the object detection unit 1112 detects an object is substantially similar to the method according to the third embodiment.

The display image generation unit 1114 generates display image data in which guidelines are superimposed on the overhead-view image data generated by the overhead-view image generation unit 1116. Then, the display image generation unit 1114 outputs the generated display image data to the display control unit 1120. The display control unit 1120 performs control so as to display an image based on the display image data generated by the display image generation unit 1114 in the display unit 50. Therefore, in the fourth embodiment, the display unit 50 displays an overhead-view image corresponding to the overhead-view image data generated by the overhead-view image generation unit 1116.

Figure 27:
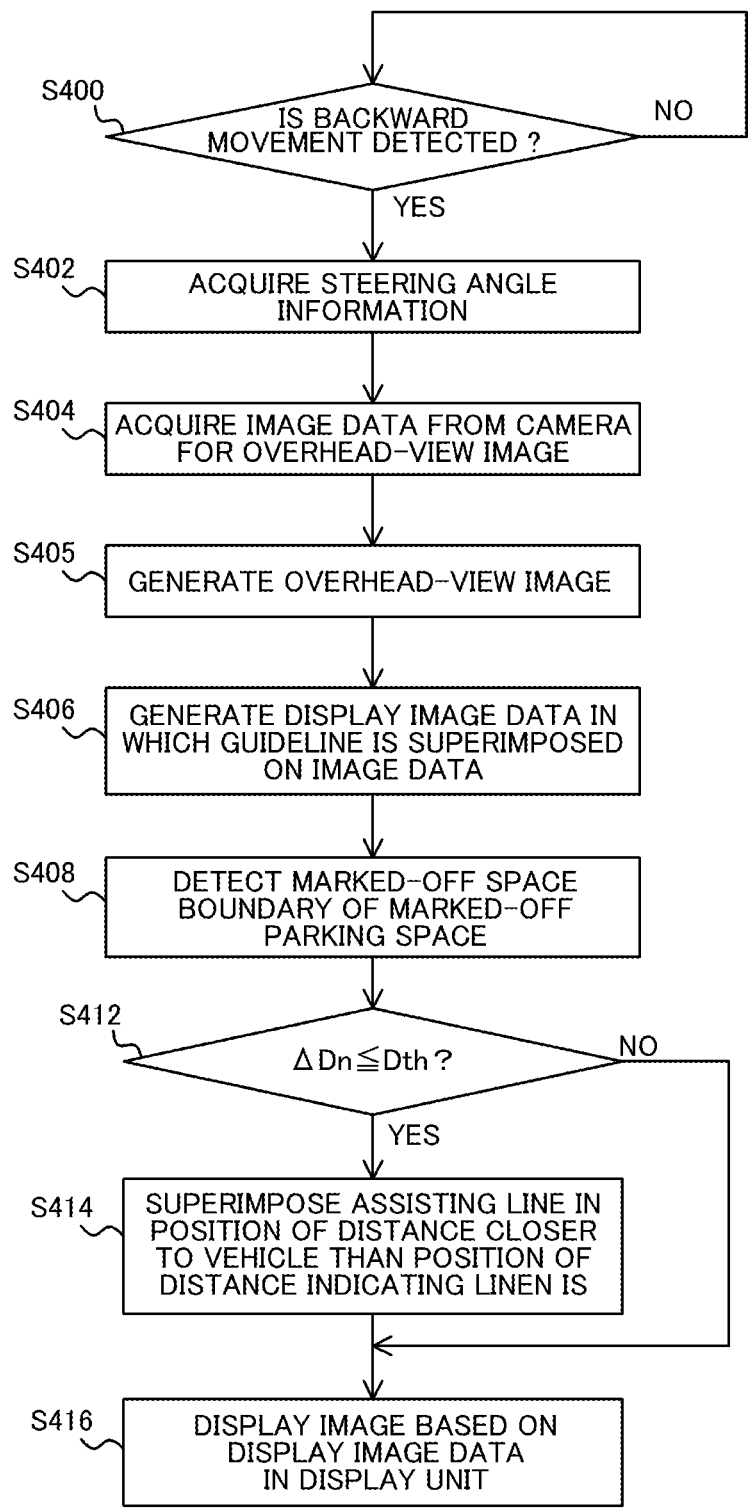
FIG. 27 is a flowchart showing a display control method performed by the display control apparatus according to the fourth embodiment.
Figure 28:
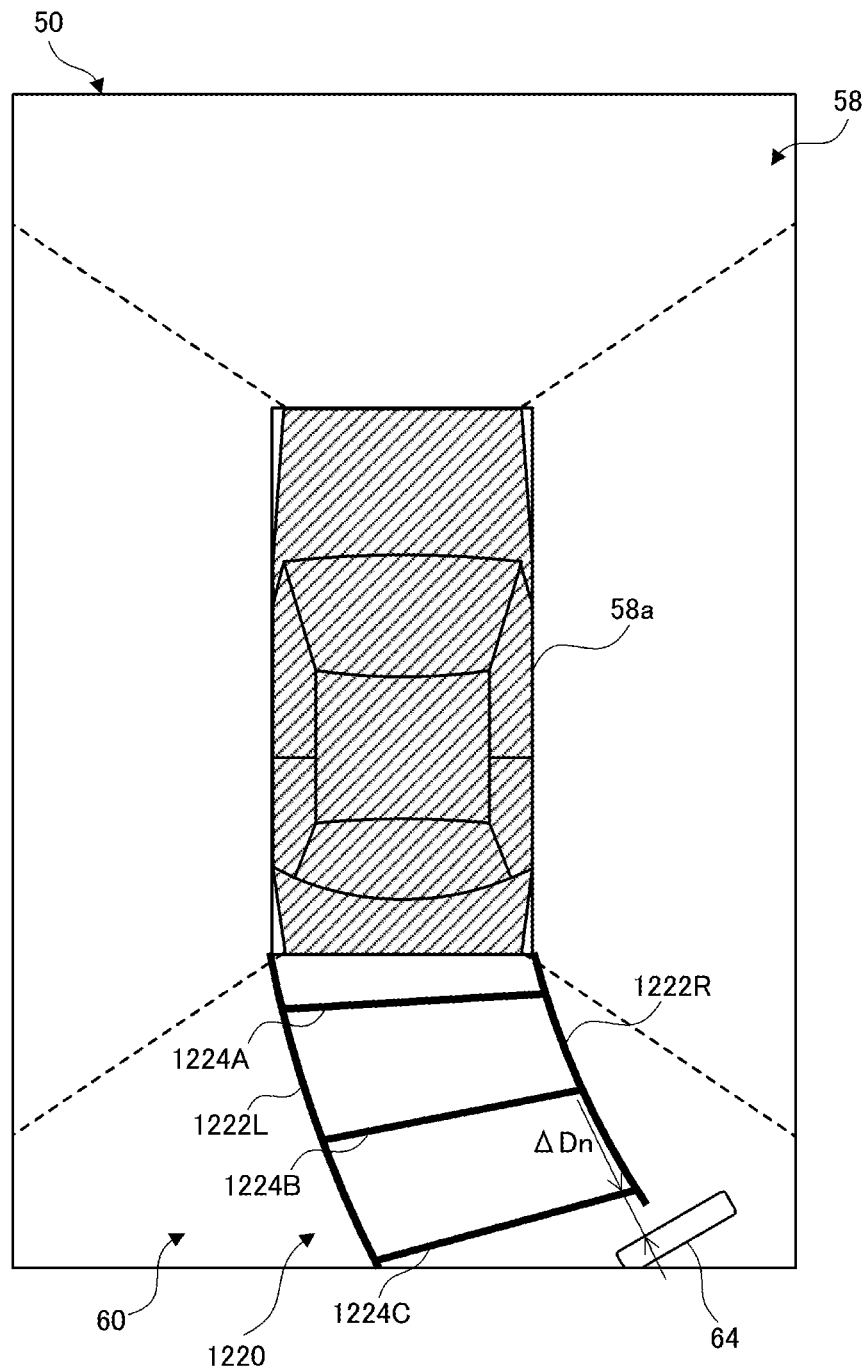
FIG. 28 shows an example of an overhead-view image based on display image data generated by a display image generation unit according to the fourth embodiment.
Figure 29:
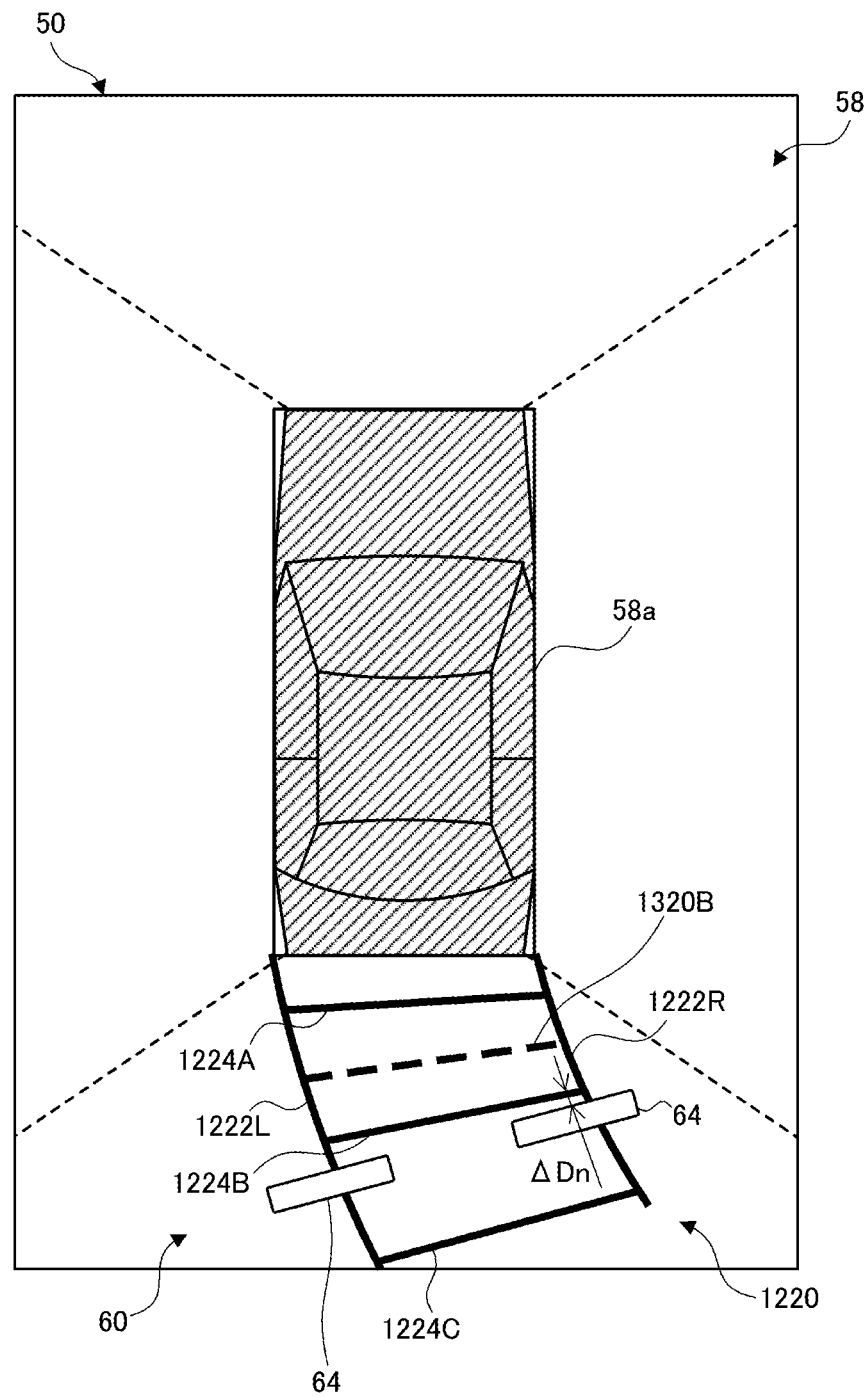
FIG. 29 shows an example of an overhead-view image showing a state in which the vehicle has further moved backward from the state shown in FIG. 28.
Figure 30:
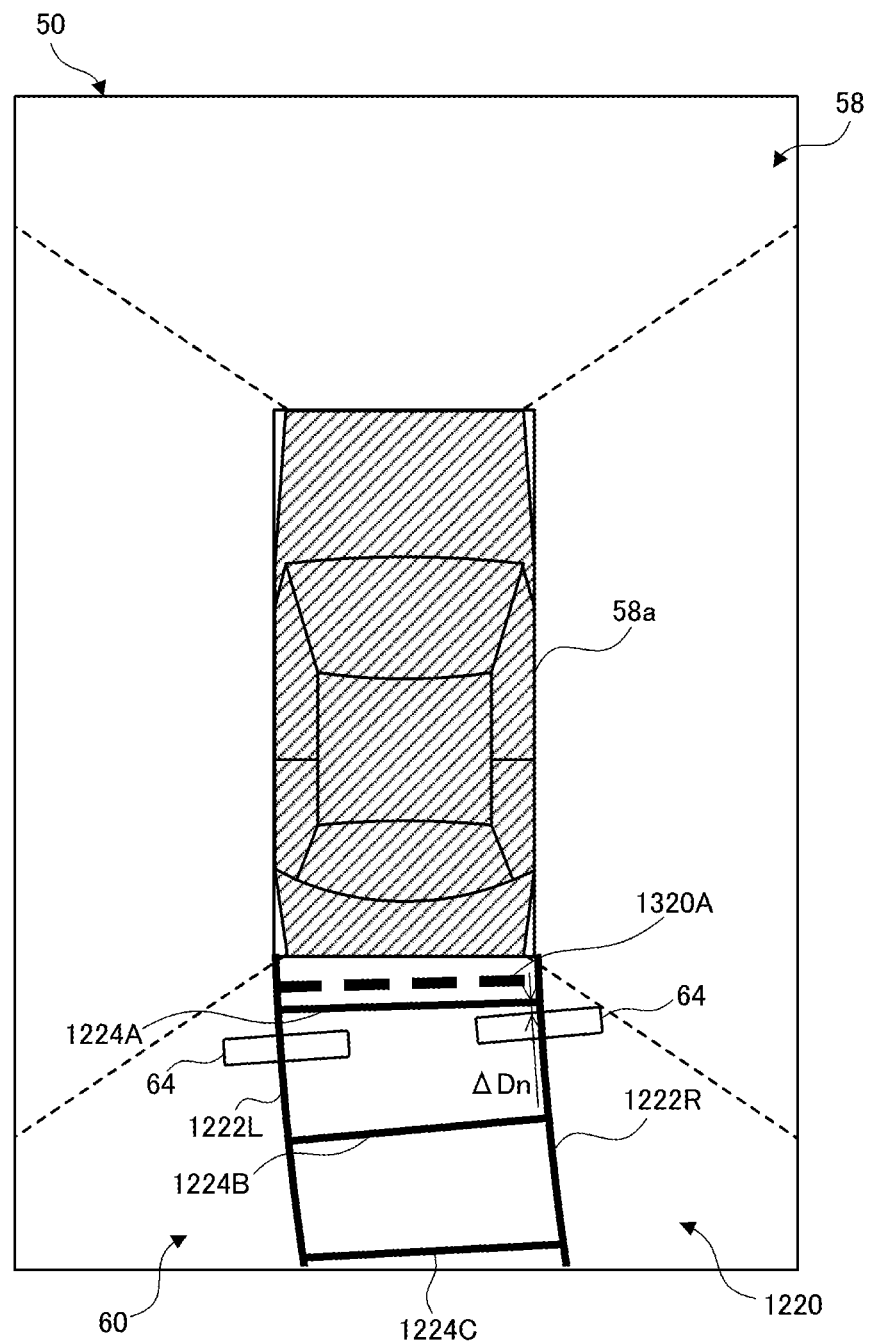
FIG. 30 shows an example of an overhead-view image showing a state in which the vehicle has further moved backward from the state shown in FIG. 29.
Figure 31:
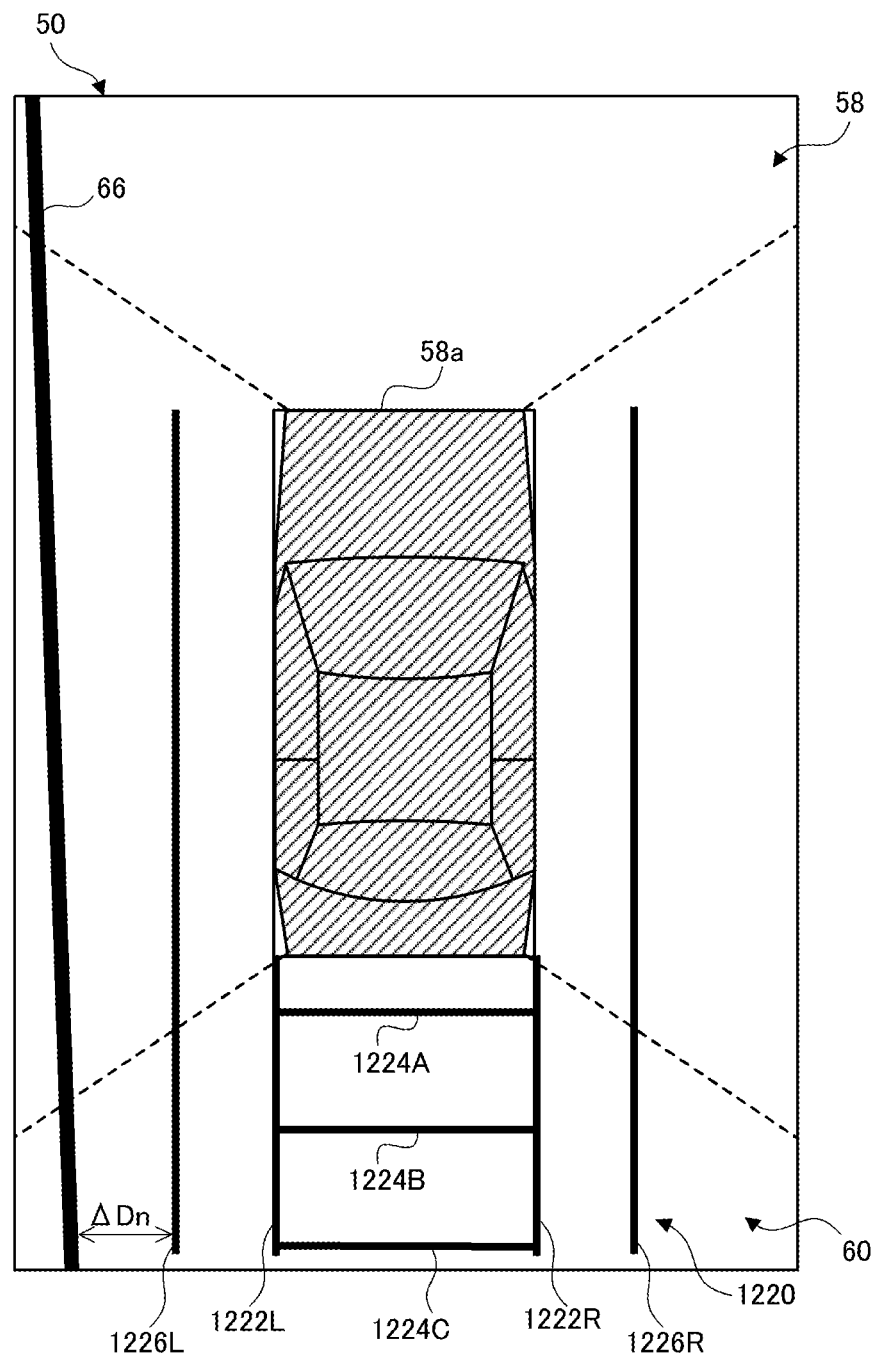
FIG. 31 shows an example of an overhead-view image based on display image data generated by a display image generation unit according to the fourth embodiment.
Figure 32:
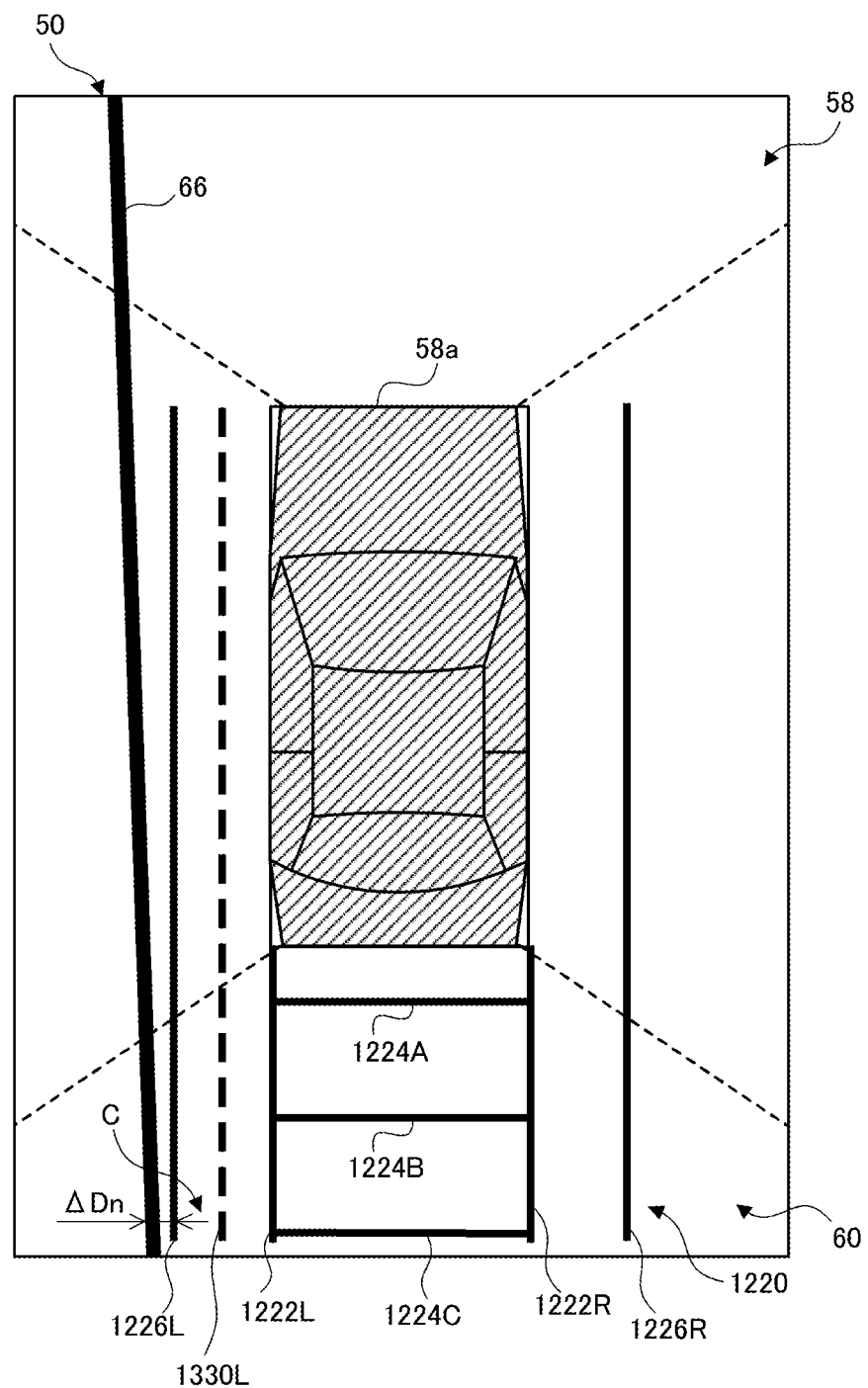
FIG. 32 shows an example of an overhead-view image showing a state in which the vehicle has further moved backward from the state shown in FIG. 31.

FIG. 27 is a flowchart showing a display control method performed by the display control apparatus 100 according to the fourth embodiment. Further, FIGS. 28 to 30 show examples of overhead-view images related to display image data that is generated by the display image generation unit 1114 when the vehicle 1 moves backward at a certain steering angle and has gotten closer to wheel stoppers located behind the vehicle 1. FIGS. 31 and 32 show examples of overhead-view images related to display image data that is generated by the display image generation unit 1114 when the vehicle 1 moves backward and has gotten closer to a curb stone located beside the vehicle 1. The flowchart shown in FIG. 27 is explained by using the examples shown in FIGS. 28 to 30.

When the vehicle information acquisition unit 1102 detects a backward movement of the vehicle 1 (YES at step S400), the vehicle information acquisition unit 1102 acquires steering angle information indicating a steering angle of the vehicle 1 (step S402). Further, the image data acquisition unit 1106 acquires image data from the overhead-view image camera 8 (step S404).

The overhead-view image generation unit 1116 generates overhead-view image data as described above (step S405). Then, the display image generation unit 1114 generates display image data in which guidelines including distance indicating lines are superimposed on the overhead-view image data generated by the overhead-view image generation unit 1116 (step S406).

FIG. 28 shows an example of an overhead-view image 58 displayed based on the display image data generated by the display image generation unit 1114 according to the fourth embodiment. FIG. 28 shows an example of a state in which the display unit 50 displays an overhead-view image 58 showing a state in which the vehicle 1 is moving backward toward wheel stoppers 64 at a certain steering angle in a marked-off parking space 60.

The overhead-view image 58 includes a vehicle icon 58a which is a virtual image of the vehicle 1, the marked-off parking space 60, and the wheel stoppers 64. Note that since the wheel stoppers 64 define a parking position of the vehicle 1, they constitute a marked-off space boundary, i.e., "the object that defines the target position of the vehicle 1".

Further, the overhead-view image 58 includes guidelines 1220 including a predicted trajectory line 1222L on the left side of the vehicle 1 and a predicted trajectory line 1222R on the right side of the vehicle 1. That is, the guidelines 1220 include a pair of predicted trajectory lines 1222 formed by vertical lines. The guidelines 1220 are drawn according to steering angle information by the display image generation unit 1114. Similarly to the third embodiment, the display image generation unit 1114 draws the predicted trajectory lines 1222L and 1222R so that they become curved lines corresponding to a steering angle indicated by the steering angle information.

Further, the guidelines 1220 include distance indicating lines 1224A, 1224B and 1224C indicating distances from the rear end of the vehicle 1 at the present moment. That is, the guidelines 1220 include distance indicating lines 1224 that are formed by horizontal lines and indicate predetermined distances from the vehicle 1. The display image generation unit 1114 draws the distance indicating lines 1224A, 1224B and 1224C so that they are inclined according to the curvature of the predicted trajectory lines 1222L and 1222R. The distance indicating line 1224A indicates a position at a distance Da from the rear end of the vehicle 1. Similarly, the distance indicating lines 1224B and 1224C indicate positions at distances Db and Dc, respectively, from the rear end of the vehicle 1. Similarly to the third embodiment, for example, the distances Da, Db and Dc are 0.4 m, 1.0 m and 2.0 m, respectively.

As described above, since the guidelines 1220 are included in the overhead-view image 58, the driver can recognize a predicted trajectory of the vehicle 1. Further, since the distance indicating lines 1224 are displayed, the driver can recognize an approximate distance from the rear end of the vehicle 1 to the wheel stoppers 64.

The object detection unit 1112 extracts a marked-off space boundary(ies) of a marked-off parking space, i.e., "the object that defines the target position of the vehicle 1" from the overhead-view image data generated by the overhead-view image generation section 1116 (step S408). In the example shown in FIG. 28, the object detection unit 1112 extracts the wheel stoppers 64 from the overhead-view image data for the overhead-view image 58.

Next, the display image generation unit 1114 determines whether or not the positions of the wheel stoppers 64 have gotten closer to the position corresponding to a distance indicating line N (step S412). The distance indicating line N is substantially similar to that in the third embodiment and is one of the distance indicating lines 1224A, 1224B and 1224C. Note that in the example shown in FIG. 28, the display image generation unit 1114 determines whether or not the positions of the wheel stoppers 64 have gotten closer to the position corresponding to the distance indicating line 1204C along the moving direction of the vehicle 1.

Note that when it is determined that a distance $\Delta Dn$ between the positions of the wheel stoppers 64 and the position corresponding to the distance indicating line N becomes equal to or shorter than a predetermined threshold Dth, i.e., when a relation "$\Delta Dn \leq Dth$" holds, the display image generation unit 1114 determines that the positions of the wheel stoppers 64 have gotten closer to the position of the distance indicating line N. Note that similarly to the third embodiment, the value of the threshold Dth may be changed depending on which of the distance indicating lines 1224 the distance indicating line N corresponds to.

Note that the display image generation unit 1114 may determine whether or not the relation "$\Delta Dn \leq Dth$" holds by performing image processing. Note that since the overhead-view image 58 is a plan view viewed from above the vehicle 1, the relation between the number of pixels and the actual distance could be roughly constant. Therefore, the display image generation unit 1114 may store the relation between the number of pixels and the actual distance in the display image data in advance. Then, the display image generation unit 1114 may count the number of pixels between the images of the wheel stoppers 64 and the image of the distance indicating line N in the display image data and calculate the distance ΔDn based on the obtained number of pixels.

When it is determined that the wheel stoppers 64 are not getting closer to the position corresponding to the distance indicating line N, i.e., when it is determined that the relation "ΔDn≤Dth" does not hold (NO at S412), a process in a step S414, which is described below, is not performed and the process proceeds to a step S416. On the other hand, when it is determined that the wheel stoppers 64 have gotten closer to the position corresponding to the distance indicating line N, i.e., when it is determined that the relation "ΔDn≤Dth" holds (YES at S412), the display image generation unit 1114 superimposes an assisting line on a position that is closer to the vehicle 1 than the position of the distance indicating line N is (step S414). Then, the display control unit 1120 displays an image based on the display image data generated by the display image generation unit 1114 in the display unit 50 (step S416).

In the example shown in FIG. 28, the distance indicating line 1224 closest to the wheel stoppers 64 is the distance indicating line 1224C. Therefore, the display image generation unit 1114 calculates the distance ΔDn between the position corresponding to the distance indicating line 1224C and the positions of the wheel stoppers 64. Then, the display image generation unit 1114 determines that a relation "ΔDn>Dth" holds, i.e., the wheel stoppers 64 are not getting closer to the position corresponding to the distance indicating line 1224C (NO at S412). Therefore, the display image generation unit 1114 does not superimpose an assisting line on the overhead-view image data.

FIG. 29 shows an example of an overhead-view image 58 showing a state in which the vehicle 1 has further moved backward from the state shown in FIG. 28. In the state shown in FIG. 29, the positions of the wheel stoppers 64 have gotten closer to the position of the distance indicating line 1224B. Here, the display image generation unit 1114 calculates the distance ΔDn between the position corresponding to the distance indicating line 1224B and the positions of the wheel stoppers 64, and it is assumed that as a result of the calculation, a relation "ΔDn≤Dth" holds.

In this case, the display image generation unit 1114 determines that the relation "ΔDn≤Dth" holds in the process in the step S412. That is, the display image generation unit 1114 determines that the wheel stoppers 64 have gotten closer to the position corresponding to the distance indicating line 1224B (YES at S412). Therefore, the display image generation unit 1114 superimposes an assisting line 1320B indicating a position closer to the vehicle 1 than the position of the distance indicating line 1224B is (S414). As described above, since the assisting line 1320B is superimposed on the overhead-view image data, the driver can quantitatively recognize, to some extent, the distance to the wheel stoppers 64. That is, to some extent, the driver can quantitatively recognize how close the rear end of the vehicle 1 has moved to the wheel stoppers 64. In other words, to some extent, the driver can quantitatively recognize how much distance the vehicle 1 can be further moved backward and how close the vehicle 1 will get to the wheel stoppers 64 by doing so. Therefore, the driver can appropriately recognize the distance to the wheel stoppers 64. Further, since the assisting line 1320B appears in the overhead-view image 58, the driver can immediately recognize that the distance from the rear end of the vehicle 1 to the wheel stoppers 64 becomes about 1.0 m.

Note that similarly to the third embodiment, the display image generation unit 1114 superimposes and displays the assisting line 1320B between the distance indicating lines 1224B and 1224A. That is, when the distance from the rear end of the vehicle 1 to the position of the assisting line 1320B is represented by Dsb, a relation "Db>Dsb>Da" holds. Further, similarly to the above-described example, when the distances Db and Da are 1.0 m and 0.4 m, respectively (i.e., Db=1.0 m, Da=0.4 m), the distance Dsb may be set to 0.7 m (Dsb=0.7 m). In this case, the assisting line 1320B indicates the position at which the distance between the distance indicating lines 1224B and 1224A is divided into two equal parts. Further, when the distance Dsb is set to 0.6 m or 0.8 m (Dsb=0.6 m or 0.8 m), the assisting line 1320B indicates the position at which the distance between the distance indicating lines 1224B and 1224A is divided into three equal parts. In this way, since the distance indicating lines 1224 adjacent to each other and the assisting line 1320 therebetween functions as divisions of a scale, the driver can recognize the distance from the vehicle 1 to the wheel stoppers 64 more accurately.

FIG. 30 shows an example of an overhead-view image 58 showing a state in which the vehicle 1 has further moved backward from the state shown in FIG. 29. In the state shown in FIG. 30, the positions of the wheel stoppers 64 have gotten closer to the position of the distance indicating line 1224A. Here, the display image generation unit 1114 calculates the distance ΔDn between the position corresponding to the distance indicating line 1224A and the positions of the wheel stoppers 64, and it is assumed that as a result of the calculation, a relation "ΔDn≤Dth" holds (YES at S412). Therefore, the display image generation unit 1114 superimposes an assisting line 1320A indicating a position closer to the vehicle 1 than the position of the distance indicating line 1224A is (S414). As described above, since the assisting line 1320A is superimposed on the overhead-view image data, the driver can appropriately recognize the distance to the wheel stoppers 64. Further, since the assisting line 1320A appears in the overhead-view image 58, the driver can immediately recognize that the distance from the rear end of the vehicle 1 to the wheel stoppers 64 becomes about 0.4 m.

Note that the distance indicating line 1224A is the distance indicating line 1224 closest to the vehicle 1 among the plurality of distance indicating lines 1224. In this case, similarly to the third embodiment, the display image generation unit 1114 superimposes and displays the assisting line 1320A between the distance indicating line 1224A and the rear end of the vehicle 1. That is, when the distance from the rear end of the vehicle 1 to the position of the assisting line 1320A is represented by Dsa, a relation "Da>Dsa>0" holds. Further, similarly to the above-described example, when the distance Da is 0.4 m (Da=0.4 m), the distance Dsa may be set to 0.2 m (Dsa=0.2 m). In this case, the assisting line 1300A indicates the position at which the distance between the distance indicating line 1224A and the rear end of the vehicle 1 is divided into two equal parts.

Further, similarly to the third embodiment, the display image generation unit 1114 may superimpose and display the assisting line 1320A related to the distance indicating line 1224A closest to the vehicle 1 in a displaying format by which the assisting line 1320A is more noticeable than other assisting lines 1320. By displaying the assisting line 1320A in a noticeable displaying format, it is possible to warn the driver that the vehicle 1 is getting closer to the marked-off space boundary such as the wheel stoppers 64.

As described above, the display control apparatus 100 according to the fourth embodiment can provide advantageous effects similar to those of the third embodiment. For example, the display control apparatus 100 according to the fourth embodiment enables the driver to appropriately and quickly recognize the distance to the marked-off space boundary such as the wheel stoppers 64. Further, in the fourth embodiment, the assisting line 1320 is also superimposed between the distance indicating lines 1224 adjacent to each other. As a result, even when the driver does not know the distance indicated by the assisting line 1320, the driver can intuitively recognize an approximate distance indicated by the assisting line 1320. Further, since the displaying formats of the assisting line 1320 and the distance indicating lines 1224 are differentiated from each other, the driver can recognize the distance to the marked-off space boundary such as the wheel stoppers 64 more appropriately and more quickly.

FIG. 31 shows an example of an overhead-view image 58 displayed based on the display image data generated by the display image generation unit 1114 according to the fourth embodiment. FIG. 31 shows an example of a state in which the display unit 50 displays a rear-view image 56 showing a state in which the vehicle 1 moves backward and has gotten closer to a curb stone located beside the vehicle 1.

Similarly to the example shown in FIG. 28, the overhead-view image 58 shown in FIG. 31 includes a vehicle icon 58*a* and a marked-off parking space 60. Further, the overhead-view image 58 shown in FIG. 31 includes a curb stone 66 located on the left side of the vehicle icon 58*a*. Note that since the curb stone 66 defines a parking position of the vehicle 1, it is a marked-off space boundary, i.e., "the object that defines the target position of the vehicle 1". Further, the overhead-view image 58 includes guidelines 1220 including predicted trajectory lines 1222L and 1222R, and distance indicating lines 1224A, 1224B and 1224C.

Further, in the overhead-view image 58 shown in FIG. 31, the guidelines 1220 further include distance indicating lines 1226L and 1224R. The distance indicating line 1226L is drawn on the left side of the vehicle icon 58*a* and the predicted trajectory line 1222L. The distance indicating line 1224R is drawn on the right side of the vehicle icon 58*a* and the predicted trajectory line 1222R.

The distance indicating line 1226L indicates a position at a distance Dl from the position corresponding to the left side surface of the vehicle 1 and the predicted trajectory line 1222L on the left side thereof. The distance indicating line 1226R indicates a position at a distance Dr from the position corresponding to the right side surface of the vehicle 1 and the predicted trajectory line 1222R to the right side thereof. For example, the distances Dl and Dr are 1.0 m (Dl=Dr=1.0 m). Further, similarly to the shape of the predicted trajectory lines 1222, a shape of the distance indicating lines 1226 may be curved in conformity with the steering angle. As a result, the distance indicating lines 1226 are drawn so as to appear parallel to the predicted trajectory lines 1222.

In the example shown in FIG. 31, the display image generation unit 1114 also determines whether or not the position of the marked-off space boundary has gotten closer to the position corresponding to a distance indicating line N (S412). Note that in the example shown in FIG. 31, the distance indicating line N is the distance indicating line 1226L and the marked-off space boundary is the curb stone 66. The display image generation unit 1114 determines whether or not a distance ΔDn between the position of the curb stone 66 and the position corresponding to the distance indicating line 1226L at their closest points becomes equal to or shorter than a predetermined threshold Dth. Note that in the example shown in FIG. 31, the display image generation unit 1114 determines that a relation "ΔDn>Dth" holds, i.e., the curb stone 66 is not getting closer to the position corresponding to the distance indicating line 1226L (NO at S412). Therefore, the display image generation unit 1114 does not superimpose an assisting line on the overhead-view image data.

FIG. 32 shows an example of an overhead-view image 58 showing a state in which the vehicle 1 has further moved backward from the state shown in FIG. 31. In the state shown in FIG. 32, the position of the curb stone 66 has gotten closer to the position of the distance indicating line 1226L. Here, the display image generation unit 1114 calculates the distance ΔDn between the position corresponding to the distance indicating line 1226L and the position of the curb stone 66, and it is assumed that as a result of the calculation, a relation "ΔDn≤Dth" holds.

In this case, the display image generation unit 1114 determines that the relation "ΔDn≤Dth" holds in the process in the step S412. That is, the display image generation unit 1114 determines that the curb stone 66 has gotten closer to the position corresponding to the distance indicating line 1226L (YES at S412). Therefore, the display image generation unit 1114 superimposes an assisting line 1330L indicating a position closer to the vehicle 1 than the position of the distance indicating line 1226L is (S414). As described above, since the assisting line 1330L is superimposed on the overhead-view image data, the driver can quantitatively recognize the distance from the predicted trajectory line 1222L to the curb stone 66. That is, the driver can recognize that when the vehicle 1 moves backward to the position corresponding to an arrow C at the current steering angle, how close the vehicle 1 will get to the curb stone 66.

Note that similarly to the third embodiment, the display image generating section 1114 draws the assisting line 1330L as a curved line according to the curved shape of the predicted trajectory line 1222L and the distance indicating line 1226L. Therefore, the assisting line 1330L is drawn so that it appears parallel to the predicted trajectory line 1222 and the distance indicating line 1226L.

Further, similarly to the third embodiment, the display image generation unit 1114 superimposes and displays the assisting line 1330L between the distance indicating line 1226L and the predicted trajectory line 1222L and between the distance indicating line 1226L and the vehicle icon 58*a*. That is, when the distance from the predicted trajectory line 1222L to the position of the assisting line 1330L is represented by Dsl, a relation "Dl>Dsl>0" holds. Further, similarly to the above-described example, when the distance Dl is 1.0 m (Dl=1.0 m), the distance Dsl may be set to 0.5 m (Dsl=0.5 m). In this case, the assisting line 1330L indicates the position at which the distance between the distance indicating line 1226L and the predicted trajectory line 1222L is divided into two equal parts. That is, the assisting line 1330L indicates a position at which the distance between the distance indicating line 1226L and the predicted trajectory line 1222L, i.e., between the distance indicating line 1226L and the vehicle icon 58*a* is divided into equal parts the number of which is an integer. In this way, the driver can recognize the distance from the vehicle 1 and the predicted trajectory of the vehicle 1 to the curb stone 66 more accurately.

Modified Example

Note that the present invention is not limited to the above-described embodiments, and various modifications can be made without departing the spirit and scope of the present invention. For example, orders of processes in the above-described flowcharts can be changed as appropriate. For example, in the flowchart shown in FIG. 4, the order of the process in the step S102 and the process in the step S104 may be reversed. Further, for example, in the flowchart shown in FIG. 16, the order of the process in the step S302 and the process in the step S304 may be reversed.

Further, the interval between a plurality of assisting lines is constant in the above-described first and second embodiments. However, the interval may be fixed in advance or may be variable. In the above example, the interval between assisting lines is set to 30 cm. However, a driver may change the interval between assisting lines as appropriate by operating a user interface of the display control apparatus 100. Further, the display image generation unit 110 may automatically change the interval between assisting lines according to the width of the marked-off parking space. For example, the display image generation unit 110 may change the interval between assisting lines in such a manner that the narrower the width of marked-off parking space is, the more the interval is reduced. In this way, the driver can easily recognize the position of the vehicle 1 in the width direction in the marked-off parking space irrespective of the width of the marked-off parking space. When the width of the marked-off parking space is narrow, the driver may desire to operate the vehicle 1 more accurately. By the above-described configuration, since the driver can accurately recognize the position up to the marked-off space boundary, the driver can accurately operate the vehicle 1 more easily.

Further, in the above-described first and second embodiments, the number of assisting lines may be fixed in advance or may be variable. The driver may change the number of assisting lines as appropriate by operating the user interface of the display control apparatus 100. Further, the display image generation unit 110 may automatically change the number of assisting lines according to the width of the marked-off parking space or the like. For example, the display image generation unit 110 may change the number of assisting lines in such a manner that the wider the width of marked-off parking space is, the more the number of assisting lines is increased.

Further, in the above-described third and fourth embodiments, assisting lines related to the distance from the rear end of the vehicle 1 (i.e., the assisting line 1300 or the assisting line 1320) and assisting lines related to the distance from the predicted trajectory line of the vehicle 1 (i.e., the assisting line 1310 or the assisting line 1330) are displayed separately from each other. However, the present disclosure is not limited to such configurations. Assisting lines related to the distance from the rear end of the vehicle 1 and assisting lines related to the distance from the predicted trajectory line of the vehicle 1 may be displayed at the same time. For example, in the example shown in FIG. 22, when the marked-off space boundary 62A is getting closer to distance indicating line 1204D, the display image generation unit 1114 may superimpose the assisting line 1300D as well as the assisting line 1310L on the image.

Further, in the above-described third and fourth embodiments, the number of assisting lines drawn between a given distance indicating line N and a distance indicating line N−1 adjacent thereto is not limited to one. That is, a plurality of assisting lines can be drawn between adjacent distance indicating lines. The plurality of assisting lines are preferably drawn at regular intervals. In this way, since the assisting lines functions as divisions of a scale, the driver can recognize the distance from the vehicle 1 to the marked-off space boundary more accurately.

Further, although examples in which a vehicle 1 is parked in a marked-off parking space are described in the above-described embodiments, the present disclosure is not limited to such configurations. This embodiment can be applied to an arbitrary case in which the vehicle 1 moves toward a certain target position.

Further, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to embodiments, the present invention is not limited to those embodiments. Various modifications can be made to the configurations and the details of the present invention by those skilled in the art without departing from the spirit and scope of the present invention.

According to this embodiment, it is possible to provide a display control apparatus, a display apparatus, a display control method, and a program that enable a driver to appropriately recognize a position of a vehicle in a width direction of a marked-off parking space, or enable a driver to appropriately and quickly recognize a distance to an object that defines a target position of a vehicle.

A display control apparatus according to this embodiment can be used, for example, to enable a driver to recognize a surrounding environment when a vehicle is traveling.

Supplementary Notes

In relation to the above-described exemplary embodiments, the following supplementary notes are also disclosed.
(Supplementary Note 1)

A display control apparatus comprising:

an image data acquisition unit configured to acquire image data from a camera configured to shoot a rear view of a vehicle;

a display image generation unit configured to generate display image data in which a pair of predicted course lines and a plurality of assisting lines are superimposed on the image data acquired by the image data acquisition unit, the pair of predicted course lines corresponding to a width of the vehicle and being drawn according to a backward movement of the vehicle, the plurality of assisting lines being disposed so that they are arranged side by side in a width direction on both sides of the pair of predicted course lines;

an extraction unit configured to extract a marked-off space boundary from the image data, the marked-off space boundary being a boundary in a width direction of a marked-off parking space where the vehicle can be parked;

a positional relation determination unit configured to determine a positional relation between the marked-off space boundary extracted by the extraction unit and the assisting line in the display image data; and a display control unit configured to display an image based on the display image data generated by the display image generation unit in a display unit, wherein the display image generation unit makes clarity of a display of an assisting line located on an outer side of the marked-off space boundary extracted by the extraction unit lower than clarity of a display of an assisting line located on an inner side of the marked-off space boundary.

(Supplementary Note 2)

The display control apparatus described in Supplementary note 1, wherein the display image generation unit generates the display image data in which the assisting lines are superimposed so that they appear parallel to the predicted course lines on a road surface behind the vehicle on the display image data.

(Supplementary Note 3)

The display control apparatus described in Supplementary note 2, wherein the display image generation unit generates the display image data in which the plurality of assisting lines are superimposed so that they are arranged at regular intervals on the road surface behind the vehicle on the display image data.

(Supplementary Note 4)

The display control apparatus described in any one of Supplementary notes 1 to 3, wherein the display image generation unit generates the display image data in which an assisting line closer to the predicted course line is superimposed on the image data in a more noticeable displaying format.

(Supplementary Note 5)

The display control apparatus described in any one of Supplementary notes 1 to 4, further comprising a steering angle information acquisition unit configured to acquire steering angle information indicating a steering angle in a backward movement of the vehicle, wherein the display image generation unit determines a shape of the predicted course line based on the steering angle information acquired by the steering angle information acquisition unit and determines a shape of the assisting line so as to conform to the shape of the predicted course line.

(Supplementary Note 6)

The display control apparatus described in any one of Supplementary notes 1 to 5, wherein the extraction unit can extract an obstacle located near the marked-off parking space in the width direction, and the display image generation unit generates the display image data in which an assisting line that overlaps the obstacle extracted by the extraction unit in the display image data is superimposed on the image data in a displaying format by which that assisting line is displayed more noticeably than an assisting line that does not overlap the obstacle.

(Supplementary Note 7)

A display control apparatus comprising:

an image data acquisition unit configured to acquire image data from a camera configured to shoot a surrounding view of a vehicle;

an object detection unit configured to detect an object defining a target position of the vehicle from the image data;

a display image generation unit configured to generate display image data in which at least one distance indicating line is superimposed on the image data, the at least one distance indicating line indicating a position at a predetermined distance from the vehicle or a position at a predetermined distance from a position on a predicted trajectory of the vehicle; and a display control unit configured to display an image based on the display image data generated by the display image generation unit in a display unit, wherein the display image generation unit generates the display image data in which an assisting line indicating a position that is closer to the vehicle than a position of the distance indicating line is further superimposed on the image data when it is determined that a distance between a position of the object detected by the object detection unit and a position corresponding to the distance indicating line becomes equal to or shorter than a first threshold.

(Supplementary Note 8)

The display control apparatus described in Supplementary note 7, wherein the display image generation unit superimposes a plurality of the distance indicating lines on the image data, and when it is determined that a distance between a position of a first distance indicating line corresponding to a position closest to a position of the object detected by the object detection unit among the plurality of distance indicating lines and the position of the object becomes equal to or shorter than the first threshold, the display image generation unit generates the display image data in which the assisting line is superimposed on the image data.

(Supplementary Note 9)

The display control apparatus described in Supplementary note 8, wherein the display image generation unit generates the display image data in which the assisting line is superimposed between the first distance indicating line and a second distance indicating line on the image data, the second distance indicating line being adjacent to the first distance indicating line and indicating a distance that is closer to the vehicle than the first distance indicating line is.

(Supplementary Note 10)

The display control apparatus described in Supplementary note 9, wherein the display image generation unit generates the display image data in which the assisting line is superimposed on the image data, the assisting line indicating a position at which a distance between a position corresponding to the first distance indicating line and a position corresponding to the second distance indicating line is divided into equal parts the number of which is an integer.

(Supplementary Note 11)

The display control apparatus described in Supplementary note 8, wherein when it is determined that a distance between a position corresponding to a distance indicating line closest to the vehicle among the plurality of distance indicating lines and the position of the object becomes equal to or shorter than the first threshold, the display image generation unit generates the display image data in which the assisting line is superimposed on the image data in a more noticeable displaying format.

(Supplementary Note 12)

The display control apparatus described in any one of Supplementary notes 7 to 11, wherein the display image generation unit generates the display image data in such a manner that a displaying format of a part of the distance indicating line corresponding to a position that is farther from the vehicle than the position of the object detected by the detection unit is changed.

(Supplementary Note 13)

The display control apparatus described in any one of Supplementary notes 1 to 12, wherein the display image generation unit generate the display image data in such a manner that a displaying format of the assisting line is changed from a displaying format of the predicted course line or the distance indicating line.

(Supplementary Note 14)

A display apparatus comprising:

a display control apparatus described in any one of Supplementary notes 1 to 13; and at least one of the camera and the display unit.

(Supplementary Note 15)

A display control method comprising:

acquiring image data from a camera configured to shoot a rear view of a vehicle;

generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines;

extracting a marked-off space boundary from the image data, the marked-off space boundary being a boundary in a width direction of a marked-off parking space where the vehicle can be parked;

determining a positional relation between the extracted marked-off space boundary and the assisting line in the display image data;

making clarity of a display of an assisting line located on an outer side of the extracted marked-off space boundary lower than clarity of a display of a assisting line located on an inner side of the marked-off space boundary; and displaying an image based on the display image data in a display unit.

(Supplementary Note 16)

A display control method comprising:

acquiring image data from a camera configured to shoot a surrounding view of a vehicle;

detecting an object defining a target position of the vehicle from the image data;

generating display image data in which at least one distance indicating line is superimposed on the image data, the at least one distance indicating line indicating a position at a predetermined distance from the vehicle or a position at a predetermined distance from a position on a predicted trajectory of the vehicle;

generating the display image data in which an assisting line indicating a position that is closer to the vehicle than a position of the distance indicating line is further superimposed on the image data when it is determined that a distance between a position of the detected object and a position corresponding to the distance indicating line becomes equal to or shorter than a first threshold; and displaying an image based on the generated display image data in a display unit.

(Supplementary Note 17)

A program for causing a computer to execute:

a step of acquiring image data from a camera configured to shoot a rear view of a vehicle;

a step of generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines;

a step of extracting a marked-off space boundary from the image data, the marked-off space boundary being a boundary in a width direction of a marked-off parking space where the vehicle can be parked;

a step of determining a positional relation between the extracted marked-off space boundary and the assisting line in the display image data;

a step of making clarity of a display of an assisting line located on an outer side of the extracted marked-off space boundary lower than clarity of a display of a assisting line located on an inner side of the marked-off space boundary; and a step of displaying an image based on the display image data in a display unit.

(Supplementary Note 18)

A program for causing a computer to execute:

a step of acquiring image data from a camera configured to shoot a surrounding view of a vehicle;

a step of detecting an object defining a target position of the vehicle from the image data;

a step of generating display image data in which at least one distance indicating line is superimposed on the image data, the at least one distance indicating line indicating a position at a predetermined distance from the vehicle or a position at a predetermined distance from a position on a predicted trajectory of the vehicle;

a step of generating the display image data in which an assisting line indicating a position that is closer to the vehicle than a position of the distance indicating line is further superimposed on the image data when it is determined that a distance between a position of the detected object and a position corresponding to the distance indicating line becomes equal to or shorter than a first threshold; and a step of displaying an image based on the generated display image data in a display unit.

What is claimed is:

1. A display control apparatus comprising:

at least one memory configured to store a program; and at least on processor coupled to the at least one memory and configured to execute the program to:

acquire image data from a rear camera configured to shoot a rear view of a vehicle;

generate display image data in which a pair of predicted course lines and a plurality of assisting lines are superimposed on the acquired image data, the pair of predicted course lines corresponding to a width of the vehicle and being drawn according to a backward movement of the vehicle, the plurality of assisting lines being disposed so that they are arranged side by side in a width direction on both sides of the pair of predicted course lines;

extract a marked-off space boundary from the image data, the marked-off space boundary being a boundary in a width direction of a marked-off parking space where the vehicle can be parked;

determine a positional relation between the extracted marked-off space boundary and the assisting line in the display image data; and display an image based on the generated display image data in a display unit, wherein change a displaying format of at least one assisting line located on an outer side of the extracted marked-off space boundary to a displaying format in which clarity is lower than that of at least one assisting line located on an inner side of the marked-off space boundary, as the vehicle travels, wherein the at least one assisting line located on an inner side is disposed between the marked-off space boundary and one of the pair of predicting lines.

2. The display control apparatus according to claim 1, wherein the at least on processor is further configured to generate generates the display image data in which the plurality of assisting lines are superimposed so that they are arranged at regular intervals on the road surface behind the vehicle on the display image data.

3. The display control apparatus according to claim 1, wherein the at least on processor is further configured to generate the display image data in which an assisting line of the plurality of assisting lines closer to the predicted course line than the other assisting lines of the plurality of assisting lines is superimposed on the image data in a more noticeable displaying format than the other assisting lines of the plurality of assisting lines.

4. The display control apparatus according to claim 1, wherein the at least on processor is further configured to change a displaying format of the assisting line from a displaying format of the predicted course line.

5. The display control apparatus according to claim 1, wherein the at least on processor is further configured to acquire steering angle information indicating a steering angle in a backward movement of the vehicle, and
determine a shape of the predicted course line based on the acquired steering angle information and determine a shape of the assisting line so as to conform to the shape of the predicted course line.

6. The display control apparatus according to claim 1, wherein the at least on processor is further configured to:
extract an obstacle located near the marked-off parking space in the width direction, and
generate the display image data in which an assisting line that overlaps the extracted obstacle in the display image data is superimposed on the image data in a displaying format by which that assisting line is displayed more noticeably than an assisting line that does not overlap the obstacle.

7. A display control method comprising:
acquiring image data from a rear camera configured to shoot a rear view of a vehicle;
generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines;
extracting a marked-off space boundary from the image data, the marked-off space boundary being a boundary in a width direction of a marked-off parking space where the vehicle can be parked;
determining a positional relation between the extracted marked-off space boundary and the assisting line in the display image data;
changing a displaying format of an assisting line located on an outer side of the extracted marked-off space boundary to a displaying format in which clarity is lower than that of an assisting line located on an inner side of the marked-off space boundary, as the vehicle travels; and
displaying an image based on the display image data in a display unit,
wherein the at least one assisting line located on an inner side is disposed between the marked-off space boundary and one of the pair of predicting lines.

8. A non-transitory computer readable medium storing program for causing a computer to execute:
a step of acquiring image data from a rear camera configured to shoot a rear view of a vehicle;
a step of generating display image data in which a pair of predicted course lines and a plurality of assisting lines are superimposed on the image data, the pair of predicted course lines corresponding to a width of the vehicle and being drawn according to a backward movement of the vehicle, the plurality of assisting lines being disposed so that they are arranged side by side in a width direction on both sides of the pair of predicted course lines;
a step of extracting a marked-off space boundary from the image data, the marked-off space boundary being a boundary in a width direction of a marked-off parking space where the vehicle can be parked;
a step of determining a positional relation between the extracted marked-off space boundary and the assisting line in the display image data;
a step of changing a displaying format of an assisting line located on an outer side of the extracted marked-off space boundary to a displaying format in which clarity is lower than that of an assisting line located on an inner side of the marked-off space boundary, as the vehicle travels; and
a step of displaying an image based on the display image data in a display unit,
wherein the at least one assisting line located on an inner side is disposed between the marked-off space boundary and one of the pair of predicting lines.

* * * * *